US012634742B2

(12) United States Patent
Teyeb et al.

(10) Patent No.: US 12,634,742 B2
(45) Date of Patent: May 19, 2026

(54) MAPPING INFORMATION FOR INTEGRATED ACCESS AND BACKHAUL

(71) Applicant: Telefonaktiebolaget LM Ericsson (publ), Stockholm (SE)

(72) Inventors: Oumer Teyeb, Montréal (CA); Filip Barac, Huddinge (SE); Gunnar Mildh, Sollentuna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 767 days.

(21) Appl. No.: 17/625,198

(22) PCT Filed: Jun. 10, 2020

(86) PCT No.: PCT/SE2020/050602

§ 371 (c)(1),
(2) Date: Jan. 6, 2022

(87) PCT Pub. No.: WO2021/006789

PCT Pub. Date: Jan. 14, 2021

(65) Prior Publication Data

US 2022/0272564 A1 Aug. 25, 2022

Related U.S. Application Data

(60) Provisional application No. 62/871,848, filed on Jul. 9, 2019.

(51) Int. Cl.
*H04W 28/00* (2009.01)
*H04W 28/02* (2009.01)
*H04W 40/12* (2009.01)

(52) U.S. Cl.
CPC ... *H04W 28/0263* (2013.01); *H04W 28/0215* (2013.01); *H04W 40/12* (2013.01)

(58) Field of Classification Search
None
See application file for complete search history.

(56) References Cited

U.S. PATENT DOCUMENTS

| | | | |
|---|---|---|---|
| 2018/0270894 A1 | 9/2018 | Park et al. | |
| 2019/0044754 A1 | 2/2019 | Hampel et al. | |

(Continued)

FOREIGN PATENT DOCUMENTS

| | | |
|---|---|---|
| CN | 105981431 A | 9/2016 |
| CN | 109803453 A | 5/2019 |

(Continued)

OTHER PUBLICATIONS

"IAB bearer mapping decisions", 3GPP TSG-RAN WG2#101bis, R3-185999, Chengdu, China, Oct. 8-12, 2018, 1-6.

(Continued)

*Primary Examiner* — Gerald A Smarth
(74) *Attorney, Agent, or Firm* — Murphy, Bilak & Homiller, PLLC

(57) ABSTRACT

In an example, a method performed by central unit control plane, CU-CP, of a base station for providing Integrated Access and Backhaul, IAB, bearer mapping information is disclosed. The base station is configured as a donor base station for one or more IAB nodes. The method comprises transmitting, to a distributed unit DU of the base station which is configured as a donor DU for one or more IAB nodes, mapping information to map one or more field values to one or more backhaul radio link control BH RLC channels between the DU and a first IAB node on a downlink path.

3 Claims, 21 Drawing Sheets

(56) References Cited

U.S. PATENT DOCUMENTS

| | | | |
|---|---|---|---|
| 2021/0051512 A1 | 2/2021 | Hampel et al. | |
| 2021/0068177 A1 | 3/2021 | Liu et al. | |
| 2021/0127380 A1 | 4/2021 | Liu et al. | |
| 2021/0168645 A1* | 6/2021 | Adjakple | H04W 72/54 |
| 2021/0243672 A1 | 8/2021 | Deshmukh et al. | |
| 2022/0070732 A1 | 3/2022 | Wang et al. | |

FOREIGN PATENT DOCUMENTS

| | | | | |
|---|---|---|---|---|
| EP | 3706328 A1 * | 9/2020 | | H04B 7/155 |
| EP | 3997929 B1 * | 4/2023 | | H04W 40/22 |
| WO | WO-2019137406 A1 * | 7/2019 | | H04W 72/04 |
| WO | WO-2019214709 A1 * | 11/2019 | | H04W 72/12 |
| WO | WO-2019214747 A1 * | 11/2019 | | H04W 40/24 |
| WO | 2021029804 A1 | 2/2021 | | |

OTHER PUBLICATIONS

3GPP, "3GPP TS 29.281 V15.6.0", 3rd Generation Partnership Project; Technical Specification Group Core Network and Terminals; General Packet Radio System (GPRS) Tunnelling Protocol User Plane (GTPv1-U) (Release 15), Sep. 2019, 1-32.

3GPP, "3GPP TS 38.423 V15.4.0", 3rd Generation Partnership Project; Technical Specification Group Radio Access Network; NG-RAN; Xn application protocol (XnAP) (Release 15), Jul. 2019, 1-309.

3GPP, "3GPP TS 38.425 V15.6.0", 3rd Generation Partnership Project; Technical Specification Group Radio Access Network; NG-RAN; NR user plane protocol (Release 15), Jul. 2019, 1-22.

3GPP, "3GPP TS 38.463 V15.4.0", 3rd Generation Partnership Project; Technical Specification Group Radio Access Network; NG-RAN; E1 Application Protocol (E1AP) (Release 15), Jul. 2019, 1-177.

3GPP, "3GPP TS 38.473 V15.6.0", 3rd Generation Partnership Project; Technical Specification Group Radio Access Network; NG-RAN; F1 application protocol (F1AP) (Release 15), Jul. 2019, 1-220.

"Backhaul RLC bearer management", 3GPP TSG-RAN WG3 meeting #104; R3-192809; Reno, Nevada, May 13-17, 2019, 1-9.

"Discussion on BG RLC channel configuration in IAB network", 3GPP TSG RAN WG2 Meeting #106; R2-1906576; Reno, USA, May 13-17, 2019, 1-5.

"IAB RLC channel management procedure", 3GPP TSG-RAN WG2 meeting #106; R2-1906076; Reno, USA; revision pf R2-1904985, May 13-17, 2019, 1-4.

3GPP, "3GPP TS 23.203 V16.1.0", 3rd Generation Partnership Project; Technical Specification Group Services and System Aspects; Policy and charging control architecture (Release 16), Jun. 2019, 1-263.

3GPP, "3GPP TS 23.401 V16.3.0", 3rd Generation Partnership Project; Technical Specification Group Services and System Aspects; General Packet Radio Service (GPRS) enhancements for Evolved Universal Terrestrial Radio Access Network (E-UTRAN) access (Release 16), Jun. 2019, 1-423.

3GPP, "3GPP TS 38.414 V15.2.0", 3rd Generation Partnership Project; Technical Specification Group Radio Access Network; NG-RAN; NG data transport (Release 15), Jul. 2019, 1-8.

3GPP, "3rd Generation Partnership Project; Technical Specification Group Radio Access Network; Evolved Universal Terrestrial Radio Access Network (E-UTRAN); X2 application protocol (X2AP) (Release 15)", 3GPP TS 36.423 V15.5.0, Mar. 2019, 1-414.

3GPP, "3rd Generation Partnership Project; Technical Specification Group Radio Access Network; NG-RAN; Architecture description (Release 15)", 3GPP TS 38.401 V15.6.0, Jul. 2019, 1-46.

3GPP, "3rd Generation Partnership Project; Technical Specification Group Radio Access Network; NR; Medium Access Control (MAC) protocol specification (Release 15)", 3GPP TS 38.321 V15.6.0, Jun. 2019, 1-78.

3GPP, "3rd Generation Partnership Project; Technical Specification Group Radio Access Network; NR; Radio Resource Control (RRC) protocol specification (Release 15)", 3GPP TS 38.331 V15.6.0, Jun. 2019, 1-519.

3GPP, "3rd Generation Partnership Project; Technical Specification Group Radio Access Network; NR; Study on Integrated Access and Backhaul; (Release 16)", 3GPP TR 38.874 V16.0.0, Dec. 2018, 1-111.

3GPP, "3rd Generation Partnership Project; Technical Specification Group Radio Access Network; Study of separation of NR Control Plane (CP) and User Plane (UP) for split option 2; (Release 15)", 3GPP TR 38.806 V15.0.0, Dec. 2017, 1-22.

3GPP, "3rd Generation Partnership Project; Technical Specification Group Radio Access Network; Study on Integrated Access and Backhaul; (Release 15) The present", 3GPP TR 38.874 V0.2.1, May 2018, 1-19.

3GPP, "3rd Generation Partnership Project; Technical Specification Group Radio Access Network; Study on new radio access technology: Radio access architecture and interfaces (Release 14)", 3GPP TR 38.801 V14.0.0, Mar. 2017, 1-91.

3GPP, "3rd Generation Partnership Project; Technical Specification Group Services and System Aspects; 3GPP System Architecture Evolution (SAE); Security architecture (Release 15)", 3GPP TS 33.401 V15.8.0, Jun. 2019, 1-163.

Ericsson, "Recovery from Link Failure in IAB Networks", 3GPP TSG RAN WG3 Meeting #103, R3-190363, Athens, Greece, Feb. 25-Mar. 1, 2019, 1-5.

Intel Corporation, "Bearer Mapping—further details", 3GPP TSG RAN WG2 Meeting #106, R2-1906348, Reno, U.S.A., May 13-17, 2019, 1-5.

KDDI Corporation, "Open issues for BAP-layer bearer mapping", 3GPP TSG-RAN WG2 Meeting #106, R2-1906084, Reno, USA, May 13-17, 2019, 1-4.

3GPP, "3rd Generation Partnership Project; Technical Specification Group Services and System Aspects; System Architecture for the 5G System; Stage 2 (Release 15)", 3GPP TS 23.501 V15.5.0, Mar. 2019, 1-241.

Unknown, Author, "IAB bearer mapping decision and configuration", 3GPP TSG-RAN WG2#106, R2-1906069, Revision of R2-1905103, Reno, US, May 13-17, 2019, 1-4.

Unknown, Author, "IP routing between IAB and operator network", 3GPP TSG-RAN WG2 Meeting #105, R2-1903582, Xi'an, China, Apr. 8-12, 1-5.

Unknown, Author, "New WID: Integrated Access and Backhaul for NR", 3GPP TSG RAN Meeting #82 RP-182882, Sorrento, Italy, Dec. 10-13, 2018, 1-7.

Unknown, Author, "QoS Mapping to Backhaul Bearers in IAB Networks", 3GPP TSG RAN WG3 Meeting #103bis R3-191358 Xi'an, P.R. China, Apr. 8-12, 2019, 1-3.

* cited by examiner

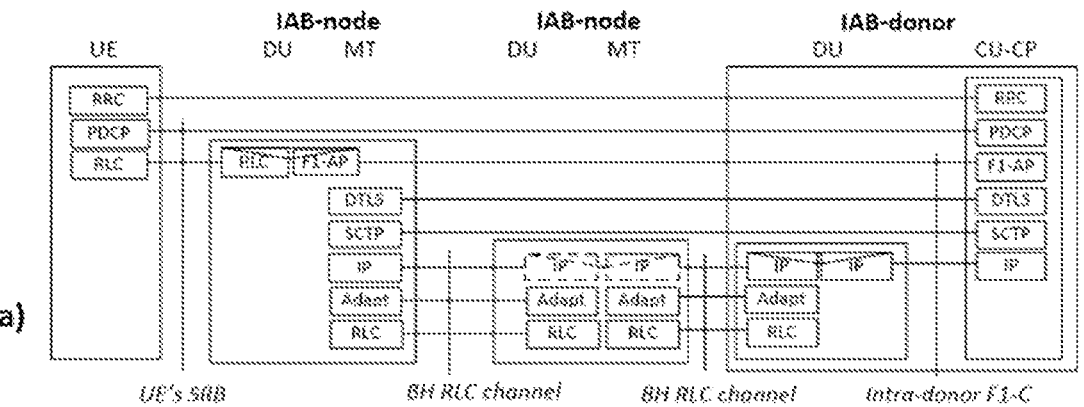
a)
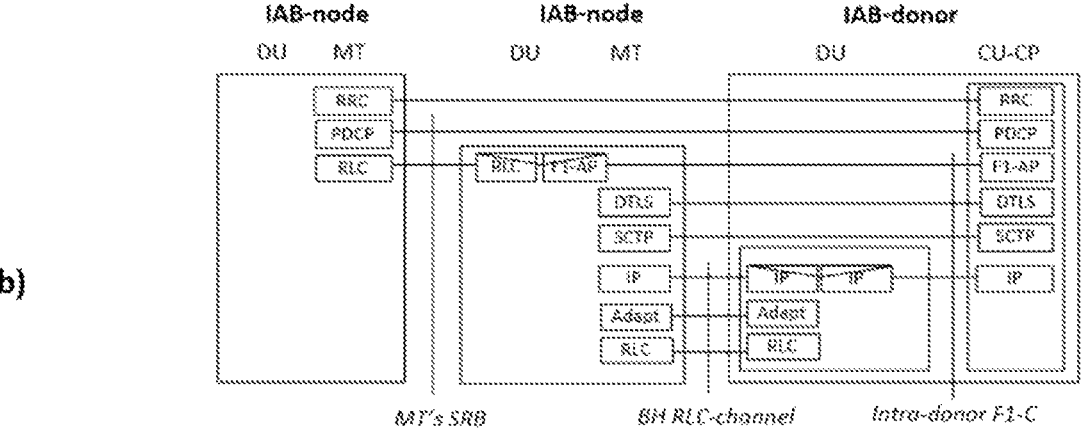
b)
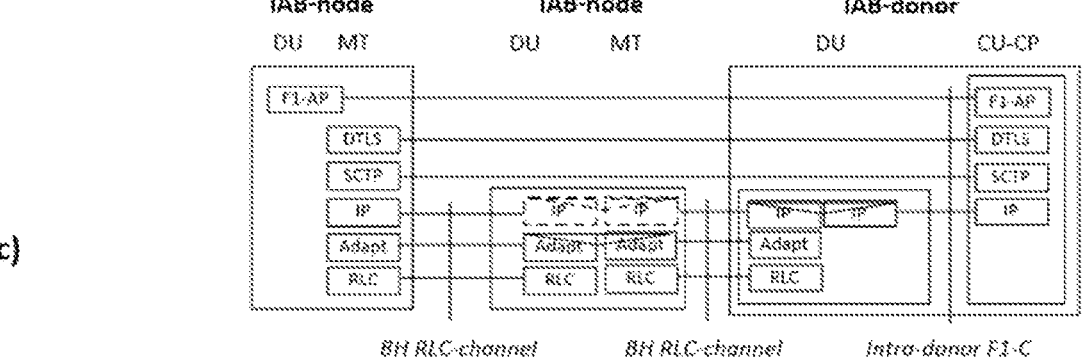
c)
FIG. 5

<u>1202</u>
Transmit, to a distributed unit DU of the base station which is configured as a donor DU for one or more IAB nodes, mapping information to map one or more field values to one or more backhaul radio link control BH RLC channels between the DU and a first IAB node on a downlink path <u>1200</u>

FIG. 12

<u>1302</u>
Transmit, to an IAB node, first mapping information to map uplink data of one or more user equipment bearers to the one or more field values

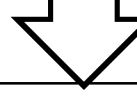

<u>1304</u>
Transmit, to the IAB node, second mapping information to map one or more field values to one or more backhaul radio link control BH RLC channels between the IAB node and a parent node of the IAB node <u>1300</u>

FIG. 13

<u>1402</u>
Obtain mapping information to map one or more field values to one or more backhaul radio link control BH RLC channels between the DU and a first IAB node in a downlink path

<u>1404</u>
Map a downlink packet received from a central unit user plane CU-UP of the base station to a first BH RLC channel based on a first field value in the downlink packet and the mapping information.

<u>1406</u>
inserting a second field value into an uplink packet to be transmitted to the CU-UP base station based on a second BH RLC on which a corresponding uplink packet was received and the mapping information .

<u>1502</u>
Obtain first mapping information to map uplink data of one or more user equipment bearers to one or more field values.

<u>1504</u>
Obtain second mapping information to map the one or more field values to one or more backhaul radio link control BH RLC channels between the IAB node and a parent node of the IAB node

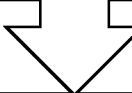

<u>1506</u>
Insert a first field value into an uplink packet based on a first user equipment bearer over which the uplink packet is transmitted and the first mapping information

<u>1508</u>
Select a first BH RLC channel to forward the uplink packet to based on the first field value and the second mapping information <u>1500</u>

FIG. 15

MAPPING INFORMATION FOR INTEGRATED ACCESS AND BACKHAUL

TECHNICAL FIELD

Examples of the present disclosure relate to mapping information for Integrated Access and Backhaul (IAB).

BACKGROUND

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Integrated Access and Backhaul

Densification via the deployment of more and more base stations (whether macro or micro base stations) is one of the mechanisms that may be employed to satisfy an ever-increasing demand for more and more bandwidth and/or capacity in mobile networks. Due to the availability of more spectrum in the millimeter wave (mmw) band, deploying small cells that operate in this band may be an attractive deployment option for these purposes. However, deploying fiber to the small cells, which is the usual way in which small cells are deployed, can end up being very expensive and impractical. Thus, employing a wireless link for connecting the small cells to the operator's network may be a cheaper and more practical alternative. One such solution is an Integrated Access and Backhaul (IAB) network, where the operator may utilize part of the radio resources for the backhaul link.

Integrated access and backhaul (IAB) has been studied earlier in 3GPP in the scope of Long Term Evolution (LTE) Rel-10. In that work, an architecture was adopted where a Relay Node (RN) has the functionality of an LTE eNB and User Equipment (UE) modem. The RN is connected to a donor eNB which has a S1/X2 proxy functionality hiding the RN from the rest of the network. That architecture enabled the donor eNB to be aware of the UEs behind the RN, and enabled the donor eNB to hide any UE mobility between donor eNB and a RN on the same donor eNB from the Core Network (CN).

During Rel-10 other architectures were also considered, for example, architectures in which the RNs are more transparent to the donor gNB and may be allocated a separate stand-alone P/S-GW node.

For New Radio (NR), similar architecture options may also be considered. One potential difference compared to LTE (besides lower layer differences) is that a gNB-CU/DU (Centralized Unit/Distributed Unit) split is defined for NR, which allows a separation of time critical RLC/MAC/PHY protocols from less time critical RRC/PDCP protocols. Such a split may also be applied for the IAB case. Other differences anticipated in NR, as compared to LTE with regards to IAB, are the support of multiple hops as well as the support of redundant paths.

In FIG. 1, an example of a multi-hop deployment in an integrated access and backhaul (IAB) network is illustrated where the IAB donor node (in short IAB donor) has a wired connection to the core network, and the IAB relay nodes (in short IAB nodes) are wirelessly connected using NR to the IAB donor, either directly or indirectly via another IAB node. The connection between IAB donor/node and UEs is called access link, whereas the connection between two IAB nodes or between an IAB donor and an IAB node is called backhaul link.

Furthermore, as illustrated in FIG. 2, which illustrates an example of IAB terminology in adjacent hops, the adjacent upstream IAB node of an IAB node (which is closer to the IAB donor node) is referred to as a parent node of the IAB node. The adjacent downstream node of an IAB node (which is further away from the IAB donor node) is referred to as a child node of the IAB node. The backhaul link between the parent node and the IAB node is referred to as a parent (backhaul) link, whereas the backhaul link between the IAB node and the child node is referred to as a child (backhaul) link.

Integrated Access Backhaul Architectures

During the study item phase of IAB work (summary of the study item can be found in the technical report TR 38.874), it has been agreed to adopt a solution that leverages the Central Unit (CU)/Distributed Unit (DU) split architecture of NR, where the IAB node will be hosting a DU part that is controlled by a central unit (CU). The IAB nodes may also have a Mobile Termination (MT) part that they use to communicate with their parent nodes.

The specifications for IAB strive to reuse existing functions and interfaces defined in NR. In particular, Mobile Termination (MT), gNB Distributed Unit (gNB-DU), gNB Central Unit (gNB-CU), User Plane Function (UPF), Access and Mobility Management Function (AMF) and the Session Management Function (SMF) as well as the corresponding interfaces NR Uu (between MT and gNB), F1 (between gNB-DU and gNB-CU), NG, X2 and N4 are used as baseline for the IAB architectures. Modifications or enhancements to these functions and interfaces for the support of IAB will be explained in the context of the architecture discussion. Additional functionality such as multi-hop forwarding may be included in the architecture discussion as it may be necessary for the understanding of IAB operation and since certain aspects may require standardization.

The Mobile-Termination (MT) function has been defined as a component of the IAB node. In the context of this study, MT is referred to as a function residing on an IAB-node that terminates the radio interface layers of the backhaul Uu interface toward the IAB-donor or other IAB-nodes.

FIG. 3 illustrates an example of a reference diagram for IAB in standalone mode, in this example, the system comprises one IAB-donor and multiple IAB-nodes. The IAB-donor in this example is treated as a single logical node that comprises a set of functions such as gNB-DU, gNB-CU-Control Plane (CP), gNB-CU-User Plane (UP) and potentially other functions. In a deployment, the IAB-donor can be split according to these functions, which can all be either collocated or non-collocated as allowed by 3GPP NG-RAN architecture. IAB-related aspects may arise when such split is exercised. Also, some of the functions presently associated with the IAB-donor may eventually be moved outside of the donor in case it becomes evident that they do not perform IAB-specific tasks.

FIG. 4 shows the baseline User Plane (UP) protocol stack for IAB in Rel-16, and FIG. 5 shows the baseline Control Plane (CP) protocol stack for IAB in Rel-16. As shown, the chosen protocol stacks reuse the current CU-DU split specification in Rel-15, where the full user plane F1-U (GTP-U/UDP/IP) is terminated at the IAB node (like for a normal DU) and the full control plane F1-C (F1-AP/SCTP/IP) is also terminated at the IAB node (like for a normal DU). In the above examples, Network Domain Security (NDS) has been employed to protect both UP and CP traffic (IPsec in the case of UP, and Datagram Transport Layer Security (DTLS) in the case of CP). IPsec could also be used for the CP protection instead of DTLS (in this case no DTLS layer would be used).

A new protocol layer called Backhaul Adaptation Protocol (BAP) has been introduced in the IAB nodes and the IAB donor. The BAP is used for routing of packets to the appropriate downstream/upstream node, and also for mapping the UE bearer data to the proper backhaul RLC channel (and also between ingress and egress backhaul RLC channels in intermediate IAB nodes) to satisfy the end to end QoS requirements of bearers.

At the RAN2 #105 meeting, the modelling of the Adaptation (i.e. BAP) layer was discussed and the following was agreed:

---

Agreements:

---

RAN2 confirms that routing and bearer mapping (e.g. mapping of BH RLC channels) are adaptation layer functions
R2 assumes that TX part of adaptation layer performs routing and "bearer mapping",
RX part of adaptation layer performs "bearer demapping"
R2 assumes that SDUs are forwarded from RX part of adaptation layer to TX part of adaptation layer (for the next hop) for packets that are relayed by the IAB node.
FFS how we model w.r.t protocol entities, e.g. whether separate for DU and MT or not, and FFS how these are configured, F1-AP orRRC.

---

It may be preferable to include a BAP entity in both MT and DU parts of the IAB-node protocol stack. Modelling the BAP layer this way facilitates the realization of the routing and mapping functionalities of the BAP layer.

Before discussing the operations of the two BAP entities, it may be considered as to whether the radio bearers carrying CP/UP traffic for the MT functionality of an IAB node should be handled separately from the BH RLC channels. Note that the BH RLC channels are used to carry traffic to/from the IAB DU functionality, which could be either be intended for the UEs served by the IAB node or for serving the child IAB nodes. It may be preferable to handle the radio bearers carrying CP/UP traffic for the MT functionality of an IAB node separately from the BH RLC channels, by employing different logical channel IDs.

FIGS. 6 and 7 illustrate the flow of packets in the downlink (DL) direction, while FIGS. 8 and 9 illustrate the flow of packets in the uplink (UL) direction. More specifically, FIG. 6 shows an example of bearer mapping in IAB nodes for downstream transmission, and FIG. 7 shows an example of the functions performed by BAP entities for downstream transmission. In FIGS. 6 and 7, when a packet arrives at the IAB donor DU (from the donor CU), it is processed first by the upper layers (as there is no MT BAP layer at the donor DU).

If the packet is destined for a UE directly connected to the IAB donor DU, or it is F1-AP traffic destined at the IAB donor DU, it is forwarded to higher layers (IP/UDP/GTP-U for UP, IP/SCTP/F1-AP for CP). Otherwise (e.g. the packet is to be forwarded further downstream), it is forwarded to the DU BAP layer.

When a packet arrives at an IAB node (e.g. at IAB 1 from IAB donor DU or at IAB 2 or 3 from IAB 1) via backhaul RLC channels it may be processed first by the MT BAP layer.

If the packet is destined for a UE directly connected to the IAB node or F1-AP traffic destined at the IAB node's DU, it may be forwarded to higher layers (IP/UDP/GTP-U for UP, IP/SCTP/F1-AP for CP). Otherwise (e.g. the packet is to be forwarded further downstream), it is forwarded to the DU BAP layer.

In both 1b and 2b above, the DU BAP may determine which route (i.e. to which child node) the packet should be forwarded to, and which BH RLC channel within that route will be used for forwarding the packet downstream.

More specifically, FIG. 8 shows an example of bearer mapping in IAB nodes for upstream transmission, and FIG. 9 shows an example of the functions performed by BAP entities for upstream transmission. In FIGS. 8 and 9, when a packet arrives at the IAB donor DU (from a child IAB node) via backhaul RLC channels, it may be processed first by the DU BAP layer and may be forwarded to the donor CU (as the donor DU may be connected to at most one donor CU, there may be no routing functionality required).

When a packet arrives at an IAB node in the UL direction (e.g. at IAB1 from IAB2 or IAB3): If the packet is coming from a child IAB node via backhaul RLC channels it may be processed first by the DU BAP layer and, since every UL packet is destined to be forwarded to the donor CU, the packet is passed on to the MT BAP layer.

If the packet is from a UE connected directly to the IAB node, or the packet is an F1-AP traffic originating from the IAB node, it may be processed first by the higher layers (IP/UDP/GTP-U for UP, IP/SCTP/F1-AP for CP) and may then be forwarded to the MT BAP layer.

The MT BAP may determine which route (i.e. to which parent node) the packet should be forwarded to, and which BH RLC channel within that route will be used for forwarding the packet upstream.

The setup and configuration (i.e. integration) for the IAB node is the first step in the operation of the IAB node. The integration procedure may include the following steps:
1. MT Setup
  MT selects parent node (procedure is FFS).
  MT authenticates with AMF (Uu procedures)
  AMF authorizes MT at gNB (signalling agreed at RAN3 #103)
  gNB establishes SRBs with MT (Uu procedures)
  gNB may establish DRBs and PDU session with MT (Uu procedures; if this is necessary is FFS)
    PDU session may be used for OAM connectivity 2. Backhaul Setup Establishment of BH RLC channel between IAB-node MT and parent node.

RAN2 decided that this configuration is done by CU-CP (e.g. using RRC).

For this, MT's CU-CP needs to know that MT belongs to an IAB node and not a UE, which it may derive, e.g., from MT authorization (agreed at RAN3 #103).

The BH RLC channel further has to be marked with the corresponding priority/QoS-class on IAB-node MT and parent node.

Establishment of adapt route(s) between IAB-node MT and IAB-donor DU. This includes:

Configuration of adapt routing identifier(s) on IAB-node MT and IAB-donor DU (RAN2; FFS), Configuration of routing entries on all IAB-node's ancestor nodes for new routing identifier (RAN2; FFS), IP address allocation to IAB-node for adapt interface, which is routable from wireline fronthaul via adapt route.

The IP address must be specific to IAB-donor DU so that CU can send IP packets to IAB-node via this specific IAB-donor DU and the new adapt route. The IAB-donor DU has to support a pool of IP addresses that are routable from wireline fronthaul for all descendant IAB-nodes.

If IP assignment is done by CU, the CU must know IAB-donor-DU's available IP address pool for IAB nodes.

If IP assignment is done via DHCPv4/6 with DHCP proxy on IAB-donor-DU, as proposed in TR, a transport mechanism of ARP/NDP on top of adapt layer needs to be defined.

There may be other options for IP address allocation.

3. DU Setup

DU establishes F1-C and cell activation using IP on adapt layer (procedure defined in TS 38.401 clause 8.5: F1 startup and cells activation).

This includes OAM support for IAB-node DU via backhaul IP layer.

It is important to note that the recommended architecture option (Option 1a in TR 38.874) may manage IP address assignment internally in the RAN without CN involvement. In that respect, the above baseline allows for DHCP-based IP address assignment and setting up the OAM after IP address assignment without MT establishing a PDU session. The three parts of the overall IAB node integration procedure is discussed below.

1. MT Functionality Setup

The IAB node may first connect via its MT functionality using RRC setup procedure. After RRC connection setup, the MT functionality of the IAB node may perform NAS-level registration and authentication, but no PDU session establishment may be required, as shown in FIG. 10, which shows an example of an IAB node integration procedure.

After the NAS registration, UE context for the IAB node may be created in the RAN (without any PDU session resources). In this way, there may be no need to support any SMF/UPF functionality for the IAB nodes. NAS Rel-15 already separates the NAS registration from the PDU session establishment, making it possible to only perform registration without setting up PDU sessions, as well as setting up a UE context in RAN without PDU session resources.

2. Backhaul Setup

Once the UE context for the IAB node is setup in the RAN, the RAN may establish one or more backhaul bearers that may be used for IP address assignment to IAB node. For the situations where the IAB node is not directly communicating with the IAB-Donor node, but via other (already attached/connected) IAB nodes, the forwarding information in all intermediate IAB nodes may be updated due to the setup of new IAB node.

3. DU Functionality Setup

After establishing connectivity to the operator's internal network, the DU functionality of IAB node and its cells/sectors may need to be configured by the OAM before the DU can send an F1 SETUP REQUEST message to its corresponding CU, i.e. IAB-CU. The recommended architecture option for IAB supports the full IP connectivity to the IAB node, making it possible that the DU functionality can have direct IP connectivity to the OAM, instead of relying on the MT functionality to establish a special PDU session in the CN for OAM.

Finally, after configuring the DU functionality of the IAB node, the IAB node becomes operational as a DU and UEs may not be able to distinguish it from other gNBs. As such, it can start serving UEs like any other DU/gNB.

The procedure for initial IAB node access may be based on the UE Initial Access signalling flow with slight modifications to fulfil the IAB node requirements. Meanwhile, for activation of IAB node DU cells, the F1 Startup and cells activation procedure defined in TS 38.401 can be reused as is. Taking the above into account, the following process may be used:

IAB Initial Access and MT Functionality Setup

1. The IAB node sends an RRCSetupRequest message to the gNB-DU.

2. The gNB-DU includes the RRC message and, if the IAB node is admitted, the corresponding lower layer configuration for the NR Uu interface in the INITIAL UL RRC TRANSFER message and transfers to the gNB-CU. The INITIAL UL RRC TRANSFER message includes the C-RNTI allocated by the gNB-DU.

3. The gNB-CU allocates a gNB-CU UE F1AP ID for the IAB node and generates RRCSetup message towards the IAB node. The RRC message is encapsulated in the DL RRC MESSAGE TRANSFER message.

4. The gNB-DU sends the RRCSetup message to the IAB node.

5. The IAB node sends the RRC CONNECTION SETUP COMPLETE message to the gNB-DU. The S-NSSAI IE in the RRC CONNECTION SETUP COMPLETE message indicates the IAB node.

6. The gNB-DU encapsulates the RRC message in the UL RRC MESSAGE TRANSFER message and sends it to the gNB-CU.

7. The gNB-CU sends the INITIAL UE MESSAGE to the AMF. This could be a dedicated AMF serving only the IAB nodes.

At this point the IAB node will perform registration (including authentication and key generation) without establishing a PDU session.

8. The AMF sends the INITIAL CONTEXT SETUP REQUEST message to the gNB-CU.

9. The gNB-CU sends the IAB CONTEXT SETUP REQUEST message to establish the IAB node context in the gNB-DU. In this message, it may also encapsulate the SecurityModeCommand message.

10. The gNB-DU sends the SecurityModeCommand message to the IAB node.

11. The gNB-DU sends the IAB CONTEXT SETUP RESPONSE message to the gNB-CU.

12. The IAB node responds with the SecurityModeComplete message.

13. The gNB-DU encapsulates the RRC message in the UL RRC MESSAGE TRANSFER message and sends it to the gNB-CU.

14. The gNB-CU generates the RRCReconfiguration message and encapsulates it in the DL RRC MESSAGE TRANSFER message. The RRCReconfiguration could include a configuration of one or more IAB backhaul bearers.

15. The gNB-DU sends RRCReconfiguration message to the IAB node.

16. The IAB node sends RRCReconfigurationComplete message to the gNB-DU.

17. The gNB-DU encapsulates the RRC message in the UL RRC MESSAGE TRANSFER message and sends it to the gNB-CU.

18. The gNB-CU sends the INITIAL CONTEXT SETUP RESPONSE message to the AMF.

IAB Node DU Cells Activation

At this point, the IAB node may have established one or more backhaul bearers that can be used for creating TNL connectivity toward gNB-CU and getting TNL address (e.g. IP address and port assignments). Next, the IAB node may utilize the F1 Startup and Cells Activation procedures described in TS 38.401 to activate its cells and become operational.

IAB Node Ready to Serve UEs

After activating its cells, the IAB node is operational and can serve the UEs. The UEs may connect to the IAB node via the UE Initial Access procedure described in TS 38.401.

Quality of Service and UE Bearer Mapping to Backhaul RLC Channels

3 GPP has agreed that the standard should support two options for mapping the UE bearers on backhaul RLC channels: many-to-one (N:1) and one-to-one (1:1) UE bearer mappings, as shown in FIG. 11, which shows examples of bearer mapping between UE bearers and backhaul RLC channels in IAB networks. FIG. 11(a) shows an example of N:1 mapping (where N>1) and FIG. 11(b) shows an example of 1:1 mapping.

For N:1 mapping UE bearers with similar QoS may be mapped to the same backhaul RLC (BH RLC) channel, while for 1:1 mapping a single UE bearer may be mapped to a dedicated BH RLC channel at every hop on the path towards the UE.

For 1:1 bearer mapping, it has been agreed to use the IPv6 Flow Label field, where the donor DU is configured to map IP packets that are marked with a given Flow Label to a particular Logical Channel ID (LCID) on the first backhaul link between the donor DU and the first downstream IAB node. For the case of N:1 mapping, the working assumption is that the DSCP field in the IP header may be used for the mapping purpose (in order to support also IPv4 networks). However, there is an ongoing discussion on whether to have a unified behaviour where the IPv6 Flow Label can be used for N:1 mapping as well. It may also be considered to use the combination of the flow label and the DSCP field for 1:1 mapping.

There currently exist certain challenge(s). As discussed above, routing and bearer mapping functionalities have to be performed by the BAP layer of the donor DU, intermediate IAB nodes and access IAB nodes in a multi-hop IAB network. It has also been agreed to use the DSCP and/or the IPv6 flow label fields for bearer mapping in the case of multi-hop IAB networks. However, it is still not clear how and which entity decides which LCID, IPv6 flow label or/and DSCP fields will be associated with a given bearer or sets of bearers. Also, most of the signaling aspects for enabling bearer mapping configuration have not been discussed yet.

SUMMARY

Certain aspects of the present disclosure and their embodiments may provide solutions to these or other challenges. One aspect of the present disclosure provides a method performed by central unit control plane, CU-CP, of a base station for providing Integrated Access and Backhaul, IAB, bearer mapping information. The base station is configured as a donor base station for one or more IAB nodes. The method comprises transmitting, to a distributed unit DU of the base station which is configured as a donor DU for one or more IAB nodes, mapping information to map one or more field values to one or more backhaul radio link control BH RLC channels between the DU and a first IAB node on a downlink path Another aspect of the present disclosure provides a method performed by a central unit control plane, CU-CP, of a base station for providing Integrated Access and Backhaul, IAB, mapping information. The base station is configured as a donor base station for one or more IAB nodes. The method comprises transmitting, to an IAB node, first mapping information to map uplink data of one or more user equipment bearers to one or more field values, and transmitting, to the IAB node, second mapping information to map one or more field values to one or more backhaul radio link control BH RLC channels between the IAB node and a parent node of the IAB node.

A further aspect of the present disclosure provides a method performed by a distributed unit, DU, of a base station for providing Integrated Access and Backhaul, IAB, mapping information. The base station is configured as a donor base station for one or more IAB nodes. The method comprises obtaining mapping information to map one or more field values to one or more backhaul radio link control BH RLC channels between the DU and a first IAB node in a downlink path, and mapping a downlink packet received from a central unit user plane CU-UP of the base station to a first BH RLC channel based on a first field value in the downlink packet and the mapping information, or inserting a second field value into an uplink packet to be transmitted to the CU-UP base station based on a second BH RLC on which a corresponding uplink packet was received and the mapping information.

A still further aspect of the present disclosure provides a method performed by an Integrated Access and Backhaul node for providing Integrated Access and Backhaul, IAB, mapping information. The IAB node is being served by a base station configured as a donor base station for one or more IAB nodes. The method comprises obtaining first mapping information to map uplink data of one or more user equipment bearers to one or more field values, obtaining second mapping information to map the one or more field values to one or more backhaul radio link control BH RLC channels between the IAB node and a parent node of the IAB node, inserting a first field value into an uplink packet based on a first user equipment bearer over which the uplink packet is transmitted and the first mapping information, and selecting a first BH RLC channel to forward the uplink packet to based on the first field value and the second mapping information.

An additional aspect of the present disclosure provides apparatus in a central unit control plane, CU-CP, of a base station for providing Integrated Access and Backhaul, IAB, bearer mapping information, wherein the base station is configured as a donor base station for one or more IAB nodes. The apparatus comprises a processor and a memory. The memory contains instructions executable by the processor such that the apparatus is operable to transmit, to a distributed unit DU of the base station which is configured as a donor DU for one or more IAB nodes, mapping information to map one or more field values to one or more backhaul radio link control BH RLC channels between the DU and a first IAB node on a downlink path.

Another aspect of the present disclosure provides apparatus in a central unit control plane, CU-CP, of a base station for providing Integrated Access and Backhaul, IAB, mapping information, wherein the base station is configured as a donor base station for one or more IAB nodes. The apparatus comprises a processor and a memory. The memory containing instructions executable by the processor such that the apparatus is operable to transmit, to an IAB node, first mapping information to map uplink data of one or more user equipment bearers to one or more field values, and transmit, to the IAB node, second mapping information to map one or more field values to one or more backhaul radio link control BH RLC channels between the IAB node and a parent node of the IAB node.

A further aspect of the present disclosure provides apparatus in a distributed unit, DU, of a base station for providing Integrated Access and Backhaul, IAB, mapping information, wherein the base station is configured as a donor base station for one or more IAB nodes. The apparatus comprises a processor and a memory. The memory contains instructions executable by the processor such that the apparatus is operable to obtain mapping information to map one or more field values to one or more backhaul radio link control BH RLC channels between the DU and a first IAB node in a downlink path, and map a downlink packet received from a central unit user plane CU-UP of the base station to a first BH RLC channel based on a first field value in the downlink packet and the mapping information, or insert a second field value into an uplink packet to be transmitted to the CU-UP base station based on a second BH RLC on which a corresponding uplink packet was received and the mapping information.

A still further aspect of the present disclosure provides apparatus in an Integrated Access and Backhaul node for providing Integrated Access and Backhaul, IAB, mapping information, wherein the IAB node is being served by a base station configured as a donor base station for one or more IAB nodes. The apparatus comprises a processor and a memory. The memory contains instructions executable by the processor such that the apparatus is operable to obtain first mapping information to map uplink data of one or more user equipment bearers to one or more field values, obtain second mapping information to map the one or more field values to one or more backhaul radio link control BH RLC channels between the IAB node and a parent node of the IAB node, insert a first field value into an uplink packet based on a first user equipment bearer over which the uplink packet is transmitted and the first mapping information, and select a first BH RLC channel to forward the uplink packet to based on the first field value and the second mapping information.

An additional aspect of the present disclosure provides apparatus in a central unit control plane, CU-CP, of a base station for providing Integrated Access and Backhaul, IAB, bearer mapping information, wherein the base station is configured as a donor base station for one or more IAB nodes. The apparatus is configured to transmit, to a distributed unit DU of the base station which is configured as a donor DU for one or more IAB nodes, mapping information to map one or more field values to one or more backhaul radio link control BH RLC channels between the DU and a first IAB node on a downlink path.

Another aspect of the present disclosure provides apparatus in a central unit control plane, CU-CP, of a base station for providing Integrated Access and Backhaul, IAB, mapping information, wherein the base station is configured as a donor base station for one or more IAB nodes. The apparatus is configured to transmit, to an IAB node, first mapping information to map uplink data of one or more user equipment bearers to one or more field values, and transmit, to the IAB node, second mapping information to map one or more field values to one or more backhaul radio link control BH RLC channels between the IAB node and a parent node of the IAB node.

A further aspect of this disclosure provides apparatus in a distributed unit, DU, of a base station for providing Integrated Access and Backhaul, IAB, mapping information, wherein the base station is configured as a donor base station for one or more IAB nodes. The apparatus is configured to obtain mapping information to map one or more field values to one or more backhaul radio link control BH RLC channels between the DU and a first IAB node in a downlink path, and map a downlink packet received from a central unit user plane CU-UP of the base station to a first BH RLC channel based on a first field value in the downlink packet and the mapping information, or insert a second field value into an uplink packet to be transmitted to the CU-UP base station based on a second BH RLC on which a corresponding uplink packet was received and the mapping information.

A still further aspect of the present disclosure provides apparatus in an Integrated Access and Backhaul node for providing Integrated Access and Backhaul, IAB, mapping information, wherein the IAB node is being served by a base station configured as a donor base station for one or more IAB nodes. The apparatus is configured to obtain first mapping information to map uplink data of one or more user equipment bearers to one or more field values, obtain second mapping information to map the one or more field values to one or more backhaul radio link control BH RLC channels between the IAB node and a parent node of the IAB node, insert a first field value into an uplink packet based on a first user equipment bearer over which the uplink packet is transmitted and the first mapping information, and select a first BH RLC channel to forward the uplink packet to based on the first field value and the second mapping information.

BRIEF DESCRIPTION OF THE DRAWINGS

For a better understanding of examples of the present disclosure, and to show more clearly how the examples may be carried into effect, reference will now be made, by way of example only, to the following drawings in which:

FIG. 5 shows the baseline Control Plane (CP) protocol stack for IAB in Rel-16;

FIG. 12 illustrates an example of a method performed by a central unit control plane (CU-CP) of a base station for providing Integrated Access and Backhaul (IAB) mapping information;

FIG. 13 illustrates an example of a method performed by a central unit control plane (CU-CP) of a base station for providing Integrated Access and Backhaul (IAB) mapping information;

FIG. 14 illustrates an example of a method performed by a distributed unit, DU, of a base station for providing Integrated Access and Backhaul, IAB, mapping information;

FIG. 15 illustrates an example of a method performed by an Integrated Access and Backhaul node for providing Integrated Access and Backhaul, IAB, mapping information;

DETAILED DESCRIPTION

Figure 1:
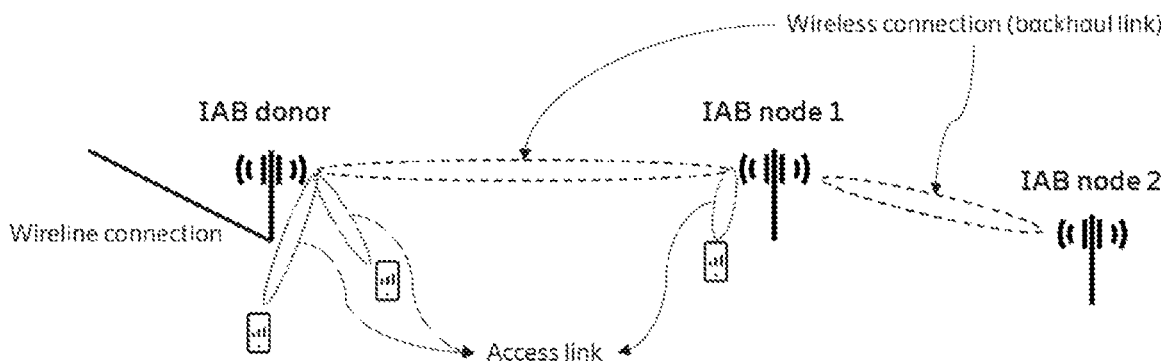
FIG. 1 illustrates an example of a multi-hop deployment in an integrated access and backhaul (IAB) network.
Figure 2:
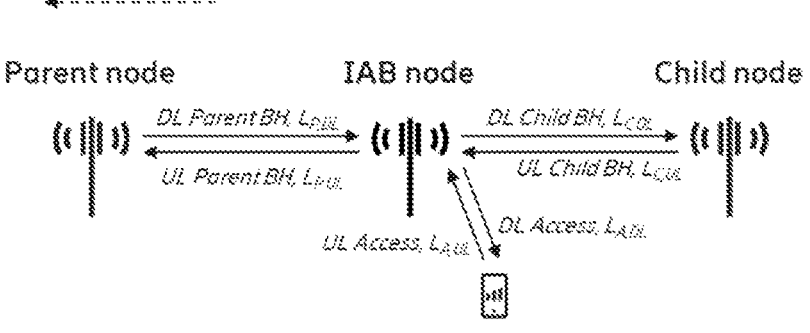
FIG. 2 illustrates an example of IAB terminology in adjacent hops.
Figure 3:
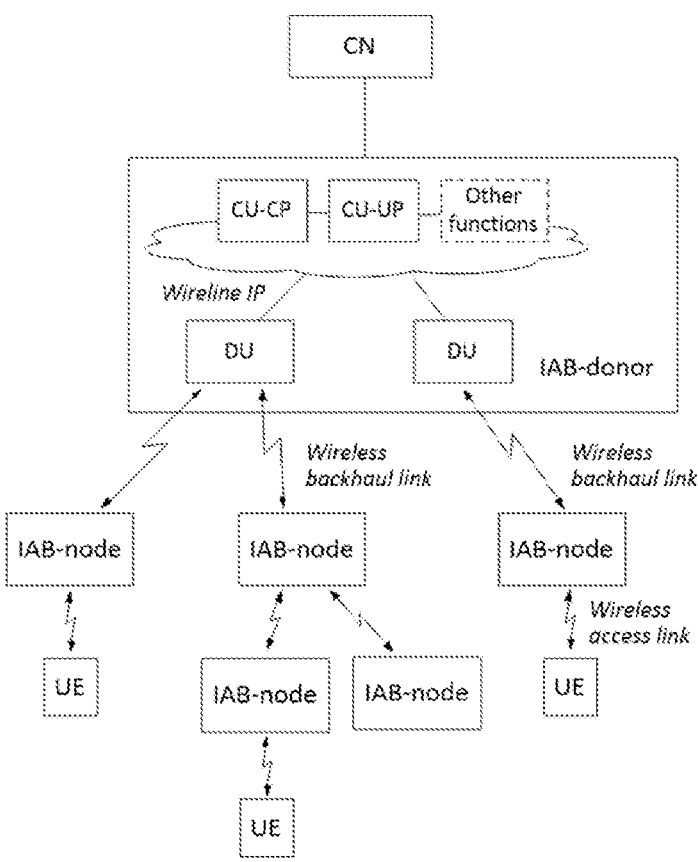
FIG. 3 illustrates an example of a reference diagram for IAB in standalone mode.
Figure 4:
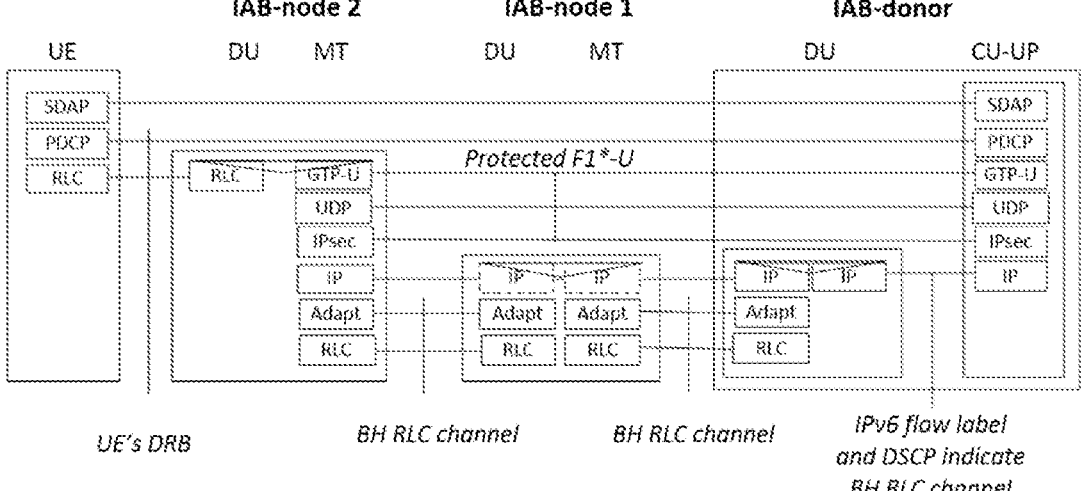
FIG. 4 shows the baseline User Plane (UP) protocol stack for IAB in Rel-16.
Figure 6:
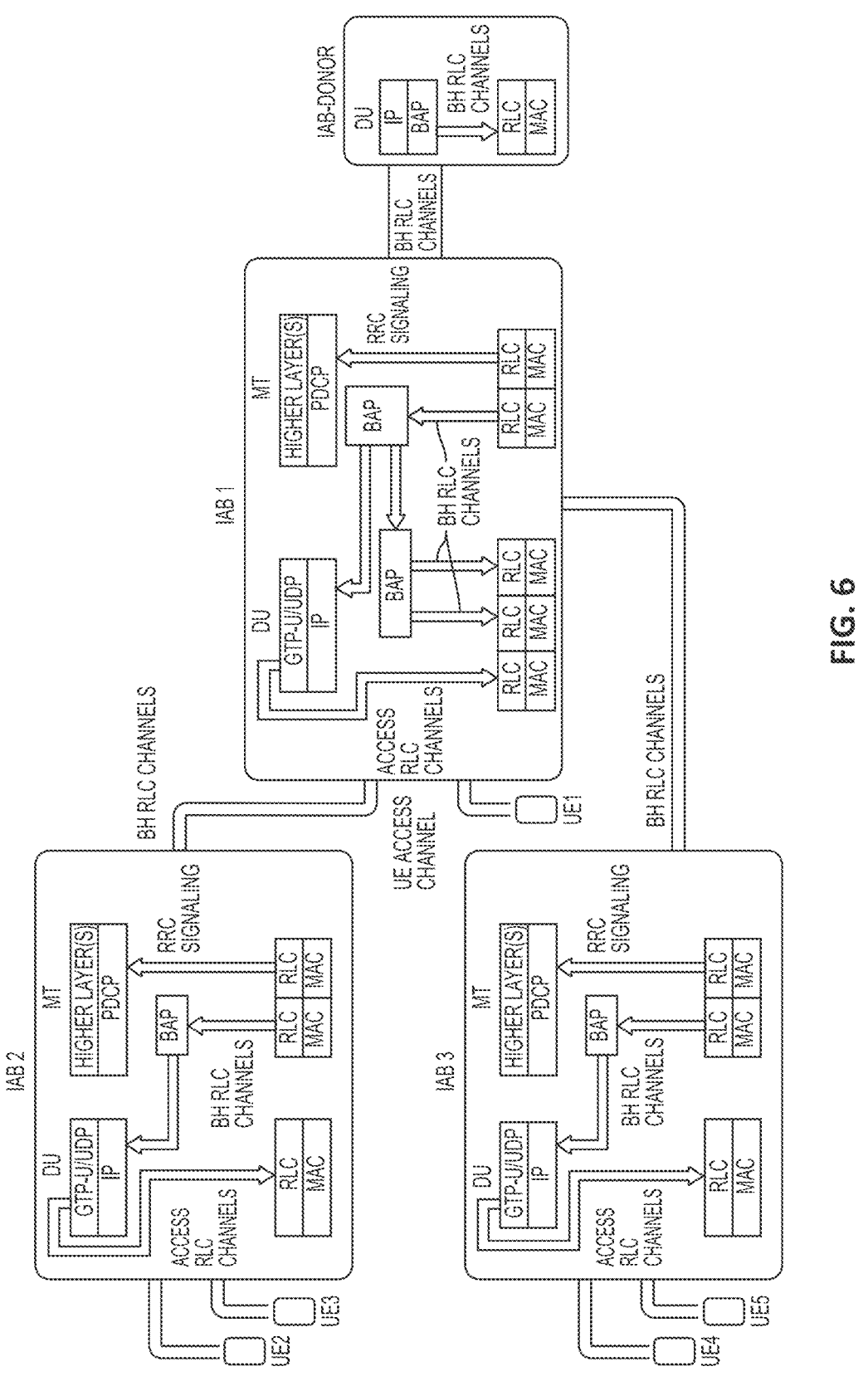
FIG. 6 shows an example of bearer mapping in IAB nodes for downstream transmission.
Figure 7:
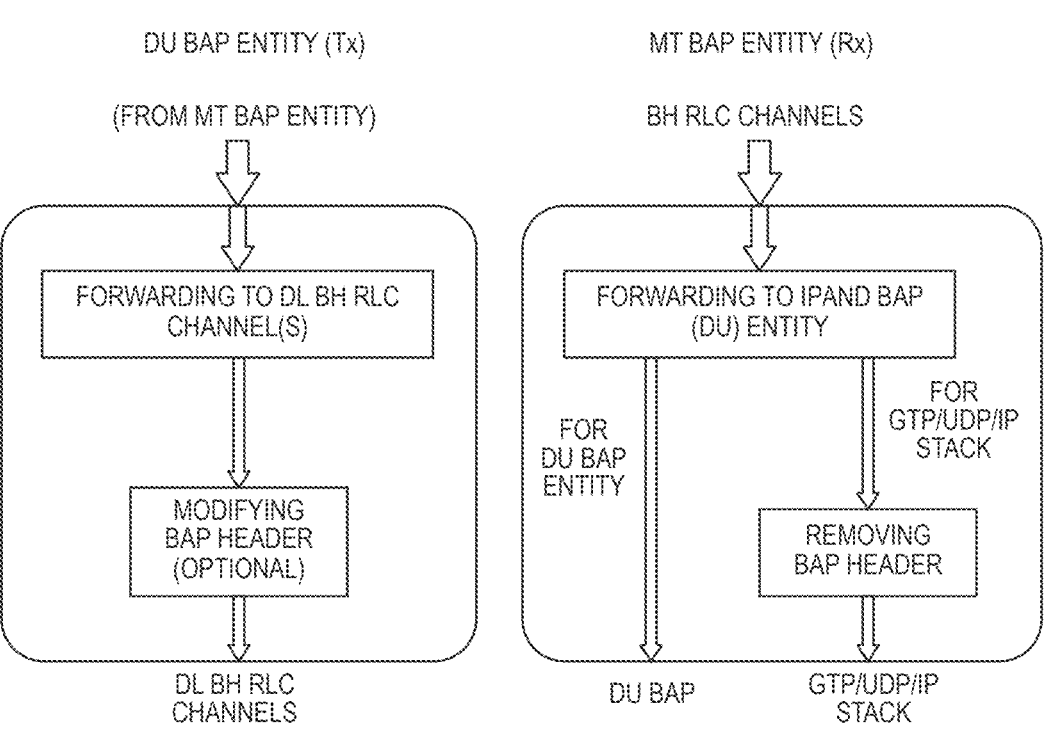
FIG. 7 shows an example of the functions performed by BAP entities for downstream transmission.
Figure 9:
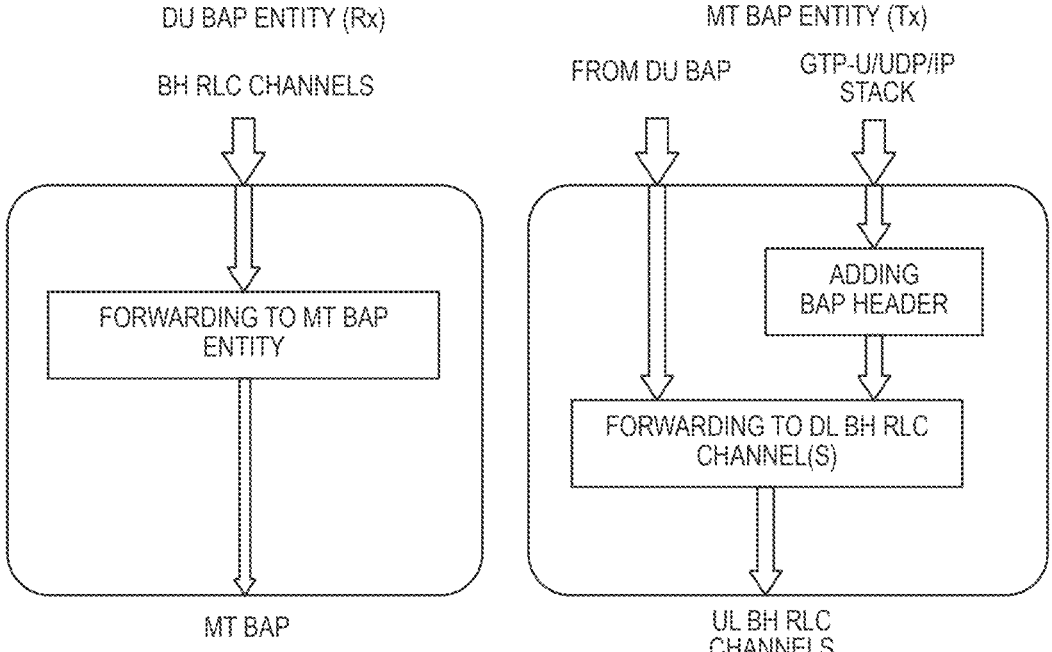
FIG. 9 shows an example of the functions performed by BAP entities for upstream transmission.
Figure 8:
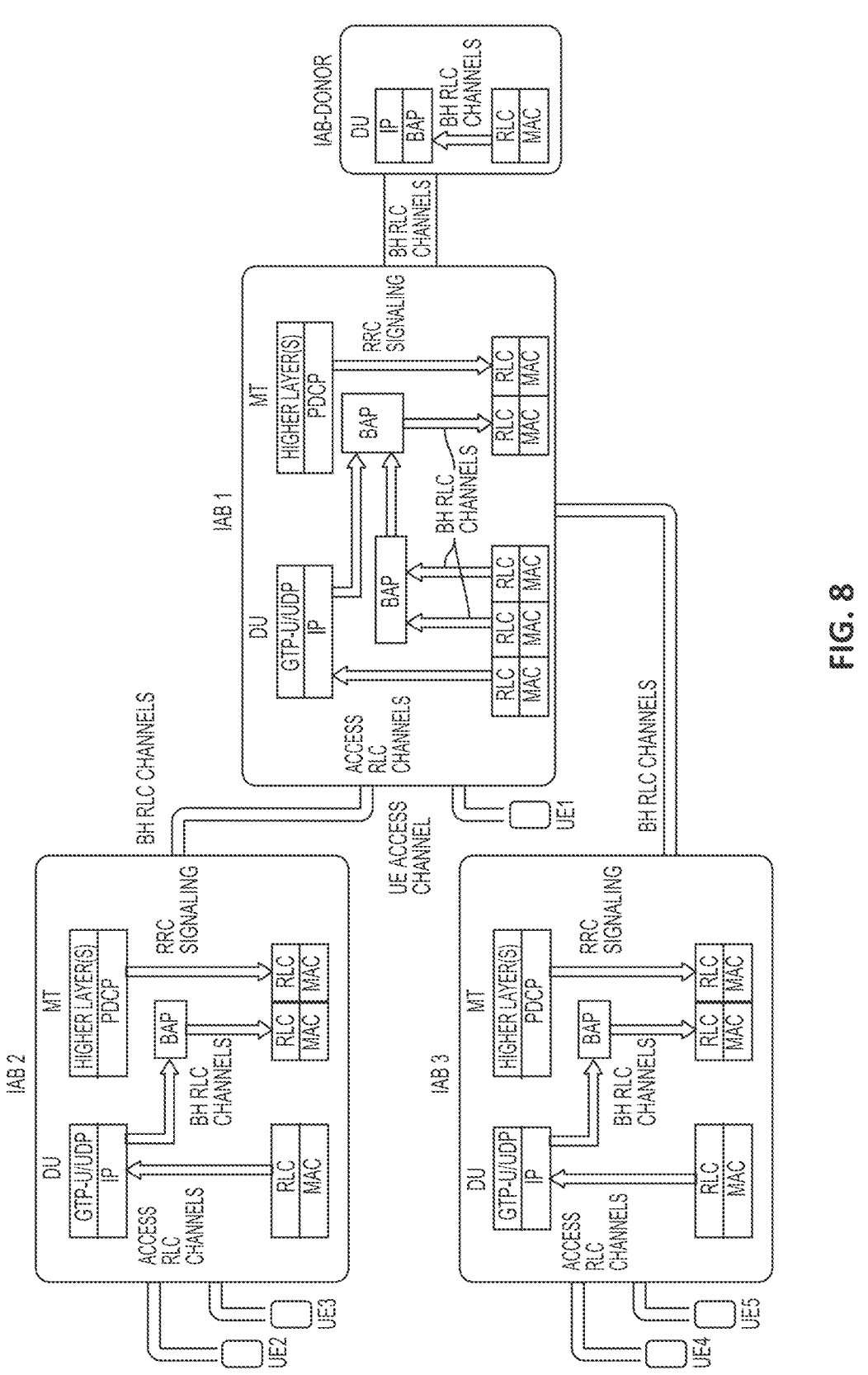
FIG. 8 shows an example of bearer mapping in IAB nodes for upstream transmission.
Figure 10:
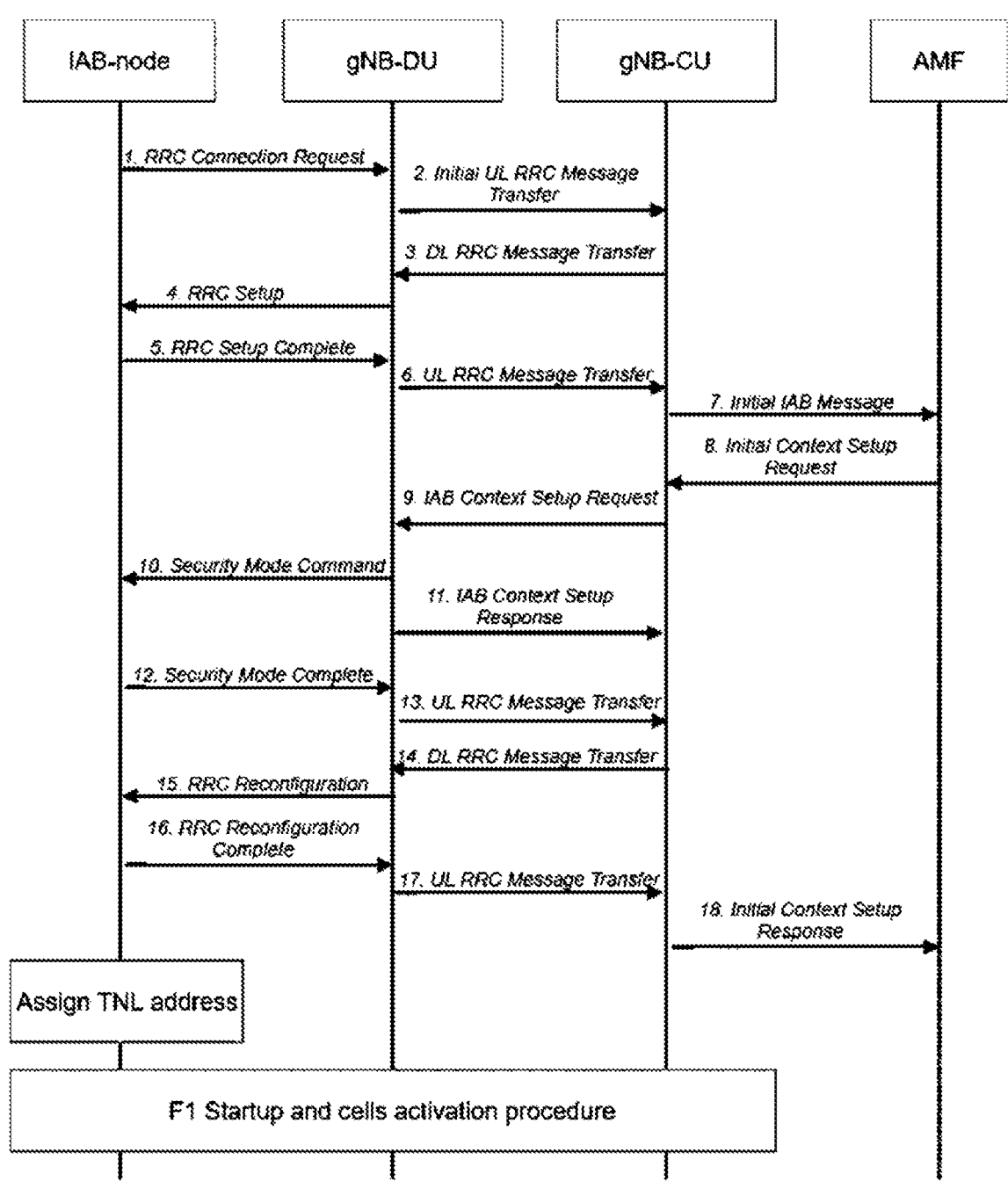
FIG. 10 which shows an example of an IAB node integration procedure.
Figure 11:
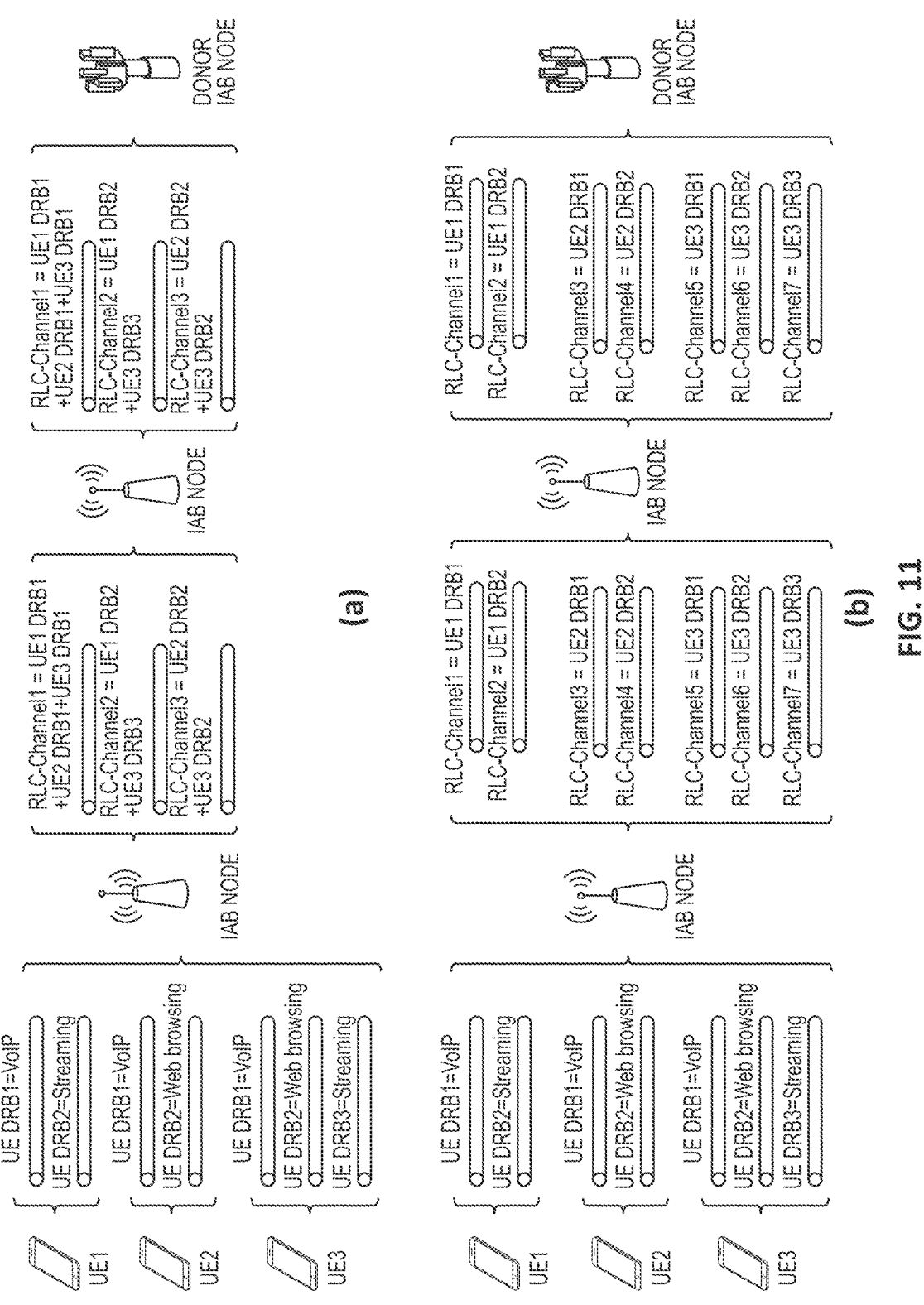
FIG. 11 shows examples of bearer mapping between UE bearers and backhaul RLC channels in IAB networks.

The following sets forth specific details, such as particular embodiments or examples for purposes of explanation and not limitation. It will be appreciated by one skilled in the art that other examples may be employed apart from these specific details. In some instances, detailed descriptions of well-known methods, nodes, interfaces, circuits, and devices are omitted so as not obscure the description with unnecessary detail. Those skilled in the art will appreciate that the functions described may be implemented in one or more nodes using hardware circuitry (e.g., analog and/or discrete logic gates interconnected to perform a specialized function, ASICs, PLAs, etc.) and/or using software programs and data in conjunction with one or more digital microprocessors or general purpose computers. Nodes that communicate using the air interface also have suitable radio communications circuitry. Moreover, where appropriate the technology can additionally be considered to be embodied entirely within any form of computer-readable memory, such as solid-state memory, magnetic disk, or optical disk containing an appropriate set of computer instructions that would cause a processor to carry out the techniques described herein.

Hardware implementation may include or encompass, without limitation, digital signal processor (DSP) hardware, a reduced instruction set processor, hardware (e.g., digital or analogue) circuitry including but not limited to application specific integrated circuit(s) (ASIC) and/or field programmable gate array(s) (FPGA(s)), and (where appropriate) state machines capable of performing such functions.

Embodiments described herein propose signaling and configurations that enable the IAB donor gNB-DU and IAB node to assign proper QoS handling of UP bearers being served via IAB nodes, whereby:

The IAB node may apply the proper DSCP/IPv6 flow label to the UL F1-U packets carrying UE bearers The IAB node may map the UL packets of UE bearers to the proper backhaul RLC channel (i.e. proper LCID) on the first upstream backhaul link from the access IAB node.

The donor DU may map the DL packets of the UE bearers to the proper backhaul RLC channel (i.e. proper LCID) on the first downstream backhaul link from the donor DU.

There are, proposed herein, various embodiments which address one or more of the issues disclosed herein.

Certain embodiments may provide one or more of the following technical advantage(s). The proposed embodiments may be essential for IAB operation, since they enable the configuration of 1:1 or N:1 bearer mapping between UE bearers and IAB backhaul RLC channels, for both UL and DL packets. Several alternatives are provided that make it possible to do so in a very flexible manner, either dynamically via F1/RRC signaling, or using static or semi-static (pre)configurations.

Some of the embodiments contemplated herein will now be described more fully with reference to the accompanying Figures. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

The terms "setup" and "configure" are used interchangeably herein:

The terms "backhaul RLC channel" and "backhaul RLC bearer" are used interchangeably herein.

The descriptions herein assume a CU-UP/CU-CP split at the donor CU. In case the donor is not split, then the functionalities described here for the CU-CP are applicable for the CU.

For the sake of simplicity, in the following, the current range of LCIDs has been assumed (1 . . . 32). When the new range is agreed upon, the new value can replace the 32 specified herein.

FIG. 12 depicts a method 1200 in accordance with particular embodiments. In particular, FIG. 12 illustrates an example of a method performed by a central unit control plane (CU-CP) of a base station (e.g. a gNB) for providing Integrated Access and Backhaul (IAB) mapping information. The base station (e.g. gNB) is configured as a donor base station (e.g. the IAB donor as described above) for one or more IAB nodes. The method begins at step 1202 with transmitting, to a distributed unit DU of the base station which is configured as a donor DU for one or more IAB node, mapping information to map one or more field values to one or more backhaul radio link control BH RLC channels between the DU and a first IAB node on a downlink path.

The one or more field values may be included in an Internet Protocol, IP, header. The one of more field values may comprise a differentiated services code point, DSCP, value. The one or more field values may comprise an IPv6 Flow Label value.

In particular, the one or more field values may be mapped many-to-one to the one or more BH RLC channels (e.g. DSCP or Flow Label x,y,z mapped to LCID y). The field values may alternatively be mapped one-to-one to the BH RLC channels (e.g. DSCP or Flow Label x mapped to LCID y). The field values may be mapped to the BH RLC channels by using the LCIDs of the BH RLC channels.

The mapping information may be transmitted using F1 signaling. Existing F1 messages may be used, or new F1 messages may be used.

In some examples, the one or more field values comprise a first field value of a first type and a second field value of a second type, and wherein the mapping information maps a combination of the first field value and the second field value to a first BH RLC channel. For example, a combination of a IPv6 Flow Label and a DSCP value may map to a single BH RLC channel.

FIG. 13 depicts a method 1300 in accordance with particular embodiments. In particular FIG. 13 illustrates an example of a method 1300 performed by a central unit control plane (CU-CP) of a base station (e.g. a gNB) for providing Integrated Access and Backhaul (IAB) mapping information. The base station (e.g. gNB) is configured as a donor base station (e.g. the IAB donor as described above) for one or more IAB nodes. The method begins at step 1302 with transmitting, to an IAB node, first mapping information to map uplink data of one or more user equipment bearers to the one or more field values. In step 1304 the method comprises transmitting, to the IAB node, second mapping information to map one or more field values to one or more backhaul radio link control BH RLC channels between the IAB node and a parent node of the IAB node.

The one or more field values may be included in an Internet Protocol, IP, header. The one of more field values may comprise a differentiated services code point, DSCP, value. The one or more field values may comprise an IPv6 Flow Label value.

In particular, the one or more field values may be mapped many-to-one to the one or more BH RLC channels. The field values may alternatively be mapped one-to-one to the BH RLC channels. The field values may be mapped to the BH RLC channels by using the LCIDs of the BH RLC channels.

The first mapping information may be transmitted using F1 signaling. Existing F1 messages may be used, or new F1 messages may be used. The second mapping information may be transmitted using RRC signalling.

In some example, the one or more field values comprise a first field value of a first type and a second field value of a second type, and wherein the second mapping information maps a combination of the first field value and the second field value to a first BH RLC channel. For example, a combination of a IPv6 Flow Label and a DSCP value may map to a single BH RLC channel.

FIG. 14 depicts a method in accordance with particular embodiments. In particular FIG. 14 illustrates an example of a method 1400 performed by a distributed unit, DU, of a base station for providing Integrated Access and Backhaul, IAB, mapping information. The base station (e.g. gNB) is configured as a donor base station (e.g. the IAB donor as described above) for one or more IAB nodes. The method begins at step 1402 with obtaining mapping information to map one or more field values to one or more backhaul radio link control BH RLC channels between the DU and a first IAB node in a downlink path. In step 1404 the method comprises mapping a downlink packet received from a central unit user plane CU-UP of the base station to a first BH RLC channel based on a first field value in the downlink packet and the mapping information. In step 1406 the method comprises inserting a second field value into an uplink packet to be transmitted to the CU-UP base station based on a second BH RLC on which a corresponding uplink packet was received and the mapping information.

Step 1402 may comprise receiving the mapping information from a central unit control plane, CU-CP, of the base station, for example, using F1 signaling. Alternatively step 1402 may comprise: receiving the mapping information from another node in the network, such as OAM node; having the mapping information configured/hard-coded in the gNB-DU; having the mapping information specified in some standard in 3 GPP or IETF.

The one or more field values may be included in an Internet Protocol, IP, header. The one of more field values may comprise a differentiated services code point, DSCP, value. The one or more field values may comprise an IPv6 Flow Label value.

In particular, the one or more field values may be mapped many-to-one to the one or more BH RLC channels. The field values may alternatively be mapped one-to-one to the BH RLC channels. The field values may be mapped to the BH RLC channels by using the LCIDs of the BH RLC channels. In some examples, the one or more field values comprises a first field value of a first type and a second field value of a second type, and the mapping information maps a combination of the first field value and the second field value to a first BH RLC channel.

In some examples, the one or more field values comprise a first field value of a first type and a second field value of a second type, and wherein the mapping information maps a combination of the first field value and the second field value to a first BH RLC channel. For example, a combination of a IPv6 Flow Label and a DSCP value may map to a single BH RLC channel.

FIG. 15 depicts a method in accordance with particular embodiments. In particular FIG. 15 illustrates an example of a method 1500 performed by an Integrated Access and Backhaul node for providing Integrated Access and Backhaul, IAB, mapping information, wherein the IAB node is being served by a base station (e.g. gNB) configured as a donor base station (e.g. the IAB donor as described above) for one or more IAB nodes. The method begins at step 1502 with obtaining first mapping information to map uplink data of one or more user equipment bearers to one or more field values. In step 1504 the method comprises obtaining second mapping information to map the one or more field values to one or more backhaul radio link control BH RLC channels between the IAB node and a parent node of the IAB node.

In step 1506 the method comprises inserting a first field value into an uplink packet based on a first user equipment bearer over which the uplink packet is transmitted and the first mapping information. In step 1508 the method comprises selecting a first BH RLC channel to forward the uplink packet to based on the first field value and the second mapping information.

In some examples the first mapping information maps the uplink data of the one or more user equipment bearers to the one or more first field values based on quality of service information relating to the user equipment bearers.

In some examples, in step 1502 or step 1504, the first or second mapping information is received from a central unit control plane of the base station, for example via F1 signaling. Alternatively, in step 1502 or step 1502, the first or second mapping information is received from a central unit user plane of the base station, for example via RRC signaling. Alternatively step 1502 or step 1504 may comprise: receiving the first or second mapping information from another node in the network, such as OAM node; having the first or second mapping information configured/hard-coded in the IAB node; having the first or second mapping information specified in some standard in 3 GPP or IETF.

Note that although we focus here mainly on how the F1 interface may be used for communicating the mapping during the MT setup phase of the IAB integration procedure via RRC signaling.

These example realizations are related to enhancements to F1-AP (TS 38.473) and RRC (TS 38.331).

Example 1

The mapping between DSCP values and LCIDs may be transmitted from the donor gNB-CU-CP to the donor gNB-DU using one of the F1 interface messages (or a new F1 message). Below, an example is given, where the F1 SETUP RESPONSE message is enhanced with the introduction of the IEs that communicate the mapping info to the donor gNB-DU (e.g. IAB QoS handling information). Another candidate F1 message for communicating such info is the GNB-CU CONFIGURATION UPDATE.

F1 Setup Response

This message may be sent by the gNB-CU to transfer information for a TNL association.

Direction: gNB-CU→gNB-DU

| IE/Group Name | Presence | Range | IE type and reference | Semantics description | Criticality | Assigned Criticality |
|---|---|---|---|---|---|---|
| Message Type | M | | 9.3.1.1 | | YES | reject |
| Transaction ID | M | | 9.3.1.23 | | YES | reject |
| gNB-CU Name | O | | PrintableString(SIZE(1 . . . 150, . . .)) | Human readable name of the gNB-CU. | YES | ignore |
| Cells to be Activated List | | . . . 1 | | | YES | reject |
| >Cells to be Activated List Item | | <maxCellingNBDU> | | List of cells to be activated | EACH | reject |
| >> NR CGI | M | | 9.3.1.12 | | — | |
| >> NR PCI | O | | INTEGER (0 . . . 1007) | Physical Cell ID | — | |
| >>gNB-CU System Information | O | | 9.3.1.42 | RRC container with system information owned by gNB-CU | YES | reject |
| >>Available PLMN List | O | | 9.3.1.65 | | YES | ignore |
| >>Extended Available PLMN List | O | | 9.3.1.76 | This is included if Available PLMN List IE is included and if more than 6 Available PLMNs is to be signalled. | YES | ignore |
| gNB-CU RRC version | M | | RRC version 9.3.1.70 | | YES | Reject |
| IAB QoS handling information | O | | 9.3.1.x | The mapping between DSCP/IPv6 Flow label and backhaul RLC channel LCIDs | | | between DRBs to DSCP/IPv6 Flow labels and mapping of DSCP/IPv6 Flow Labels to backhaul RLC Channel LCIDs, it may also be envisioned that the mapping configuration, at least in the cases when the mapping is UE-agnostic (e.g. certain QCI mapped to certain DSCP) can be configured IAB QoS Handling Information The donor gNB-CU-CP may send this information to the donor gNB-DU to indicate how the mapping from IP level information (e.g. DSCP, IP Flow Label) to LCID is to be done

| IE/Group Name | Presence | Range | IE type and reference | Semantics description |
|---|---|---|---|---|
| Transport Layer Address1 | O | | BIT STRING (SIZE(1 . . . 160, . . .)) | The Radio Network Layer is not supposed to interpret the address information. It should pass it to the |

-continued

| IE/Group Name | Presence | Range | IE type and reference | Semantics description |
|---|---|---|---|---|
| Default LCID | O | | INTEGER (1 . . . 32, . . .) | Transport Layer for interpretation. For details, see TS 38.414 Corresponds to the LogicalChannelIdentity defined in TS 38.331. |
| IAB QoS mapping information List | | 1 . . . <maxQoSMapList> | | |
| >IAB QoS mapping information List IEs | | | | |
| >>Transport Layer Address2 | O | | BIT STRING (SIZE(1 . . . 160, . . .)) | The Radio Network Layer is not supposed to interpret the address information. It should pass it to the Transport Layer for interpretation. For details, see TS 38.414 |
| >>CHOICE IAB QoS mapping information | M | | | |
| >>> IPv6 Flow Label | | | BIT STRING (20) | Represents the IPv6 Flow Label value to be used by the transport layer for the DL User Plane packets for a given DRB |
| >>> DSCP | | | BIT STRING (6) | Represents the DSCP value to be used by the transport layer for the DL User Plane packets for a given DRB |
| >>LCID | M | | INTEGER (1 . . . 32, . . .) | Corresponds to the LogicalChannelIdentity defined in TS 38.331. |

| Range bound | Explanation |
|---|---|
| maxQoSMapList | Maximum no. of IAB QoS mappings. Value is FFS. |

For the case of DSCP mapping to LCID, it may be likely that the same mapping will be used regardless of the IAB node (e.g. DSCP x always mapped to LCID y). As such, the Transport Layer Address1 and Transport Layer Address2, which are IEs for including IP address information specific to an IAB node may be omitted. But if for some reason the network wants to have different mapping to be applied for different IAB nodes, it may use these two IEs. The inclusion of the inner most IP address (i.e. Transport Layer Address2), indicates that the given mapping (i.e. DSCP to LCID) is applicable only for DL packets that have a destination IP address that is indicated in the Transport Layer Address2. The inclusion of the outer most IP address (i.e. Transport LayerAddress1), indicates that the given mapping (i.e. DSCP to LCID) is applicable for all DL packets that have a destination IP address that is indicated in the Transport LayerAddress1, unless Transport Layer Address2 is also included, in which case Transport Layer Address2 may take precedence. Thus, the mapping to be kept between DSCP and LCID may be considered to have two parts: part 1: that is applicable to a particular IAB node (i.e. IP address), and part 2: that is applicable to all IAB nodes. In other words, in some examples, the mapping information comprises first mapping information applicable to specific Internet Protocol, IP, addresses and second mapping information applicable to all IP addresses, where the IP addresses are IP addresses of destination IAB nodes.

The donor gNB-DU may uses this information in this way:

1. When a DL packet arrives, the donor gNB-DU may checks the destination IP address and the DSCP marking of that packet 2. If there is a part 1 mapping (e.g. the first mapping information) associated with the destination IP address indicated in the packet; AND there is a DSCP value matching the DSCP indicated in the packet:
   the donor will choose the LCID value from that mapping (e.g. the first mapping information).

3. If there is no part 1 mapping (e.g. first mapping information) associated with the destination IP address; OR
   If there is a part 1 mapping (first mapping information) associated with the destination IP address indicated in the packet BUT there is no DSCP value matching the DSCP indicated in the packet
   If the DSCP is included in part 2 of the mapping (e.g. the second mapping information)
   the donor will choose the LCID value from that mapping
   else (i.e. DSCP not included in that mapping (e.g. the second mapping information))
   the donor will choose an LCID value based on other rule (see below)

4. The donor gNB-DU may then encapsulate the packet in the proper BAP header corresponding to the destination IAB node and may transmit it downstream on the Backhaul RLC channel that has the chosen LCID value.

In case the indicated DSCP value was not found in both mapping tables (i.e. the first mapping information or the second mapping information), the donor will choose the LCID based on some other means (for example a default mapping). For example, a default LCID value can be associated with DSCP values not indicated in the mapping. This may be indicated in Default LCID IE in the table above or it can be a default value fixed in the 3 GPP specification. It may also be left up to network (gNB-DU) implementation.

Another way is for the gNB-DU to be configured with a DSCP to LCID mapping (e.g. default mapping) (from OAM node, hard coded, specified in the standard, etc), where this mapping is referred to as the Default Mapping Table and if no mapping info for the DSCP is found in a mapping table that is gathered from the signaling from donor gNB-CU-CP, then the donor gNB-DU may apply the mapping from the Default Mapping Table.

In other words, for the method illustrated in FIG. 14 where the downlink packet indicates a destination IP address, the method may further comprise determining whether the first mapping information comprises information associated with the destination IP address that maps the first field value; and responsive to the first mapping information comprising information associated with the destination IP address that maps the first field value to a particular BH RLC channel; selecting the particular BH RLC channel as the first BH RLC channel.

The method illustrated in FIG. 14 may then further comprise responsive to the first mapping information not comprising information associated with the destination IP address that maps the first field value, determining whether the second mapping information comprises information mapping the first field value to a particular BH RLC channel; and responsive to the second mapping information comprising information mapping the first field value to a particular BH RLC channel, selecting the particular BH RLC channel as the first BH RLC channel.

The method illustrated in FIG. 14 may then further comprise responsive to the second mapping information not comprising information mapping the first field value to a particular BH RLC channel, selecting the first BH RLC channel using a default mapping.

For the case of IPv6 flow label mapping to LCID, may be likely that a mapping will be specific to a given IAB node, as flow labels may be considered as unique identifiers of a given bearer/flow. Thus, it is likely that either the Transport Layer Address1 or Transport Layer Address2 will be included. However, a network implementation may ensure that the same flow label may be used for bearers to be mapped to the same LCID, regardless of the destination IAB node (e.g. flow label x is always to be mapped to LCID y). Thus, the Transport Layer Address1 or 2 may be omitted, or the mapping can be specified in the Default Mapping Table.

The usage of this information may be the same as is described above for the DSCP handling (i.e. find the proper LCID associated with this flow label in the mapping table, and push the data to the backhaul RLC channel with the LCID).

Since the F1 SETUP RESPONSE may be used only during the setup of an F1 connection, it could be limiting if it is the only message used to communicate such information, specifically if IAB specific mapping is to be communicated, and IP addresses are to be allocated by the donor gNB-DU (i.e. the IP address information of IAB nodes is not available at the time the F1 is being set up between the donor gNB-CU and donor gNB-DU). The GNB-CU CONFIGURATION UPDATE F1 message may therefore also be an example candidate for communicating this information (i.e. IAB QoS mapping information IE may also be introduced in the GNB-CU CONFIGURATION UPDATE message).

Example 2

This example illustrates an example for the method 1300 in the CU-CP and the method 1500 in the IAB node.

In this example, the Donor gNB-CU-CP determines/configures the IAB QoS mapping (e.g the first mapping information)

Whenever a bearer is set up or modified, the donor gNB-CU-CP may send a UE context Setup Request/UE context modification Request F1 message to the IAB node. In one realization, the donor gNB-CU-CP communicates to the IAB node the DSCP values or/and IPv6 flow labels the particular UE bearer is associated with. Example realizations are shown in the messages in the tables below.

UE Context Setup Request

| IE/Group Name | Presence | Range | IE type and reference | Semantics description | Criticality | Assigned Criticality |
|---|---|---|---|---|---|---|
| Message Type | M | | 9.3.1.1 | | YES | reject |
| gNB-CU UE F1AP ID | M | | 9.3.1.4 | | YES | reject |
| gNB-DU UE F1AP ID | O | | 9.3.1.5 | | YES | ignore |
| SpCell ID | M | | NR CGI 9.3.1.12 | Special Cell as defined in TS 38.321 [16], For handover case, this IE shall be considered as target cell. | YES | reject |
| ServCellIndex | M | | INTEGER (0 . . . 31) | | YES | reject |
| SpCell UL Configured | O | | Cell UL Configured 9.3.1.33 | | YES | ignore |
| Candidate SpCell List | | 0 . . . 1 | | | YES | ignore |
| >Candidate SpCell Item IEs | | 1 . . . <maxnoofCandidateSpCells> | | | EACH | ignore |
| >>Candidate SpCell ID | M | | NR CGI 9.3.1.12 | Special Cell as defined in TS 38.321 [16] | — | |
| CU to DU RRC Information | M | | 9.3.1.25 | | YES | reject |
| DRX Cycle | O | | DRX Cycle 9.3.1.24 | | YES | ignore |
| Resource Coordination Transfer Container | O | | OCTET STRING | Includes the MeNB Resource Coordination Information IE as | YES | ignore |

-continued

| IE/Group Name | Presence | Range | IE type and reference | Semantics description | Criticality | Assigned Criticality |
|---|---|---|---|---|---|---|
| | | | | defined in subclause 9.2.116 of TS 36.423 [9]. | | |
| SCell To Be Setup List | | 0 . . . 1 | | | YES | ignore |
| >SCell to Be Setup Item IEs | | 1 . . . <maxnoofSCells> | | | EACH | ignore |
| >>SCell ID | M | | NR CGI 9.3.1.12 | SCell Identifier in gNB | — | |
| >>SCellIndex | M | | INTEGER (1 . . . 31) | | — | |
| >>SCell UL Configured | O | | Cell UL Configured 9.3.1.33 | | — | |
| >>servingCellMO | O | | INTEGER (1 . . . 64) | | YES | ignore |
| SRB to Be Setup List | | 0 . . . 1 | | | YES | reject |
| >SRB to Be Setup Item IEs | | 1 . . . <maxnoofSRBs> | | | EACH | reject |
| >>SRB ID | M | | 9.3.1.7 | | — | |
| >>Duplication Indication | O | | ENUMERATED (true, . . . , false) | If included, it should be set to true. | YES | ignore |
| DRB to Be Setup List | | 0 . . . 1 | | | YES | reject |
| >DRB to Be Setup Item IEs | | 1 . . . <maxnoofDRBs> | | | EACH | reject |
| >>DRB ID | M | | 9.3.1.8 | | — | |
| >>> IAB QoS mapping information | O | | 9.3.1.y | The DSCP or/and IPv6 flow label to be used for the N:1 or 1:1 mapped bearers in IAB network, respectively | | |
| >>>E-UTRAN QoS | M | | 9.3.1.19 | Shall be used for EN-DC case to convey E-RAB Level QoS Parameters | — | |
| >>>DRB Information | | | | Shall be used for NG-RAN cases | YES | ignore |
| >>>>DRB QoS | M | | 9.3.1.45 | | — | |
| >>>>S-NSSAI | M | | 9.3.1.38 | | — | |
| >>>>Notification Control | O | | 9.3.1.56 | | — | |
| >>>>Flows Mapped to DRB Item | | 1 . . . <maxnoofQoSFlows> | | | — | |
| >>>>>QoS Flow Identifier | M | | 9.3.1.63 | | — | |
| >>>>>QoS Flow Level QoS Parameters | M | | 9.3.1.45 | | — | |
| >>>>>QoS Flow Mapping Indication | O | | 9.3.1.72 | | YES | ignore |
| >>UL UP TNL Information to be setup List | | | | | — | |
| >>> UL UP TNL Information to Be Setup Item IEs | | 1 . . . <maxnoofULUPTNLInformation> | | | — | |
| >>>>UL UP TNL Information | M | | UP Transport Layer Information 9.3.2.1 | gNB-CU endpoint of the F1 transport bearer. For delivery of UL PDUs. | — | |
| >> RLC Mode | M | | 9.3.1.27 | | — | |
| >> UL Configuration | O | | UL Configuraiton 9.3.1.31 | Information about UL usage in gNB-DU. | — | |
| >>Duplication Activation | O | | 9.3.1.36 | Information on the initial state of CA based UL PDCP duplication | — | |
| >> DC Based Duplication Configured | O | | ENUMERATED (true, . . . , false) | Indication on whether DC based PDCP duplication is configured or not. | YES | reject |

-continued

| IE/Group Name | Presence | Range | IE type and reference | Semantics description | Criticality | Assigned Criticality |
|---|---|---|---|---|---|---|
| | | | | If included, it should be set to true. | | |
| >>DC Based Duplication Activation | O | | Duplication Activation 9.3.1.36 | Information on the initial state of DC basedUL PDCP duplication | YES | reject |
| >>DL PDCP SN length | M | | ENUMERATED (12 bits, 18 bits, . . .) | | YES | ignore |
| >>UL PDCP SN length | O | | ENUMERATED (12 bits, 18 bits, . . .) | | YES | ignore |
| Inactivity Monitoring Request | O | | ENUMERATED (true, . . .) | | YES | reject |
| RAT-Frequency Priority Information | O | | 9.3.1.34 | | YES | reject |
| RRC-Container | O | | 9.3.1.6 | Includes the DL-DCCH-Message IE as defined in subclause 6.2 of TS 38.331 [8], encapsulated in a PDCP PDU. | YES | ignore |
| Masked IMEISV | O | | 9.3.1.55 | | YES | ignore |
| Serving PLMN | O | | PLMN ID 9.3.1.14 | Indicates the PLMN serving the UE. | YES | ignore |
| gNB-DU UE Aggregate Maximum Bit Rate Uplink | C-ifDRBSet up | | Bit Rate 9.3.1.22 | The gNB-DU UE Aggregate Maximum Bit Rate Uplink is to be enforced by the gNB-DU. | YES | ignore |
| RRC Delivery Status Request | O | | ENUMERATED (true, . . .) | Indicates whether RRC DELIVERY REPORT procedure is requested for the RRC message. | YES | ignore |
| Resource Coordination Transfer Information | O | | 9.3.1.73 | | YES | ignore |
| servingCellMO | O | | INTEGER (1 . . . 64) | | YES | ignore |

IAB QoS Mapping Information

The donor gNB-CU-CP may send this information for UEs that are being served by IAB nodes. The DU part of the IAB node will include this information in the IP header (F1-U) of the UL User Plane packets for a given DRB.

| IE/Group Name | Presence | Range | IE type and reference | Semantics description |
|---|---|---|---|---|
| CHOICE IAB QOS mapping information | M | | | |
| > IPv6 Flow Label | | | BIT STRING (20) | Represents the IPv6 Flow Label value to be used by the transport layer for the DL User Plane packets for the given DRB |
| > DSCP | | | BIT STRING (6) | Represents the DSCP value to be used by the transport layer for the DL User Plane packets for the given DRB |

In case both the IPv6 Flow label and DSCP have to be used to map a certain bearer N:1, the IAB QoS mapping information IE can be restructured as shown below:

| IE/Group Name | Presence | Range | IE type and reference | Semantics description |
| --- | --- | --- | --- | --- |
| IPv6 Flow Label | O | | BIT STRING (20) | Represents the Flow Label value to be used by the transport layer for the DL User Plane packets for the given DRB |
| DSCP | O | | BIT STRING (6) | Represents the DSCP value to be used by the transport layer for the DL User Plane packets for the given DRB |

Additional bearers may be setup or modified after the initial UE context setup using the UE Context Modification Request message. Similar enhancements like above can be made to communicate the IAB related QoS information.

9.2.2.7 UE Context Modification Request

| IE/Group Name | Presence | Range | IE type and reference | Semantics description | Criticality | Assigned Criticality |
|---|---|---|---|---|---|---|
| Message Type | M | | 9.3.1.1 | | YES | reject |
| gNB-CU UE F1AP ID | M | | 9.3.1.4 | | YES | reject |
| gNB-DU UE F1AP ID | M | | 9.3.1.5 | | YES | reject |
| SpCell ID | O | | NR CGI 9.3.1.12 | Special Cell as defined in TS 38.321 [16], For handover case, this IE shall be considered as target cell. | YES | ignore |
| ServCellIndex | O | | INTEGER (0...31) | | YES | reject |
| SpCell UL Configured | O | | Cell UL Configured 9.3.1.33 | | YES | ignore |
| DRX Cycle | O | | DRX Cycle 9.3.1.24 | | YES | ignore |
| CU to DU RRC Information | O | | 9.3.1.25 | | YES | reject |
| Transmission Stop Indicator | O | | 9.3.1.11 | | YES | ignore |
| Resource Coordination Transfer Container | O | | OCTET STRING 9.3.1.30 | Includes the MeNB Resource Coordination Information IE as defined in subclause 9.2.116 of TS 36.423 [9]. | YES | ignore |
| RRC Reconfiguration Complete Indicator | O | | | | YES | ignore |
| RRC-Container | O | | 9.3.1.6 | Includes the RRCConnectionReconfiguration message as defined in TS 38.331 [8], encapsulated in a PDCP PDU. | YES | reject |
| SCell To Be Setup List | | 0 . . . 1 | | | YES | ignore |
| >SCell to Be Setup Item IEs | | 1 . . . <maxnoofSCells> | | | EACH | ignore |
| >>SCell ID | M | | NR CGI 9.3.1.12 | SCell Identifier in gNB | — | |
| >>SCellIndex | M | | INTEGER (1...31) | | — | |
| >>SCell UL Configured | O | | Cell UL Configured 9.3.1.33 | | — | |
| >>servingCellMO | O | | INTEGER (1...64) | | YES | ignore |
| SCell To Be Removed List | | 0 . . . 1 | | | YES | ignore |
| >SCell to Be Removed Item IEs | | 1 . . . <maxnoofSCells> | | | EACH | ignore |
| >>SCell ID | M | | NR CGI 9.3.1.12 | SCell Identifier in gNB | YES | reject |
| SRB to Be Setup List | | 0 . . . 1 | | | YES | reject |
| >SRB to Be Setup Item IEs | | 1 . . . <maxnoofSRBs> | | | EACH | reject |
| >>SRB ID | M | | 9.3.1.7 | | — | |
| >>Duplication Indication | O | | ENUMERATED (true, . . . false) | | — | |
| DRB to Be Setup List | | 0 . . . 1 | | | YES | reject |
| >DRB to Be Setup Item IEs | | 1 . . . <maxnoofDRBs> | | | EACH | reject |
| >>DRB ID | M | | 9.3.1.8 | | — | |
| >>IAB QoS mapping information | O | | 9.3.1.y | The DSCP and/or IPv6 flow label to be used for the | | |

-continued

| IE/Group Name | Presence | Range | IE type and reference | Semantics description | Criticality | Assigned Criticality |
|---|---|---|---|---|---|---|
| >>>E-UTRAN QoS | M | | 9.3.1.19 | N:1 or 1:1 mapped bearers in IAB network, respectively Shall be used for EN-DC case to convey E-RAB Level QoS Parameters | YES | ignore |
| >>>DRB Information | | 1 | | Shall be used for NG-RAN cases | — | — |
| >>>>DRB QoS | M | | 9.3.1.45 | | — | — |
| >>>>S-NSSAI | M | | 9.3.1.38 | | — | — |
| >>>>Notification Control | O | | 9.3.1.56 | | — | — |
| >>>>Flows Mapped to DRB Item | | 1 . . . <maxnoofQoSFlows> | | | | |
| >>>>>QoS Flow Identifier | M | | 9.3.1.63 | | — | — |
| >>>>>QoS Flow Level QoS Parameters | M | | 9.3.1.45 | | — | — |
| >>>>QoS Flow Mapping Indication | O | | 9.3.1.72 | | YES | ignore |
| >>UL UP TNL Information to be setup List | | 1 | | | — | — |
| >>>UL UP TNL Information to Be Setup Item IEs | | 1 . . . <maxnoofULUPTNLInformation> | | | | |
| >>>>UL UP TNL Information | M | | UP Transport Layer Information 9.3.2.1 | gNB-CU endpoint of the F1 transport bearer. For delivery of UL PDUs. | — | — |
| >> RLC Mode | M | | 9.3.1.27 | | — | — |
| >>UL Configuration | O | | UL Configuration 9.3.1.31 | Information about UL usage in gNB- DU. | — | — |
| >>Duplication Activation | O | | ENUMERATED (true, . . . false) | Information on the initial state of CA based UL PDCP duplication | YES | reject |
| >> DC Based Duplication Configured | O | | Duplication Activation 9.3.1.36 | Indication on whether DC based PDCP duplication is configured or not. If included, it should be set to true. | YES | reject |
| >>DC Based Duplication Activation | O | | ENUMERATED (12 bits, 18 bits, . . .) | Information on the initial state of DC based UL PDCP duplication | YES | ignore |
| >>DL PDCP SN length | M | | ENUMERATED (12 bits, 18 bits, . . .) | | YES | ignore |
| >>UL PDCP SN length | O | | | | YES EACH | reject reject |
| DRB to Be Modified List | | 0 . . . 1 | | | | |
| >DRB to Be Modified Item IEs | | 1 . . . <maxnoofDRBs> | | | | |
| >>DRB ID | M | | 9.3.1.8 | | | |
| >> IAB QoS mapping information | O | | 9.3.1.y | The DSCP and/or IPv6 flow label to be used for the N:1 or 1:1 mapped bearers in IAB network, respectively | | |
| >>CHOICE QoS Information | O | | | | — | — |
| >>>E-UTRAN QoS | M | | 9.3.1.19 | Shall be used for EN-DC case to convey E-RAB Level QoS Parameters Shall be used for NG-RAN cases | YES | ignore |
| >>>DRB Information | | 1 | | | — | — |
| >>>>DRB QoS | M | | 9.3.1.45 | | — | — |
| >>>>S-NSSAI | M | | 9.3.1.38 | | — | — |
| >>>>Notification Control | O | | 9.3.1.56 | | — | — |
| >>>>Flows Mapped to DRB Item | | 1 . . . <maxnoofQoSFlows> | | | | |
| >>>>>QoS Flow Identifier | M | | 9.3.1.63 | | — | — |
| >>>>>QoS Flow Level QoS | M | | 9.3.1.45 | | — | — |

-continued

| IE/Group Name | Presence | Range | IE type and reference | Semantics description | Criticality | Assigned Criticality |
|---|---|---|---|---|---|---|
| Parameters | | | | | | |
| >> UL UP TNL Information to be setup List | | 0 . . . 1 | | | — | |
| >>> UL UP TNL Information to Be Setup Item IEs | | 1 . . . \<maxnoofULUPTNLInformation\> | | | — | |
| >>>>UL UP TNL Information | M | | UP Transport Layer Information 9.3.2.1 | gNB-CU endpoint of the F1 transport bearer. For delivery of UL PDUs. | — | |
| >>UL Configuration | O | | UL Configuration 9.3.1.31 | Information about UL usage in gNB- DU. | — | |
| >>DL PDCP SN length | O | | ENUMERATED(12 bits, 18 bits, . . .) | | YES | ignore |
| >>UL PDCP SN length | O | | ENUMERATED (12 bits, 18 bits, . . . ) | | YES | ignore |
| >>Bearer Type Change | O | | ENUMERATED (true, . . . ) | | YES | ignore |
| >> RLC Mode | O | | 9.3.1.27 | | YES | ignore |
| >>Duplication Activation | O | | ENUMERATED (true, . . . , false) | Information on the initial state of CA based UL PDCP duplication | YES | reject |
| >> DC Based Duplication Configured | O | | 9.3.1.36 | Indication on whether DC based PDCP duplication is configured or not. | YES | reject |
| >>DC Based Duplication Activation | O | | 9.3.1.36 | Information on the initial state of DC based UL PDCP duplication | YES | reject |
| SRB To Be Released List | | 0 . . . 1 | | | YES | reject |
| >SRB To Be Released Item IEs | | 1 . . . \<maxnoofSRBs\> | | | EACH | reject |
| >>SRB ID | M | | 9.3.1.7 | | | |
| DRB to Be Released List | | 0 . . . 1 | | | YES | reject |
| >DRB to Be Released Item IEs | | 1 . . . \<maxnoofDRBs\> | | | EACH | reject |
| >>DRB ID | M | | 9.3.1.8 | | — | |
| Inactivity Monitoring Request | O | | ENUMERATED (true, . . . ) | | YES | reject |
| RAT-Frequency Priority Information | O | | 9.3.1.34 | | YES | reject |
| DRX configuration indicator | O | | ENUMERATED(release, . . . ) | | YES | ignore |
| RLC Failure Indication | O | | 9.3.1.66 | | YES | ignore |
| Uplink TxDirectCurrentList Information | O | | 9.3.1.67 | | YES | ignore |
| GNB-DU Configuration Query | O | | ENUMERATED (true, . . . ) | Used to request the gNB-DU to provide its configuration. | YES | reject |
| gNB-DU UE Aggregate Maximum Bit Rate Uplink | O | | Bit Rate 9.3.1.22 | The gNB-DU UE Aggregate Maximum Bit Rate Uplink is to be enforced by the gNB-DU. | YES | ignore |
| Execute Duplication | O | | ENUMERATED (true, . . . ) | This IE may be sent only if duplication has been configured for the UE. | YES | ignore |
| RRC Delivery Status Request | O | | ENUMERATED (true, . . . ) | Indicates whether RRC DELIVERY REPORT procedure is requested for the RRC message. | YES | ignore |

-continued

| IE/Group Name | Presence | Range | IE type and reference | Semantics description | Criticality | Assigned Criticality |
|---|---|---|---|---|---|---|
| Resource Coordination Transfer Information | O | | 9.3.1.73 | | YES | ignore |
| servingCellMO | O | | INTEGER (1 . . . 64) | | YES | ignore |

Pre-Configured Mapping at the IAB Node (More Appropriate for the DSCP Case)

In the above (example 2), it is assumed that it was the donor gNB-CU-CP that provides the DSCP and/or the IPv6 flow label (or any other suitable field value) for each bearer (e.g. the first mapping information). However, another option is that the IAB nodes are configured with a first mapping information that is applicable to any bearer:

E-UTRA QoS (defined in Section 9.3.1.19 of TS 38.473) to DSCP and/or IPv6 flow label for E-UTRA bearers (i.e. in case the UE is connected in EN-DC)

DRB QoS (defined in Section 9.3.1.45 of TS 38.473) to DSCP and/or IPv6 flow label for NG-RAN bearers The first mapping information may be provided to the IAB nodes from the donor gNB-CU using F1 SETUP RESPONSE or GNB-CU CONFIGURATION UPDATE message. The first mapping information may also be provided to the IAB node by other means such as OAM, direct configuration (hard coded) or be a part of 3 GPP specification. It may also be envisioned that the first mapping information may be configured during the MT setup phase of the IAB integration procedure via RRC signaling (as it is applicable to all UEs, and as such can be configured even before the DU part of the IAB node is up and running).

If such a method is employed, then the donor gNB-CU-CP may not need to provide the bearer mapping information (e.g. the first mapping information) every time a bearer is setup/modified.

For DSCP mapping, it may be assumed both the gNB-CU-CP and IAB node will have the same information. However, for the IP flow, a more reasonable assumption may be for the IAB node to include that information in the setup response or in the modification response messages.

It is be noted that the E-UTRAN QoS and DRB QoS IEs contain several fields, as shown in the tables below. Thus, the above mapping between E-UTRAN QoS and DSCP mapping could be based on one or more of these parameters. In one example, it is only the QCI that is considered (i.e. the same DSCP value used for the bearers with the same QCI regardless of their Allocation and Retention Priority and GBR QoS information). In another example, all the three elements are considered. Similar handling can be considered for the mapping related to DRB QoS, where only the 5QI, or even more elements of tables 9.3.1.45 are considered in the mappings.

E-UTRAN QoS

This IE defines the QoS to be applied to a DRB for EN-DC case.

| IE/Group Name | Presence | Range | IE type and reference | Semantics description |
|---|---|---|---|---|
| QCI | M | | INTEGER (0 . . . 255) | QoS Class Identifier defined in TS 23.401 [10]. Logical range and coding specified in TS 23.203 [11]. |
| Allocation and Retention Priority | M | | 9.3.1.20 | |
| GBR QoS Information | O | | 9.3.1.21 | This IE applies to GBR bearers only and shall be ignored otherwise. |

QoS Flow Level QoS Parameters

This IE defines the QoS to be applied to a QoS flow or to a DRB.

| IE/Group Name | Presence | Range | IE type and reference | Semantics description | Criticality | Assigned Criticality |
|---|---|---|---|---|---|---|
| CHOICE QoS Characteristics | M | | | | | — |
| >Non-dynamic 5QI | | | | | | — |
| >>Non Dynamic 5QI Descriptor | M | | 9.3.1.49 | | | — |
| >Dynamic 5QI | | | | | | — |
| >>Dynamic 5QI Descriptor | M | | 9.3.1.47 | | | — |
| NG-RAN Allocation and Retention Priority | M | | 9.3.1.48 | | | — |
| GBR QoS Flow Information | O | | 9.3.1.46 | This IE shall be present for GBR QoS Flows only. | | — |
| Reflective QoS Attribute | O | | ENUMERATED (subject to, . . .) | Details in TS 23.501 [21]. This IE applies to non-GBR flows only and shall be ignored otherwise. | | — |
| PDU Session ID | O | | INTEGER (0 . . . 255) | As specified in TS 23.501 [21]. | YES | ignore |

-continued

| IE/Group Name | Presence | Range | IE type and reference | Semantics description | Criticality | Assigned Criticality |
|---|---|---|---|---|---|---|
| UL PDU Session Aggregate Maximum Bit Rate | O | | Bit Rate 9.3.1.22 | The PDU session Aggregate Maximum Bit Rate Uplink which is associated with the involved PDU session. | YES | ignore |

IAB Node Determining the Mapping (May be More Appropriate to the IPv6 Flow Label Case)

Another possibility is for the IAB node to be the one determining the first mapping information. This may be more appropriate for the IPv6 flow label mapping case, as that is the suitable approach for 1:1 mapping and a mapping is required per bearer.

In some examples, the step of obtaining the first mapping information in FIG. 15 comprises: receiving an indication from a central unit control plane, CU-CP, of the base station indicating whether uplink data of a first user equipment bearer is to be mapped one-to-one or not; and determining a first field value for the first user equipment bearer based on the indication.

For example, when a bearer is setup/modified (either in UE context setup or UE context modification procedures), the donor gNB-CU-CP can indicate if this bearer is to be mapped 1:1 or not, and the IAB node will allocate it a unique flow label and indicate that in the response message. Example enhancements for the Setup Request/Response and Modification Request/Response messages for this approach are shown below. Note that in the examples shown, the first mapping information was indicated per bearer. Another possibility is to have an IE that applies to all UE bearers, if included, that specifies all the bearers are to be mapped 1:1.

The IAB node may also be configured such that certain flows/bearers are to be mapped 1:1 (e.g. CQI values for an E-UTRA bearer, or 5QI values for NG-RAN bearers corresponding to e.g. VoIP traffic that may always need 1:1 mapping). When the IAB node receives a bearer setup/modification request, it may checks if the bearer matches the criteria that mandates 1:1 mapping. If that is the case, the IAB node may assign a flow label to it and include it in the UE CONTEXT SETUP RESPONSE or UE CONTEXT MODIFICATION RESPONSE messages. In this variant, no explicit IE indicating 1:1 mapping may be required.

For example, the step of obtaining the first mapping information in FIG. 15 may comprise determine a first field value for the first user equipment bearer based whether or not a first user equipment bearer meets one or more criteria.

UE Context Setup Request

| IE/Group Name | Presence | Range | IE type and reference | Semantics description | Criticality | Assigned Criticality |
|---|---|---|---|---|---|---|
| Message Type | M | | 9.3.1.1 | | YES | reject |
| gNB-CU UE F1AP ID | M | | 9.3.1.4 | | YES | reject |
| gNB-DU UE F1AP ID | O | | 9.3.1.5 | | YES | ignore |
| SpCell ID | M | | NR CGI 9.3.1.12 | Special Cell as defined in TS 38.321 [16]. For handover case, this IE shall be considered as target cell. | YES | reject |
| ServCellIndex | M | | INTEGER (0 . . . 31) | | YES | reject |
| SpCell UL Configured | O | | Cell UL Configured 9.3.1.33 | | YES | ignore |
| Candidate SpCell List | | 0 . . . 1 | | | YES | ignore |
| >Candidate SpCell Item IEs | | 1 . . . <maxnoofCandidateSpCells> | | | EACH | ignore |
| >>Candidate SpCell ID | M | | NR CGI 9.3.1.12 | Special Cell as defined in TS 38.321 [16] | — | |
| CU to DU RRC Information | M | | 9.3.1.25 | | YES | reject |
| DRX Cycle | O | | DRX Cycle 9.3.1.24 | | YES | ignore |
| Resource Coordination Transfer Container | O | | OCTET STRING | Includes the MeNB Resource Coordination Information IE as defined in subclause 9.2.116 of TS 36.423 [9]. | YES | ignore |

-continued

| IE/Group Name | Presence | Range | IE type and reference | Semantics description | Criticality | Assigned Criticality |
|---|---|---|---|---|---|---|
| SCell To Be Setup List | | 0 . . . 1 | | | YES | ignore |
| >SCell to Be Setup Item IEs | | 1 . . . \<maxnoofSCells> | | | EACH | ignore |
| >>SCell ID | M | | NR CGI 9.3.1.12 | SCell Identifier in gNB | — | |
| >>SCellIndex | M | | INTEGER (1 . . . 31) | | — | |
| >>SCell UL Configured | O | | Cell UL Configured 9.3.1.33 | | — | |
| >>servingCellMO | O | | INTEGER (1 . . . 64) | | YES | ignore |
| SRB to Be Setup List | | 0 . . . 1 | | | YES | reject |
| >SRB to Be Setup Item IEs | | 1 . . . \<maxnoofSRBs> | | | EACH | reject |
| >>SRB ID | M | | 9.3.1.7 | | — | |
| >>Duplication Indication | O | | ENUMERATED (true, . . . , false) | If included, it should be set to true. | YES | ignore |
| DRB to Be Setup List | | 0 . . . 1 | | | YES | reject |
| >DRB to Be Setup Item IEs | | 1 . . . \<maxnoofDRBs> | | | EACH | reject |
| >>DRB ID | M | | 9.3.1.8 | | — | |
| >>>> IAB bearer mapping | O | ENUMERATED (1-to-1, . . .) | | In IAB network, indicates whether the bearer is to be mapped one to one or not. | | |
| >>>E-UTRAN QoS | M | | 9.3.1.19 | Shall be used for EN-DC case to convey E-RAB Level QoS Parameters | — | |
| >>>DRB Information | | 1 | | Shall be used for NG-RAN cases | YES | ignore |
| >>>>DRB QoS | M | | 9.3.1.45 | | — | |
| >>>>S-NSSAI | M | | 9.3.1.38 | | — | |
| >>>>Notification Control | O | | 9.3.1.56 | | — | |
| >>>>Flows Mapped to DRB Item | | 1 . . . \<maxnoofQoSFlows> | | | — | |
| >>>>>>QoS Flow Identifier | M | | 9.3.1.63 | | — | |
| >>>>>QoS Flow Level QoS Parameters | M | | 9.3.1.45 | | — | |
| >>>>>QoS Flow Mapping Indication | O | | 9.3.1.72 | | YES | ignore |
| >>UL UP TNL Information to be setup List | | 1 | | | — | |
| >>> UL UP TNL Information to Be Setup Item IEs | | 1 . . . \<maxnoofULUPTNLInformation> | | | — | |
| >>>>UL UP TNL Information | M | | UP Transport Layer Information 9.3.2.1 | gNB-CU endpoint of the F1 transport bearer. For delivery of UL PDUs. | — | |
| >> RLC Mode | M | | 9.3.1.27 | | — | |
| >> UL Configuration | O | | UL Configuraiton 9.3.1.31 | Information about UL usage in gNB-DU. | — | |
| >>Duplication Activation | O | | 9.3.1.36 | Information on the initial state of CA based UL PDCP duplication | — | |
| >> DC Based Duplication Configured | O | | ENUMERATED (true, . . . , false) | Indication on whether DC based PDCP duplication is configured or not. If included, it should be set to true. | YES | reject |

-continued

| IE/Group Name | Presence | Range | IE type and reference | Semantics description | Criticality | Assigned Criticality |
|---|---|---|---|---|---|---|
| >>DC Based Duplication Activation | O | | Duplication Activation 9.3.1.36 | Information on the initial state of DC basedUL PDCP duplication | YES | reject |
| >>DL PDCP SN length | M | | ENUMERATED (12 bits, 18 bits, . . .) | | YES | ignore |
| >>UL PDCP SN length | O | | ENUMERATED (12 bits, 18 bits, . . .) | | YES | ignore |
| Inactivity Monitoring Request | O | | ENUMERATED (true, . . .) | | YES | reject |
| RAT-Frequency Priority Information | O | | 9.3.1.34 | | YES | reject |
| RRC-Container | O | | 9.3.1.6 | Includes the DL-DCCH-Message IE as defined in subclause 6.2 of TS 38.331 [8], encapsulated in a PDCP PDU. | YES | ignore |
| Masked IMEISV | O | | 9.3.1.55 | | YES | ignore |
| Serving PLMN | O | | PLMN ID 9.3.1.14 | Indicates the PLMN serving the UE. | YES | ignore |
| gNB-DU UE Aggregate Maximum Bit Rate Uplink | C-ifDRBSet up | | Bit Rate 9.3.1.22 | The gNB-DU UE Aggregate Maximum Bit Rate Uplink is to be enforced by the gNB-DU. | YES | ignore |
| RRC Delivery Status Request | O | | ENUMERATED (true, . . .) | Indicates whether RRC DELIVERY REPORT procedure is requested for the RRC message. | YES | ignore |
| Resource Coordination Transfer Information | O | | 9.3.1.73 | | YES | ignore |
| servingCellMO | O | | INTEGER (1 . . . 64) | | YES | ignore |

UE Context Setup Response

This message may be sent by the gNB-DU to confirm the setup of a UE context.

Direction: gNB-DU→gNB-CU.

| IE/Group Name | Presence | Range | IE type and reference | Semantics description | Criticality | Assigned Criticality |
|---|---|---|---|---|---|---|
| Message Type | M | | 9.3.1.1 | | YES | reject |
| gNB-CU UE F1AP ID | M | | 9.3.1.4 | | YES | reject |
| gNB-DU UE F1AP ID | M | | 9.3.1.5 | | YES | reject |
| DU To CU RRC Information | M | | 9.3.1.26 | | YES | reject |
| C-RNTI | O | | 9.3.1.32 | C-RNTI allocated at the gNB-DU | YES | ignore |
| Resource Coordination Transfer Container | O | | OCTET STRING | Includes the SgNB Resource Coordination Information IE as defined in subclause 9.2.117 of TS 36.423 [9]. | YES | ignore |

-continued

| IE/Group Name | Presence | Range | IE type and reference | Semantics description | Criticality | Assigned Criticality |
|---|---|---|---|---|---|---|
| Full Configuration | O | | ENUMERATED (full, . . .) | | YES | reject |
| DRB Setup List | | 0 . . . 1 | | The List of DRBs which are successfully established. | YES | ignore |
| >DRB Setup Item list | | 1 . . . <maxnoofDRBs> | | | EACH | ignore |
| >>DRB ID | M | | 9.3.1.8 | | — | |
| >>LCID | O | | 9.3.1.35 | LCID for the primary path if PDCP duplication is applied | — | |
| >> IAB QoS mapping information | O | | 9.3.1.x | The DSCP and/or IPv6 flow label to be used for the N:1 or 1:1 mapped bearers in IAB network, respectively | | |
| >>DL UP TNL Information to be setup List | | 1 | | | — | |
| >>> DL UP TNL Information to Be Setup Item IEs | | 1 . . . <maxnoofDLUPTNLInformation> | | | — | |
| >>>>DL UP TNL Information | M | | UP Transport Layer Information 9.3.2.1 | gNB-DU endpoint of the F1 transport bearer. For delivery of DL PDUs. | — | |
| SRB Failed to Setup List | | 0 . . . 1 | | | YES | ignore |
| >SRB Failed to Setup Item | | 1 . . . <maxnoofSRBs> | | | EACH | ignore |
| >>SRB ID | M | | 9.3.1.7 | | — | |
| >>Cause | O | | 9.3.1.2 | | — | |
| DRB Failed to Setup List | | 0 . . . 1 | | | YES | ignore |
| >DRB Failed to Setup Item | | 1 . . . <maxnoofDRBs> | | | EACH | ignore |
| >>DRB ID | M | | 9.3.1.8 | | — | |
| >>Cause | O | | 9.3.1.2 | | — | |
| SCell Failed To Setup List | | 0 . . . 1 | | | YES | ignore |
| >SCell Failed to Setup Item | | 1 . . . <maxnoofSCells> | | | EACH | ignore |
| >>SCell ID | M | | NR CG 9.3.1.12 | SCell Identifier in gNB | — | |
| >>Cause | O | | 9.3.1.2 | | — | |
| Inactivity Monitoring Response | O | | ENUMERATED (not-supported, . . .) | | YES | reject |
| Criticality Diagnostics | O | | 9.3.1.3 | | YES | ignore |
| SRB Setup List | | 0 . . . 1 | | | YES | ignore |
| >SRB Setup Item | | 1 . . . <maxnoofSRBs> | | | EACH | ignore |
| >>SRB ID | M | | 9.3.1.7 | | — | |
| >>LCID | M | | 9.3.1.35 | LCID for the primary path if PDCP duplication is applied | — | |

UE Context Modification Request
    This message may be sent by the gNB-CU to provide UE
Context information changes to the gNB-DU.
      Direction: gNB-CU→gNB-DU

| IE/Group Name | Presence | Range | IE type and reference | Semantics description | Criticality | Assigned Criticality |
|---|---|---|---|---|---|---|
| Message Type | M | | 9.3.1.1 | | YES | reject |
| gNB-CU UE F1AP ID | M | | 9.3.1.4 | | YES | reject |
| gNB-DU UE F1AP ID | M | | 9.3.1.5 | | YES | reject |
| SpCell ID | O | | NR CGI 9.3.1.12 | Special Cell as defined in TS 38.321 [16]. For handover case, this IE shall be considered as target cell. | YES | ignore |
| ServCellIndex | O | | INTEGER (0 . . . 31) | | YES | reject |
| SpCell UL Configured | O | | Cell UL Configured 9.3.1.33 | | YES | ignore |
| DRX Cycle | O | | DRX Cycle 9.3.1.24 | | YES | ignore |
| CU to DU RRC Information | O | | 9.3.1.25 | | YES | reject |
| Transmission Action Indicator | O | | 9.3.1.11 | | YES | ignore |
| Resource Coordination Transfer Container | O | | OCTET STRING | Includes the MeNB Resource Coordination Information IE as defined in subclause 9.2.116 of TS 36.423 [9]. | YES | ignore |
| RRC Reconfiguration Complete Indicator | O | | 9.3.1.30 | | YES | ignore |
| RRC-Container | O | | 9.3.1.6 | Includes the RRCConnectionReconfiguration message as defined in TS 38.331 [8]. encapsulated in a PDCP PDU. | YES | reject |
| SCell To Be Setup List | | 0 . . . 1 | | | YES | ignore |
| >SCell to Be Setup Item IEs | | 1 . . . <maxnoofSCells> | | | EACH | ignore |
| >>SCell ID | M | | NR CGI 9.3.1.12 | SCell Identifier in gNB | — | |
| >>SCellIndex | M | | INTEGER (1 . . . 31) | | — | |
| >>SCell UL Configured | O | | Cell UL Configured 9.3.1.33 | | — | |
| >>servingCellMO | O | | INTEGER (1 . . . 64) | | YES | ignore |
| SCell To Be Removed List | | 0 . . . 1 | | | YES | ignore |
| >SCell to Be Removed Item IEs | | 1 . . . <maxnoofSCells> | | | EACH | ignore |
| >>SCell ID | M | | NR CGI 9.3.1.12 | SCell Identifier in gNB | — | |
| SRB to Be Setup List | | 0 . . . 1 | | | YES | reject |
| >SRB to Be Setup Item IEs | | 1 . . . <maxnoofSRBs> | | | EACH | reject |
| >>SRB ID | M | | 9.3.1.7 | | — | |
| >>Duplication Indication | O | | ENUMERATED (true, . . . , false) | | — | |
| DRB to Be Setup List | | 0 . . . 1 | | | YES | reject |
| >DRB to Be Setup Item IEs | | 1 . . . <maxnoofDRBs> | | | EACH | reject |
| >>DRB ID | M | | 9.3.1.8 | | — | |
| >> IAB bearer | O | ENUMARATED | | In IAB network, | | |

-continued

| IE/Group Name | Presence | Range | IE type and reference | Semantics description | Criticality | Assigned Criticality |
|---|---|---|---|---|---|---|
| mapping | | (1-to-1, . . .) | | indicates whether the bearer is to be mapped one to one or not. | | |
| >>CHOICE QoS Information | M | | | | — | |
| >>>E-UTRAN QoS | M | | 9.3.1.19 | Shall be used for EN-DC case to convey E-RAB Level QoS Parameters | | |
| >>>DRB Information | | 1 | | Shall be used for NG-RAN cases | YES | ignore |
| >>>>DRB QoS | M | | 9.3.1.45 | | — | |
| >>>>S-NSSAI | M | | 9.3.1.38 | | — | |
| >>>>Notification Control | O | | 9.3.1.56 | | — | |
| >>>>Flows Mapped to DRB Item | | 1 . . . <maxnoofQoSFlows> | | | — | |
| >>>>>QoS Flow Identifier | M | | 9.3.1.63 | | — | |
| >>>>>QoS Flow Level QoS Parameters | M | | 9.3.1.45 | | — | |
| >>>>>QoS Flow Mapping Indication | O | | 9.3.1.72 | | YES | ignore |
| >>UL UP TNL Information to be setup List | | 1 | | | — | |
| >>>UL UP TNL Information to Be Setup Item IEs | | 1 . . . <maxnoofULUPTNLInformation> | | | — | |
| >>>>UL UP TNL Information | M | | UP Transport Layer Information 9.3.2.1 | gNB-CU endpoint of the F1 transport bearer. For delivery of UL PDUs. | — | |
| >> RLC Mode | M | | 9.3.1.27 | | — | |
| >>UL Configuration | O | | UL Configuration 9.3.1.31 | Information about UL usage in gNB-DU. | — | |
| >>Duplication Activation | O | | 9.3.1.36 | Information on the initial state of CA based UL PDCP duplication | — | |
| >> DC Based Duplication Configured | O | | ENUMERATED (true, . . . , false) | Indication on whether DC based PDCP duplication is configured or not. If included, it should be set to true. | YES | reject |
| >>DC Based Duplication Activation | O | | Duplication Activation 9.3.1.36 | Information on the initial state of DC based UL PDCP duplication | YES | reject |
| >>DL PDCP SN length | O | | ENUMERATED (12 bits, 18 bits, . . .) | | YES | ignore |
| >>UL PDCP SN length | O | | ENUMERATED (12 bits, 18 bits, . . .) | | YES | ignore |
| DRB to Be Modified List | | 0 . . . 1 | | | YES | reject |
| >DRB to Be Modified Item IEs | | 1 . . . <maxnoofDRBs> | | | EACH | reject |
| >>DRB ID | M | | 9.3.1.8 | | — | |
| >> IAB bearer mapping | O | ENUMERATED (1-to-1, . . .) | | In IAB network, indicates whether the bearer is to be mapped one to one or not. | | |
| >>CHOICE QoS Information | O | | | | — | |
| >>>E-UTRAN QoS | M | | 9.3.1.19 | Shall be used for EN-DC case to | — | |

| IE/Group Name | Presence | Range | IE type and reference | Semantics description | Criticality | Assigned Criticality |
|---|---|---|---|---|---|---|
| | | | | convey E-RAB Level QoS Parameters | | |
| >>>DRB Information | | 1 | | Shall be used for NG-RAN cases | YES | ignore |
| >>>>DRB QoS | M | | 9.3.1.45 | | — | |
| >>>>S-NSSAI | M | | 9.3.1.38 | | — | |
| >>>>Notification Control | O | | 9.3.1.56 | | — | |
| >>>>Flows Mapped to DRB Item | | 1 . . . <maxnoofQoSFlows> | | | — | |
| >>>>>QoS Flow Identifier | M | | 9.3.1.63 | | — | |
| >>>>>QoS Flow Level QoS Parameters | M | | 9.3.1.45 | | — | |
| >>>>>QoS Flow Mapping Indication | O | | 9.3.1.72 | | YES | ignore |
| >> UL UP TNL Information to be setup List | | 0 . . . 1 | | | — | |
| >>> UL UP TNL Information to Be Setup Item IEs | | 1 . . . <maxnoofULUPTNLInformation> | | | — | |
| >>>>UL UP TNL Information | M | | UP Transport Layer Information 9.3.2.1 | gNB-CU endpoint of the F1 transport bearer. For delivery of UL PDUs. | — | |
| >>UL Configuration | O | | UL Configuration 9.3.1.31 | Information about UL usage in gNB-DU. | — | |
| >>DL PDCP SN length | O | | ENUMERATED(12 bits, 18 bits , . . .) | | YES | ignore |
| >>UL PDCP SN length | O | | ENUMERATED (12 bits, 18 bits, . . .) | | YES | ignore |
| >>Bearer Type Change | O | | ENUMERATED (true, . . .) | | YES | ignore |
| >> RLC Mode | O | | 9.3.1.27 | | YES | ignore |
| >>Duplication Activation | O | | 9.3.1.36 | Information on the initial state of CA based UL PDCP duplication | YES | reject |
| >> DC Based Duplication Configured | O | | ENUMERATED (true, . . . , false) | Indication on whether DC based PDCP duplication is configured or not. | YES | reject |
| >>DC Based Duplication Activation | O | | 9.3.1.36 | Information on the initial state of DC based UL PDCP duplication | YES | reject |
| SRB To Be Released List | | 0 . . . 1 | | | YES | reject |
| >SRB To Be Released Item IEs | | 1 . . . <maxnoofSRBs> | | | EACH | reject |
| >>SRB ID | M | | 9.3.1.7 | | | |
| DRB to Be Released List | | 0 . . . 1 | | | YES | reject |
| >DRB to Be Released Item IEs | | 1 . . . <maxnoofDRBs> | | | EACH | reject |
| >>DRB ID | M | | 9.3.1.8 | | — | |
| Inactivity Monitoring Request | O | | ENUMERATED (true, . . .) | | YES | reject |
| RAT-Frequency Priority Information | O | | 9.3.1.34 | | YES | reject |
| DRX configuration indicator | O | | ENUMERATED(release, . . .) | | YES | ignore |
| RLC Failure Indication | O | | 9.3.1.66 | | YES | ignore |
| Uplink TxDirectCurrentList Information | O | | 9.3.1.67 | | YES | ignore |
| GNB-DU Configuration | O | | ENUMERATED (true, . . .) | Used to request the gNB-DU to | YES | reject |

-continued

| IE/Group Name | Presence | Range | IE type and reference | Semantics description | Criticality | Assigned Criticality |
|---|---|---|---|---|---|---|
| Query | | | | provide its configuration. | | |
| gNB-DU UE Aggregate Maximum Bit Rate Uplink | O | | Bit Rate 9.3.1.22 | The gNB-DU UE Aggregate Maximum Bit Rate Uplink is to be enforced by the gNB-DU. | YES | ignore |
| Execute Duplication | O | | ENUMERATED (true, . . .) | This IE may be sent only if duplication has been configured for the UE. | YES | ignore |
| RRC Delivery Status Request | O | | ENUMERATED (true, . . .) | Indicates whether RRC DELIVERY REPORT procedure is requested for the RRC message. | YES | ignore |
| Resource Coordination Transfer Information | O | | 9.3.1.73 | | YES | ignore |
| servingCellMO | O | | INTEGER (1 . . . 64) | | YES | ignore |
| Need for Gap | O | | ENUMERATED (true, . . .) | Indicate gap for SeNB configured measurement is requested.It only applied to NE DC scenario. | Yes | ignore |

UE Context Modification Response
    This message may be sent by the gNB-DU to confirm the modification of a UE context.
        Direction: gNB-DU→gNB-CU.

| IE/Group Name | Presence | Range | IE type and reference | Semantics description | Criticality | Assigned Criticality |
|---|---|---|---|---|---|---|
| Message Type | M | | 9.3.1.1 | | YES | reject |
| gNB-CU UE F1AP ID | M | | 9.3.1.4 | | YES | reject |
| gNB-DU UE F1AP ID | M | | 9.3.1.5 | | YES | reject |
| Resource Coordination Transfer Container | O | | OCTET STRING | Includes the SgNB Resource Coordination Information IE as defined in subclause 9.2.117 of TS 36.423 [9]. | YES | ignore |
| DU To CU RRC Information | O | | 9.3.1.26 | | YES | reject |
| DRB Setup List | | 0 . . . 1 | | The List of DRBs which are successfully established. | YES | ignore |
| >DRB Setup Item IEs | | 1 . . . <maxnoofDRBs> | | | EACH | ignore |
| >>DRB ID | M | | 9.3.1.8 | | — | |
| >>LCID | O | | 9.3.1.35 | LCID for primary path if PDCP duplication is applied | — | |
| >> IAB QoS mapping information | O | | 9.3.1.x | The DSCP and/or IPv6 flow label to be used for the N:1 or 1:1 mapped | | |

| IE/Group Name | Presence | Range | IE type and reference | Semantics description | Criticality | Assigned Criticality |
|---|---|---|---|---|---|---|
| | | | | bearers in IAB network, respectively | | |
| >>DL UP TNL Information to be setup List | | 1 | | | — | |
| >>>DL UP TNL Information to Be Setup Item IEs | | 1 . . . <maxnoofDLUPTNLInformation> | | | — | |
| >>>>DL UP TNL Information | M | | UP Transport Layer Information 9.3.2.1 | gNB-DU endpoint of the F1 transport bearer. For delivery of DL PDUs. | — | |
| DRB Modified List | | 0 . . . 1 | | The List of DRBs which are successfully modified. | YES | ignore |
| >DRB Modified Item IEs | | 1 . . . <maxnoofDRBs> | | | EACH | ignore |
| >>DRB ID | M | | 9.3.1.8 | | — | |
| >>LCID | O | | 9.3.1.35 | LCID for primary path if PDCP duplication is applied | — | |
| >> IAB QoS mapping information | O | | 9.3.1.x | The DSCP and/or IPv6 flow label to be used for the N:1 or 1:1 mapped bearers in IAB network, respectively | | |
| >>DL UP TNL Information to be setup List | | 1 | | | — | |
| >>>DL UP TNL Information to Be Setup Item IEs | | 1 . . . <maxnoofDLUPTNLInformation> | | | — | |
| >>>>DL UP TNL Information | M | | UP Transport Layer Information 9.3.2.1 | gNB-DU endpoint of the F1 transport bearer. For delivery of DL PDUs. | — | |
| >>RLC Status | O | | 9.3.1.69 | Indicates the RLC has been re-established at the gNB-DU. | YES | ignore |
| SRB Failed to be Setup List | | 0 . . . 1 | | The List of SRBs which are failed to be established. | YES | ignore |
| >SRB Failed to be Setup Item IEs | | 1 . . . <maxnoofSRBs> | | | EACH | ignore |
| >>SRB ID | M | | 9.3.1.7 | | — | |
| >>Cause | O | | 9.3.1.2 | | — | |
| DRB Failed to be Setup List | | 0 . . . 1 | | The List of DRBs which are failed to be setup. | YES | ignore |
| >DRB Failed to be Setup Item IEs | | 1 . . . <maxnoofDRBs> | | | EACH | ignore |
| >>DRB ID | M | | 9.3.1.8 | | — | |
| >>Cause | O | | 9.3.1.2 | | — | |
| SCell Failed To Setup List | | 0 . . . 1 | | | YES | ignore |

| IE/Group Name | Presence | Range | IE type and reference | Semantics description | Criticality | Assigned Criticality |
|---|---|---|---|---|---|---|
| >SCell Failed to Setup Item | | 1 . . . <maxnoofSCells> | | | EACH | ignore |
| >>SCell ID | M | | NR CGI 9.3.1.12 | SCell Identifier in gNB | — | |
| >>Cause | O | | 9.3.1.2 | | — | |
| DRB Failed to be Modified List | | 0 . . . 1 | | The List of DRBs which are failed to be modified. | YES | ignore |
| >DRB Failed to be Modified Item IEs | | 1 . . . <maxnoofDRBs> | | | EACH | ignore |
| >>DRB ID | M | | 9.3.1.8 | | — | |
| >>Cause | O | | 9.3.1.2 | | — | |
| Inactivity Monitoring Response | O | | ENUMERATED (Not-supported, . . .) | | YES | reject |
| Criticality Diagnostics | O | | 9.3.1.3 | | YES | ignore |
| C-RNTI | O | | 9.3.1.32 | C-RNTI allocated at the gNB-DU | YES | ignore |
| Associated SCell List | O | | 9.3.1.77 | | YES | ignore |
| SRB Setup List | | 0 . . . 1 | | | YES | ignore |
| >SRB Setup Item | | 1 . . . <maxnoofSRBs> | | | EACH | ignore |
| >>SRB ID | M | | 9.3.1.7 | | — | |
| >>LCID | M | | 9.3.1.35 | LCID for the primary path if PDCP duplication is applied | — | |
| SRB Modified List | | 0 . . . 1 | | | YES | ignore |
| >SRB Modified Item | | 1 . . . <maxnoofSRBs> | | | EACH | ignore |
| >>SRB ID | M | | 9.3.1.7 | | — | |
| >>LCID | M | | 9.3.1.35 | LCID for the primary path if PDCP duplication is applied | — | |

It should be noted that a combination of many of the above approaches and embodiments are possible. For example, the DSCP may be be indicated from the CU-CP to the IAB node in the request messages for N:1 mapped bearers, while the IPv6 flow label is indicated from the IAB node to the CU-CP in the response messages for 1:1 mapped bearers.

It should be noted that it is also possible to apply a similar approach in the UE CONTEXT MODIFICATION REQUIRED and UE CONTEXT MODIFICATION CONFIRM messages How the IAB Node Maps Bearers to the LCID on the First UL Backhaul Link Based on the indication from the CU-CP or pre-configuration or IAB node determination, the DU part of the IAB node may mark the IP header of the F1-U packets corresponding to the UE bearers with the proper DSCP and/or the IPv6 Flow Label. The MT part of the IAB node may then use the DSCP and/or the IPv6 Flow Label to determine to which backhaul channel (i.e. LCID) the F1-U packets have to be forwarded to. Note that the LCID information in the UE Context Setup Response and UE Context Modification Response are referring to the LCID of the RLC channel between the UE and the IAB node, and not referring to Backhaul RLC channels.

The MT part of the IAB node may be configured about the second mapping information from DSCP and/or IPv6 Flow Label to LCID in a manner similar to the way the donor gNB-DU is configured, for example, by a message from the donor gNB-CU-CP. However, the MT part of the IAB node is controlled by RRC and not by F1, thus the exact same message may not be able to be used, even though the mapping structure will be similar. Thus, one example approach is for the gNB-CU-CP to convey this information (e.g. the second mapping information) in an RRCReconfiguration message. This can be done:

During the MT setup procedure (i.e. first RRCReconfiguration during the integration procedure). This may be suitable for the N:1 mapping aspect that is applicable to all UE bearers (e.g. E-UTRA QCI and NG-RAN QCI mapping to DSCP)

Using any subsequent RRCReconfiguration message towards the MT (this is suitable mainly for 1:1 mapping case, i.e. IPv6 flow label to LCID mapping).

The radioBearerConfig IE in the RRCReconfiguration may be the IE used to configure bearers, and as such, may be a suitable container where the second mapping information from DSCP/IPv6 flow label to LCID can be configured. Alternatively, the second mapping information, especially for the case of N:1 mapping, may be communicated in an IE directly under RRCReconfiguration (e.g. not bearer specific).

The second mapping information for the MT may comprise a table that specifies which DSCP/IPv6 flow label (s) is to be mapped to which LCID. For example, this second mapping information may comprise entries like LCID 1: {DSCP1, DSCP2}, LCID 2: {DSCP3}, LCID 3: {DSCP4}, . . . LCID y:{every DSCP that is not indicated in the table.}.

Apart from configuration from the CU-CP, especially for the N:1 mapping case, the MT part of the IAB node may be pre-configured, just like the donor DU as described above, with the DSCP to LCID mapping (e.g. the second mapping information) or the second mapping information may be communicated to the MT part of the IAB node from another node (e.g. OAM).

Yet another option is for the gNB-CU-CP to configure the IAB DU with the second mapping information (e.g. by including the backhaul LCID information in the UE Context Setup Request and UE Context Modification Request messages, where the IAB QoS mapping IE also contains the Backhaul RLC channel LCID). Then the DU part of the IAB node may internally communicate the second mapping information to the MT part of the IAB node.

Another possibility is to use reflective mapping at the IAB node. That is, the IAB node may see on what LCID the bearer is received on the last backhaul link, and it may map the UL packets of the same bearer on the same LCID. This may significantly reduce the signaling changes required to set up proper bearer mapping, but it assumes that a DL packet arrives first before an UL packet has to be sent, which is not necessarily true (e.g. UE connection was set up for the sake of sending UL packets). One way of handling this may be to send a dummy DL packet for every UE bearer that is being served by an IAB node, from which the IAB node may learn the IAB QoS mapping to be applied for that bearer. This bearer can have a special marking (e.g. in the F1-U, i.e. GTP/UDP/IP header), indicating that it is not intended to the UE and can be dropped after the IAB node has obtained the second mapping information from it.

Other Aspects

Note that the in case of the IPv6 Flow Label assigned by the gNB-CU-CP (e.g. 1:1 mapping), the gNB-CU-CP may have to ensure the uniqueness of the Flow Label within a given IAB node. In case the IAB node can be accessed via multiple paths and has multiple IP addresses associated with each path, the uniqueness of the flow label may be maintained only within one of the IP addresses (i.e. the uniqueness is per a given path to the IAB node).

In the case of the IPv6 Flow Label assigned by the IAB node, the IAB node may have to ensure that it a given Flow Label is not used for more than one bearer (this is also per IP address, i.e. if an IAB node has more than one IP address, the IAB node may reuse the same Flow Label for a bearer as long as the bearers using the same label do not have their F1-U terminated at the same IP address).

Another aspect is that the IAB network can be used for other non-UE traffic that is also transported via backhaul RLC channels. For example, this could be OAM traffic or any other IP traffic that is being backhauled by the IAB network. The network may like to reserve some flow labels or even DSCP values for some of this traffic. For example, IAB can be used to backhaul traffic belonging to Gunfire Location detector system, which is a system that detects and conveys the location of gunfire or other weapon fire using acoustic, optical, or potentially other types of sensors, as well as a combination of such sensors. Such systems are currently deployed in major metropolitan US cities. Considering the importance of conveying such information as quickly and as reliably as possible, the operator can reserve a DSCP value for such services that shouldn't be used for UE bearers. Thus, it is beneficial to communicate to the node assigning the DSCP and/or IPv6 Flow Labels if there are some exceptions regarding which values cannot be assigned to a given UE bearer.

There are several alternatives on how this can be conveyed in the IAB network:

In case the gNB-CU-CP is the one deciding the mapping:
The gNB-CU-CP may be pre-configured with a list of exceptions (i.e. DSCP or IPv6 Flow Labels that cannot be assigned for UE bearers)
The gNB-CU-CP may be (dynamically) configured by OAM with the exceptions
In case the IAB node is the one deciding the mapping:
The IAB node may be pre-configured with a list of exceptions
The IAB node may be (dynamically) configured with a list of exceptions e.g via OAM
The IAB node may be (dynamically) configured with a list of exceptions by the gNB-CU-CP via F1/RRC signaling.

In the above, instead of exceptions, the list can convey a list of values that can be used (e.g. list of DSCP values that can be associated with UE bearers).

Figure 16:
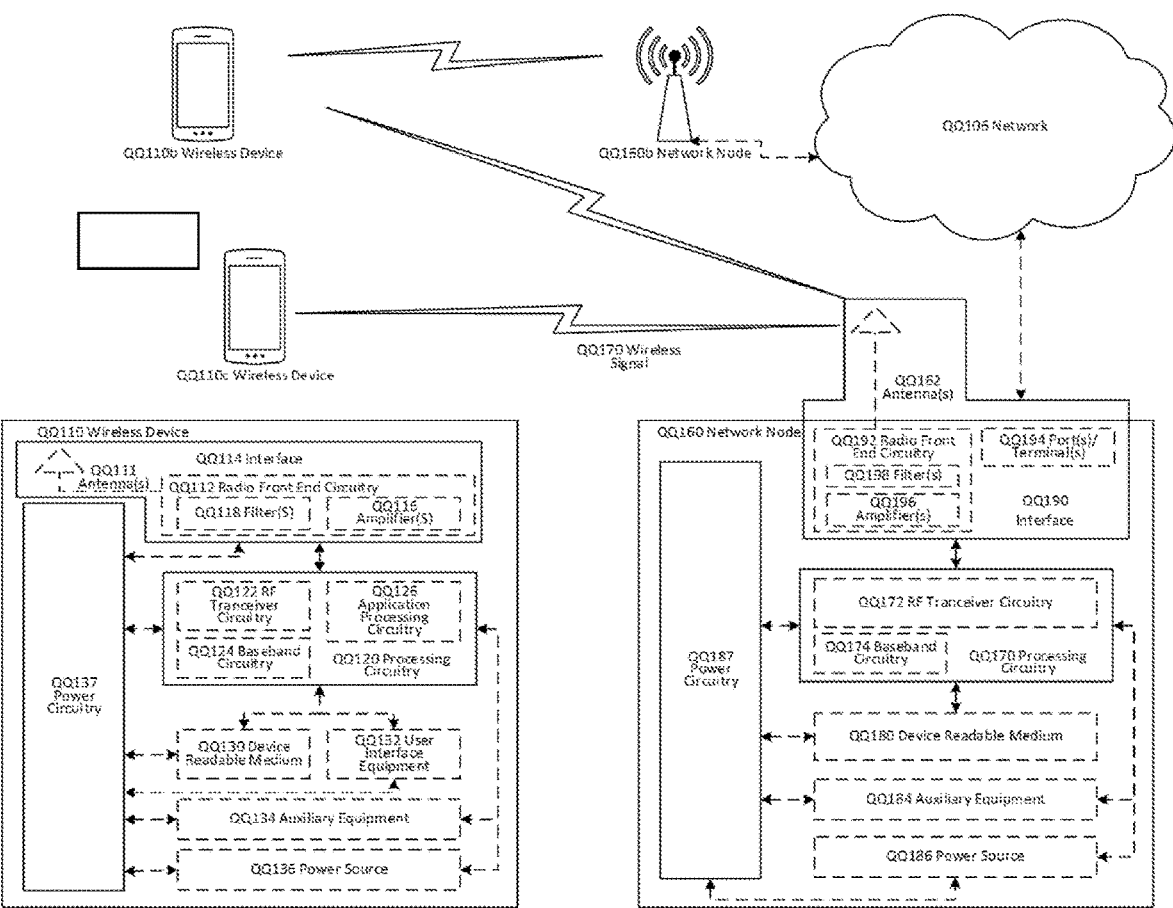
FIG. 16 shows an example of a wireless network in accordance with some embodiments.

Although the subject matter described herein may be implemented in any appropriate type of system using any suitable components, the embodiments disclosed herein are described in relation to a wireless network, such as the example wireless network illustrated in FIG. 16. For simplicity, the wireless network of FIG. 16 only depicts network QQ106, network nodes QQ160 and QQ160*b*, and WDs QQ110, QQ110*b*, and QQ110*c*. In practice, a wireless network may further include any additional elements suitable to support communication between wireless devices or between a wireless device and another communication device, such as a landline telephone, a service provider, or any other network node or end device. Of the illustrated components, network node QQ160 and wireless device (WD) QQ110 are depicted with additional detail. The wireless network may provide communication and other types of services to one or more wireless devices to facilitate the wireless devices' access to and/or use of the services provided by, or via, the wireless network. The network nodes QQ160 and QQ160*b* may comprise gNBs comprising a CU-CP and a CU-UP as described above. In particular, the network nodes may be connected to IAB nodes in a chain as illustrated in FIG. 1.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3 G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network QQ106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node QQ160 and WD QQ110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 16, network node QQ160 includes processing circuitry QQ170, device readable medium QQ180, interface QQ190, auxiliary equipment QQ184, power source QQ186, power circuitry QQ187, and antenna QQ162. Although network node QQ160 illustrated in the example wireless network of FIG. 16 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node QQ160 are depicted as single boxes located within a larger box, or nested within multiple boxes, in practice, a network node may comprise multiple different physical components that make up a single illustrated component (e.g., device readable medium QQ180 may comprise multiple separate hard drives as well as multiple RAM modules).

Similarly, network node QQ160 may be composed of multiple physically separate components (e.g., a NodeB component and a RNC component, or a BTS component and a BSC component, etc.), which may each have their own respective components. In certain scenarios in which network node QQ160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node QQ160 may be configured to support multiple radio access technologies (RATs). In such embodiments, some components may be duplicated (e.g., separate device readable medium QQ180 for the different RATs) and some components may be reused (e.g., the same antenna QQ162 may be shared by the RATs). Network node QQ160 may also include multiple sets of the various illustrated components for different wireless technologies integrated into network node QQ160, such as, for example, GSM, WCDMA, LTE, NR, WiFi, or Bluetooth wireless technologies. These wireless technologies may be integrated into the same or different chip or set of chips and other components within network node QQ160.

Processing circuitry QQ170 is configured to perform any determining, calculating, or similar operations (e.g., certain obtaining operations) described herein as being provided by a network node. These operations performed by processing circuitry QQ170 may include processing information obtained by processing circuitry QQ170 by, for example, converting the obtained information into other information, comparing the obtained information or converted information to information stored in the network node, and/or performing one or more operations based on the obtained information or converted information, and as a result of said processing making a determination.

Processing circuitry QQ170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node QQ160 components, such as device readable medium QQ180, network node QQ160 functionality. For example, processing circuitry QQ170 may execute instructions stored in device readable medium QQ180 or in memory within processing circuitry QQ170. Such functionality may include providing any of the various wireless features, functions, or benefits discussed herein. In some embodiments, processing circuitry QQ170 may include a system on a chip (SOC).

In some embodiments, processing circuitry QQ170 may include one or more of radio frequency (RF) transceiver circuitry QQ172 and baseband processing circuitry QQ174. In some embodiments, radio frequency (RF) transceiver circuitry QQ172 and baseband processing circuitry QQ174 may be on separate chips (or sets of chips), boards, or units, such as radio units and digital units. In alternative embodiments, part or all of RF transceiver circuitry QQ172 and baseband processing circuitry QQ174 may be on the same chip or set of chips, boards, or units In certain embodiments, some or all of the functionality described herein as being provided by a network node, base station, eNB or other such network device may be performed by processing circuitry QQ170 executing instructions stored on device readable medium QQ180 or memory within processing circuitry QQ170. In alternative embodiments, some or all of the functionality may be provided by processing circuitry QQ170 without executing instructions stored on a separate or discrete device readable medium, such as in a hard-wired manner. In any of those embodiments, whether executing instructions stored on a device readable storage medium or not, processing circuitry QQ170 can be configured to perform the described functionality. The benefits provided by such functionality are not limited to processing circuitry QQ170 alone or to other components of network node QQ160, but are enjoyed by network node QQ160 as a whole, and/or by end users and the wireless network generally.

Device readable medium QQ180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry QQ170. Device readable medium QQ180 may store any suitable instructions, data or information, including a computer program, software, an application including one or more of logic, rules, code, tables, etc. and/or other instructions capable of being executed by processing circuitry QQ170 and, utilized by network node QQ160. Device readable medium QQ180 may be used to store any calculations made by processing circuitry QQ170 and/or any data received via interface QQ190. In some embodiments, processing circuitry QQ170 and device readable medium QQ180 may be considered to be integrated.

Interface QQ190 is used in the wired or wireless communication of signalling and/or data between network node QQ160, network QQ106, and/or WDs QQ110. As illustrated, interface QQ190 comprises port(s)/terminal(s) QQ194 to send and receive data, for example to and from network QQ106 over a wired connection. Interface QQ190 also includes radio front end circuitry QQ192 that may be coupled to, or in certain embodiments a part of, antenna QQ162. Radio front end circuitry QQ192 comprises filters QQ198 and amplifiers QQ196. Radio front end circuitry QQ192 may be connected to antenna QQ162 and processing circuitry QQ170. Radio front end circuitry may be configured to condition signals communicated between antenna QQ162 and processing circuitry QQ170. Radio front end circuitry QQ192 may receive digital data that is to be sent out to other network nodes or WDs via a wireless connection. Radio front end circuitry QQ192 may convert the digital data into a radio signal having the appropriate channel and bandwidth parameters using a combination of filters QQ198 and/or amplifiers QQ196. The radio signal may then be transmitted via antenna QQ162. Similarly, when receiving data, antenna QQ162 may collect radio signals which are then converted into digital data by radio front end circuitry QQ192. The digital data may be passed to processing circuitry QQ170. In other embodiments, the interface may comprise different components and/or different combinations of components.

In certain alternative embodiments, network node QQ160 may not include separate radio front end circuitry QQ192, instead, processing circuitry QQ170 may comprise radio front end circuitry and may be connected to antenna QQ162 without separate radio front end circuitry QQ192. Similarly, in some embodiments, all or some of RF transceiver circuitry QQ172 may be considered a part of interface QQ190. In still other embodiments, interface QQ190 may include one or more ports or terminals QQ194, radio front end circuitry QQ192, and RF transceiver circuitry QQ172, as part of a radio unit (not shown), and interface QQ190 may communicate with baseband processing circuitry QQ174, which is part of a digital unit (not shown).

Antenna QQ162 may include one or more antennas, or antenna arrays, configured to send and/or receive wireless signals. Antenna QQ162 may be coupled to radio front end circuitry QQ190 and may be any type of antenna capable of transmitting and receiving data and/or signals wirelessly. In some embodiments, antenna QQ162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna QQ162 may be separate from network node QQ160 and may be connectable to network node QQ160 through an interface or port.

Antenna QQ162, interface QQ190, and/or processing circuitry QQ170 may be configured to perform any receiving operations and/or certain obtaining operations described herein as being performed by a network node. Any information, data and/or signals may be received from a wireless device, another network node and/or any other network equipment. Similarly, antenna QQ162, interface QQ190, and/or processing circuitry QQ170 may be configured to perform any transmitting operations described herein as being performed by a network node. Any information, data and/or signals may be transmitted to a wireless device, another network node and/or any other network equipment.

Power circuitry QQ187 may comprise, or be coupled to, power management circuitry and is configured to supply the components of network node QQ160 with power for performing the functionality described herein. Power circuitry QQ187 may receive power from power source QQ186. Power source QQ186 and/or power circuitry QQ187 may be configured to provide power to the various components of network node QQ160 in a form suitable for the respective components (e.g., at a voltage and current level needed for each respective component). Power source QQ186 may either be included in, or external to, power circuitry QQ187 and/or network node QQ160. For example, network node QQ160 may be connectable to an external power source (e.g., an electricity outlet) via an input circuitry or interface such as an electrical cable, whereby the external power source supplies power to power circuitry QQ187. As a further example, power source QQ186 may comprise a source of power in the form of a battery or battery pack which is connected to, or integrated in, power circuitry QQ187. The battery may provide backup power should the external power source fail. Other types of power sources, such as photovoltaic devices, may also be used.

Alternative embodiments of network node QQ160 may include additional components beyond those shown in FIG.

16 that may be responsible for providing certain aspects of the network node's functionality, including any of the functionality described herein and/or any functionality necessary to support the subject matter described herein. For example, network node QQ160 may include user interface equipment to allow input of information into network node QQ160 and to allow output of information from network node QQ160. This may allow a user to perform diagnostic, maintenance, repair, and other administrative functions for network node QQ160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3 GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3 GPP context be referred to as an MTC device. As one particular example, the WD may be a UE implementing the 3 GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device QQ110 includes antenna QQ111, interface QQ114, processing circuitry QQ120, device readable medium QQ130, user interface equipment QQ132, auxiliary equipment QQ134, power source QQ136 and power circuitry QQ137. WD QQ110 may include multiple sets of one or more of the illustrated components for different wireless technologies supported by WD QQ110, such as, for example, GSM, WCDMA, LTE, NR, WiFi, WiMAX, or Bluetooth wireless technologies, just to mention a few. These wireless technologies may be integrated into the same or different chips or set of chips as other components within WD QQ110.

Antenna QQ111 may include one or more antennas or antenna arrays, configured to send and/or receive wireless signals, and is connected to interface QQ114. In certain alternative embodiments, antenna QQ111 may be separate from WD QQ110 and be connectable to WD QQ110 through an interface or port. Antenna QQ111, interface QQ114, and/or processing circuitry QQ120 may be configured to perform any receiving or transmitting operations described herein as being performed by a WD. Any information, data and/or signals may be received from a network node and/or another WD. In some embodiments, radio front end circuitry and/or antenna QQ111 may be considered an interface.

As illustrated, interface QQ114 comprises radio front end circuitry QQ112 and antenna QQ111. Radio front end circuitry QQ112 comprise one or more filters QQ118 and amplifiers QQ116. Radio front end circuitry QQ114 is connected to antenna QQ111 and processing circuitry QQ120, and is configured to condition signals communicated between antenna QQ111 and processing circuitry QQ120. Radio front end circuitry QQ112 may be coupled to or a part of antenna QQ111. In some embodiments, WD QQ110 may not include separate radio front end circuitry QQ112; rather, processing circuitry QQ120 may comprise radio front end circuitry and may be connected to antenna QQ111. Similarly, in some embodiments, some or all of RF transceiver circuitry QQ122 may be considered a part of interface QQ114. Radio front end circuitry QQ112 may receive digital data that is to be sent out to other network nodes or WDs via a wireless connection. Radio front end circuitry QQ112 may convert the digital data into a radio signal having the appropriate channel and bandwidth parameters using a combination of filters QQ118 and/or amplifiers QQ116. The radio signal may then be transmitted via antenna QQ111. Similarly, when receiving data, antenna QQ111 may collect radio signals which are then converted into digital data by radio front end circuitry QQ112. The digital data may be passed to processing circuitry QQ120. In other embodiments, the interface may comprise different components and/or different combinations of components.

Processing circuitry QQ120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD QQ110 components, such as device readable medium QQ130, WD QQ110 functionality. Such functionality may include providing any of the various wireless features or benefits discussed herein. For example, processing circuitry QQ120 may execute instructions stored in device readable medium QQ130 or in memory within processing circuitry QQ120 to provide the functionality disclosed herein.

As illustrated, processing circuitry QQ120 includes one or more of RF transceiver circuitry QQ122, baseband processing circuitry QQ124, and application processing circuitry QQ126. In other embodiments, the processing circuitry may comprise different components and/or different combinations of components. In certain embodiments processing circuitry QQ120 of WD QQ110 may comprise a SOC. In some embodiments, RF transceiver circuitry QQ122, baseband processing circuitry QQ124, and application processing circuitry QQ126 may be on separate chips or sets of chips. In alternative embodiments, part or all of baseband processing circuitry QQ124 and application processing circuitry QQ126 may be combined into one chip or set of chips, and RF transceiver circuitry QQ122 may be on a separate chip or set of chips. In still alternative embodiments, part or all of RF transceiver circuitry QQ122 and baseband processing circuitry QQ124 may be on the same chip or set of chips, and application processing circuitry QQ126 may be on a separate chip or set of chips. In yet other alternative embodiments, part or all of RF transceiver circuitry QQ122, baseband processing circuitry QQ124, and application processing circuitry QQ126 may be combined in the same chip or set of chips. In some embodiments, RF transceiver circuitry QQ122 may be a part of interface QQ114. RF transceiver circuitry QQ122 may condition RF signals for processing circuitry QQ120.

In certain embodiments, some or all of the functionality described herein as being performed by a WD may be provided by processing circuitry QQ120 executing instructions stored on device readable medium QQ130, which in certain embodiments may be a computer-readable storage medium. In alternative embodiments, some or all of the functionality may be provided by processing circuitry QQ120 without executing instructions stored on a separate or discrete device readable storage medium, such as in a hard-wired manner. In any of those particular embodiments, whether executing instructions stored on a device readable storage medium or not, processing circuitry QQ120 can be configured to perform the described functionality. The benefits provided by such functionality are not limited to processing circuitry QQ120 alone or to other components of WD QQ110, but are enjoyed by WD QQ110 as a whole, and/or by end users and the wireless network generally.

Processing circuitry QQ120 may be configured to perform any determining, calculating, or similar operations (e.g., certain obtaining operations) described herein as being performed by a WD. These operations, as performed by processing circuitry QQ120, may include processing information obtained by processing circuitry QQ120 by, for example, converting the obtained information into other information, comparing the obtained information or converted information to information stored by WD QQ110, and/or performing one or more operations based on the obtained information or converted information, and as a result of said processing making a determination.

Device readable medium QQ130 may be operable to store a computer program, software, an application including one or more of logic, rules, code, tables, etc. and/or other instructions capable of being executed by processing circuitry QQ120. Device readable medium QQ130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry QQ120. In some embodiments, processing circuitry QQ120 and device readable medium QQ130 may be considered to be integrated.

User interface equipment QQ132 may provide components that allow for a human user to interact with WD QQ110. Such interaction may be of many forms, such as visual, audial, tactile, etc. User interface equipment QQ132 may be operable to produce output to the user and to allow the user to provide input to WD QQ110. The type of interaction may vary depending on the type of user interface equipment QQ132 installed in WD QQ110. For example, if WD QQ110 is a smart phone, the interaction may be via a touch screen; if WD QQ110 is a smart meter, the interaction may be through a screen that provides usage (e.g., the number of gallons used) or a speaker that provides an audible alert (e.g., if smoke is detected). User interface equipment QQ132 may include input interfaces, devices and circuits, and output interfaces, devices and circuits. User interface equipment QQ132 is configured to allow input of information into WD QQ110, and is connected to processing circuitry QQ120 to allow processing circuitry QQ120 to process the input information. User interface equipment QQ132 may include, for example, a microphone, a proximity or other sensor, keys/buttons, a touch display, one or more cameras, a USB port, or other input circuitry. User interface equipment QQ132 is also configured to allow output of information from WD QQ110, and to allow processing circuitry QQ120 to output information from WD QQ110. User interface equipment QQ132 may include, for example, a speaker, a display, vibrating circuitry, a USB port, a headphone interface, or other output circuitry. Using one or more input and output interfaces, devices, and circuits, of user interface equipment QQ132, WD QQ110 may communicate with end users and/or the wireless network, and allow them to benefit from the functionality described herein.

Auxiliary equipment QQ134 is operable to provide more specific functionality which may not be generally performed by WDs. This may comprise specialized sensors for doing measurements for various purposes, interfaces for additional types of communication such as wired communications etc. The inclusion and type of components of auxiliary equipment QQ134 may vary depending on the embodiment and/or scenario.

Power source QQ136 may, in some embodiments, be in the form of a battery or battery pack. Other types of power sources, such as an external power source (e.g., an electricity outlet), photovoltaic devices or power cells, may also be used. WD QQ110 may further comprise power circuitry QQ137 for delivering power from power source QQ136 to the various parts of WD QQ110 which need power from power source QQ136 to carry out any functionality described or indicated herein. Power circuitry QQ137 may in certain embodiments comprise power management circuitry. Power circuitry QQ137 may additionally or alternatively be operable to receive power from an external power source; in which case WD QQ110 may be connectable to the external power source (such as an electricity outlet) via input circuitry or an interface such as an electrical power cable. Power circuitry QQ137 may also in certain embodiments be operable to deliver power from an external power source to power source QQ136. This may be, for example, for the charging of power source QQ136. Power circuitry QQ137 may perform any formatting, converting, or other modification to the power from power source QQ136 to make the power suitable for the respective components of WD QQ110 to which power is supplied.

Figure 17:
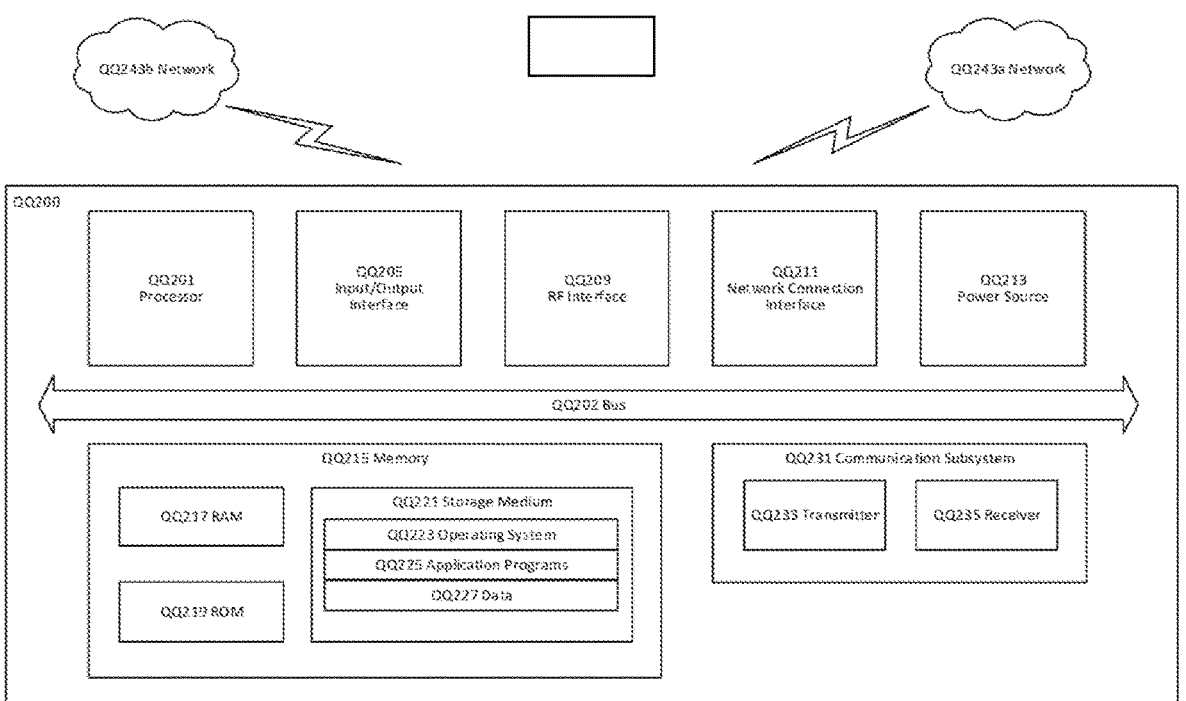
FIG. 17 shows an example of a User Equipment (UE) in accordance with some embodiments.

FIG. 17 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE QQ200 may be any UE identified by the $3^{rd}$ Generation Partnership Project (3 GPP), including a NB-IoT UE, a machine type communication (MTC) UE, and/or an enhanced MTC (eMTC) UE. UE QQ200, as illustrated in FIG. 17, is one example of a WD configured for communication in accordance with one or more communication standards promulgated by the $3^{rd}$ Generation Partnership Project (3 GPP), such as 3 GPP's GSM, UMTS, LTE, and/or 5G standards. As mentioned previously, the term WD and UE may be used interchangeable. Accordingly, although FIG. 17 is a UE, the components discussed herein are equally applicable to a WD, and vice-versa.

In FIG. 17, UE QQ200 includes processing circuitry QQ201 that is operatively coupled to input/output interface QQ205, radio frequency (RF) interface QQ209, network connection interface QQ211, memory QQ215 including random access memory (RAM) QQ217, read-only memory (ROM) QQ219, and storage medium QQ221 or the like, communication subsystem QQ231, power source QQ233, and/or any other component, or any combination thereof. Storage medium QQ221 includes operating system QQ223, application program QQ225, and data QQ227. In other embodiments, storage medium QQ221 may include other similar types of information. Certain UEs may utilize all of the components shown in FIG. 17, or only a subset of the components. The level of integration between the components may vary from one UE to another UE. Further, certain UEs may contain multiple instances of a component, such as multiple processors, memories, transceivers, transmitters, receivers, etc.

In FIG. 17, processing circuitry QQ201 may be configured to process computer instructions and data. Processing circuitry QQ201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry QQ201 may include two central processing units (CPUs). Data may be information in a form suitable for use by a computer.

In the depicted embodiment, input/output interface QQ205 may be configured to provide a communication interface to an input device, output device, or input and output device. UE QQ200 may be configured to use an output device via input/output interface QQ205. An output device may use the same type of interface port as an input device. For example, a USB port may be used to provide input to and output from UE QQ200. The output device may be a speaker, a sound card, a video card, a display, a monitor, a printer, an actuator, an emitter, a smartcard, another output device, or any combination thereof. UE QQ200 may be configured to use an input device via input/output interface QQ205 to allow a user to capture information into UE QQ200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 17, RF interface QQ209 may be configured to provide a communication interface to RF components such as a transmitter, a receiver, and an antenna. Network connection interface QQ211 may be configured to provide a communication interface to network QQ243a. Network QQ243a may encompass wired and/or wireless networks such as a local-area network (LAN), a wide-area network (WAN), a computer network, a wireless network, a telecommunications network, another like network or any combination thereof. For example, network QQ243a may comprise a W-Fi network. Network connection interface QQ211 may be configured to include a receiver and a transmitter interface used to communicate with one or more other devices over a communication network according to one or more communication protocols, such as Ethernet, TCP/IP, SONET, ATM, or the like. Network connection interface QQ211 may implement receiver and transmitter functionality appropriate to the communication network links (e.g., optical, electrical, and the like). The transmitter and receiver functions may share circuit components, software or firmware, or alternatively may be implemented separately.

RAM QQ217 may be configured to interface via bus QQ202 to processing circuitry QQ201 to provide storage or caching of data or computer instructions during the execution of software programs such as the operating system, application programs, and device drivers. ROM QQ219 may be configured to provide computer instructions or data to processing circuitry QQ201. For example, ROM QQ219 may be configured to store invariant low-level system code or data for basic system functions such as basic input and output (I/O), startup, or reception of keystrokes from a keyboard that are stored in a non-volatile memory. Storage medium QQ221 may be configured to include memory such as RAM, ROM, programmable read-only memory (PROM), erasable programmable read-only memory (EPROM), electrically erasable programmable read-only memory (EE-PROM), magnetic disks, optical disks, floppy disks, hard disks, removable cartridges, or flash drives. In one example, storage medium QQ221 may be configured to include operating system QQ223, application program QQ225 such as a web browser application, a widget or gadget engine or another application, and data file QQ227. Storage medium QQ221 may store, for use by UE QQ200, any of a variety of various operating systems or combinations of operating systems.

Storage medium QQ221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium QQ221 may allow UE QQ200 to access computer-executable instructions, application programs or the like, stored on transitory or non-transitory memory media, to off-load data, or to upload data. An article of manufacture, such as one utilizing a communication system may be tangibly embodied in storage medium QQ221, which may comprise a device readable medium.

In FIG. 17, processing circuitry QQ201 may be configured to communicate with network QQ243*b* using communication subsystem QQ231. Network QQ243*a* and network QQ243*b* may be the same network or networks or different network or networks. Communication subsystem QQ231 may be configured to include one or more transceivers used to communicate with network QQ243*b*. For example, communication subsystem QQ231 may be configured to include one or more transceivers used to communicate with one or more remote transceivers of another device capable of wireless communication such as another WD, UE, or base station of a radio access network (RAN) according to one or more communication protocols, such as IEEE 802.11, CDMA, WCDMA, GSM, LTE, UTRAN, WiMax, or the like. Each transceiver may include transmitter QQ233 and/ or receiver QQ235 to implement transmitter or receiver functionality, respectively, appropriate to the RAN links (e.g., frequency allocations and the like). Further, transmitter QQ233 and receiver QQ235 of each transceiver may share circuit components, software or firmware, or alternatively may be implemented separately.

In the illustrated embodiment, the communication functions of communication subsystem QQ231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem QQ231 may include cellular communication, Wi-Fi communication, Bluetooth communication, and GPS communication. Network QQ243*b* may encompass wired and/or wireless networks such as a local-area network (LAN), a wide-area network (WAN), a computer network, a wireless network, a telecommunications network, another like network or any combination thereof. For example, network QQ243*b* may be a cellular network, a Wi-Fi network, and/or a near-field network. Power source QQ213 may be configured to provide alternating current (AC) or direct current (DC) power to components of UE QQ200.

The features, benefits and/or functions described herein may be implemented in one of the components of UE QQ200 or partitioned across multiple components of UE QQ200. Further, the features, benefits, and/or functions described herein may be implemented in any combination of hardware, software or firmware. In one example, communication subsystem QQ231 may be configured to include any of the components described herein. Further, processing circuitry QQ201 may be configured to communicate with any of such components over bus QQ202. In another example, any of such components may be represented by program instructions stored in memory that when executed by processing circuitry QQ201 perform the corresponding functions described herein. In another example, the functionality of any of such components may be partitioned between processing circuitry QQ201 and communication subsystem QQ231. In another example, the non-computationally intensive functions of any of such components may be implemented in software or firmware and the computationally intensive functions may be implemented in hardware.

Figure 18:
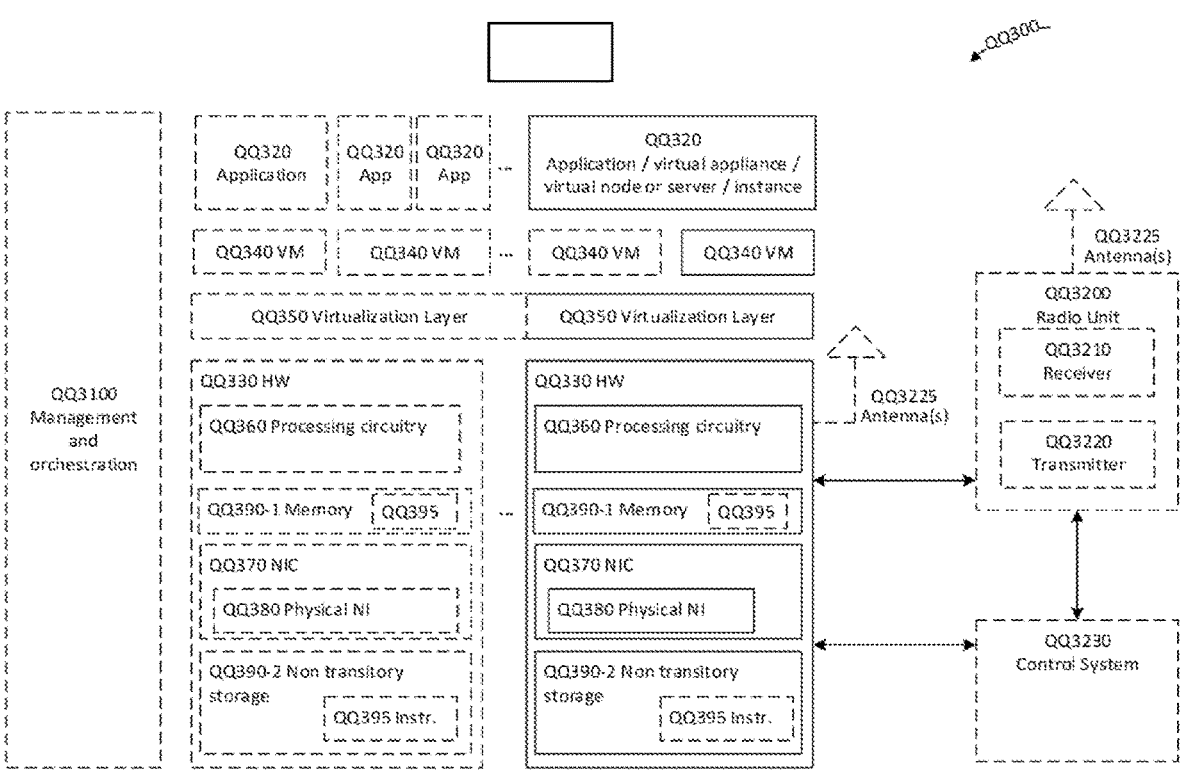
FIG. 18 is a schematic block diagram illustrating a virtualization environment in accordance with some embodiments.

FIG. 18 is a schematic block diagram illustrating a virtualization environment QQ300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments QQ300 hosted by one or more of hardware nodes QQ330. Further, in embodiments in which the virtual node is not a radio access node or does not require radio connectivity (e.g., a core network node), then the network node may be entirely virtualized.

The functions may be implemented by one or more applications QQ320 (which may alternatively be called software instances, virtual appliances, network functions, virtual nodes, virtual network functions, etc.) operative to implement some of the features, functions, and/or benefits of some of the embodiments disclosed herein. Applications QQ320 are run in virtualization environment QQ300 which provides hardware QQ330 comprising processing circuitry QQ360 and memory QQ390. Memory QQ390 contains instructions QQ395 executable by processing circuitry QQ360 whereby application QQ320 is operative to provide one or more of the features, benefits, and/or functions disclosed herein.

Virtualization environment QQ300, comprises general-purpose or special-purpose network hardware devices QQ330 comprising a set of one or more processors or processing circuitry QQ360, which may be commercial off-the-shelf (COTS) processors, dedicated Application Specific Integrated Circuits (ASICs), or any other type of processing circuitry including digital or analog hardware components or special purpose processors. Each hardware device may comprise memory QQ390-1 which may be non-persistent memory for temporarily storing instructions QQ395 or software executed by processing circuitry QQ360. Each hardware device may comprise one or more network interface controllers (NICs) QQ370, also known as network interface cards, which include physical network interface QQ380. Each hardware device may also include non-transitory, persistent, machine-readable storage media QQ390-2 having stored therein software QQ395 and/or instructions executable by processing circuitry QQ360. Software QQ395 may include any type of software including software for instantiating one or more virtualization layers QQ350 (also referred to as hypervisors), software to execute virtual machines QQ340 as well as software allowing it to execute functions, features and/or benefits described in relation with some embodiments described herein.

Virtual machines QQ340, comprise virtual processing, virtual memory, virtual networking or interface and virtual storage, and may be run by a corresponding virtualization layer QQ350 or hypervisor. Different embodiments of the instance of virtual appliance QQ320 may be implemented on one or more of virtual machines QQ340, and the implementations may be made in different ways.

During operation, processing circuitry QQ360 executes software QQ395 to instantiate the hypervisor or virtualization layer QQ350, which may sometimes be referred to as a virtual machine monitor (VMM). Virtualization layer QQ350 may present a virtual operating platform that appears like networking hardware to virtual machine QQ340.

As shown in FIG. 18, hardware QQ330 may be a standalone network node with generic or specific components. Hardware QQ330 may comprise antenna QQ3225 and may implement some functions via virtualization. Alternatively, hardware QQ330 may be part of a larger cluster of hardware (e.g. such as in a data center or customer premise equipment (CPE)) where many hardware nodes work together and are managed via management and orchestration (MANO) QQ3100, which, among others, oversees lifecycle management of applications QQ320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine QQ340 may be a software implementation of a physical machine that runs programs as if they were executing on a physical, non-virtualized machine. Each of virtual machines QQ340, and that part of hardware QQ330 that executes that virtual machine, be it hardware dedicated to that virtual machine and/or hardware shared by that virtual machine with others of the virtual machines QQ340, forms a separate virtual network elements (VNE).

Still in the context of NFV, Virtual Network Function (VNF) is responsible for handling specific network functions that run in one or more virtual machines QQ340 on top of hardware networking infrastructure QQ330 and corresponds to application QQ320 in FIG. 18.

In some embodiments, one or more radio units QQ3200 that each include one or more transmitters QQ3220 and one or more receivers QQ3210 may be coupled to one or more antennas QQ3225. Radio units QQ3200 may communicate directly with hardware nodes QQ330 via one or more appropriate network interfaces and may be used in combination with the virtual components to provide a virtual node with radio capabilities, such as a radio access node or a base station.

In some embodiments, some signalling can be effected with the use of control system QQ3230 which may alternatively be used for communication between the hardware nodes QQ330 and radio units QQ3200.

Figure 19:
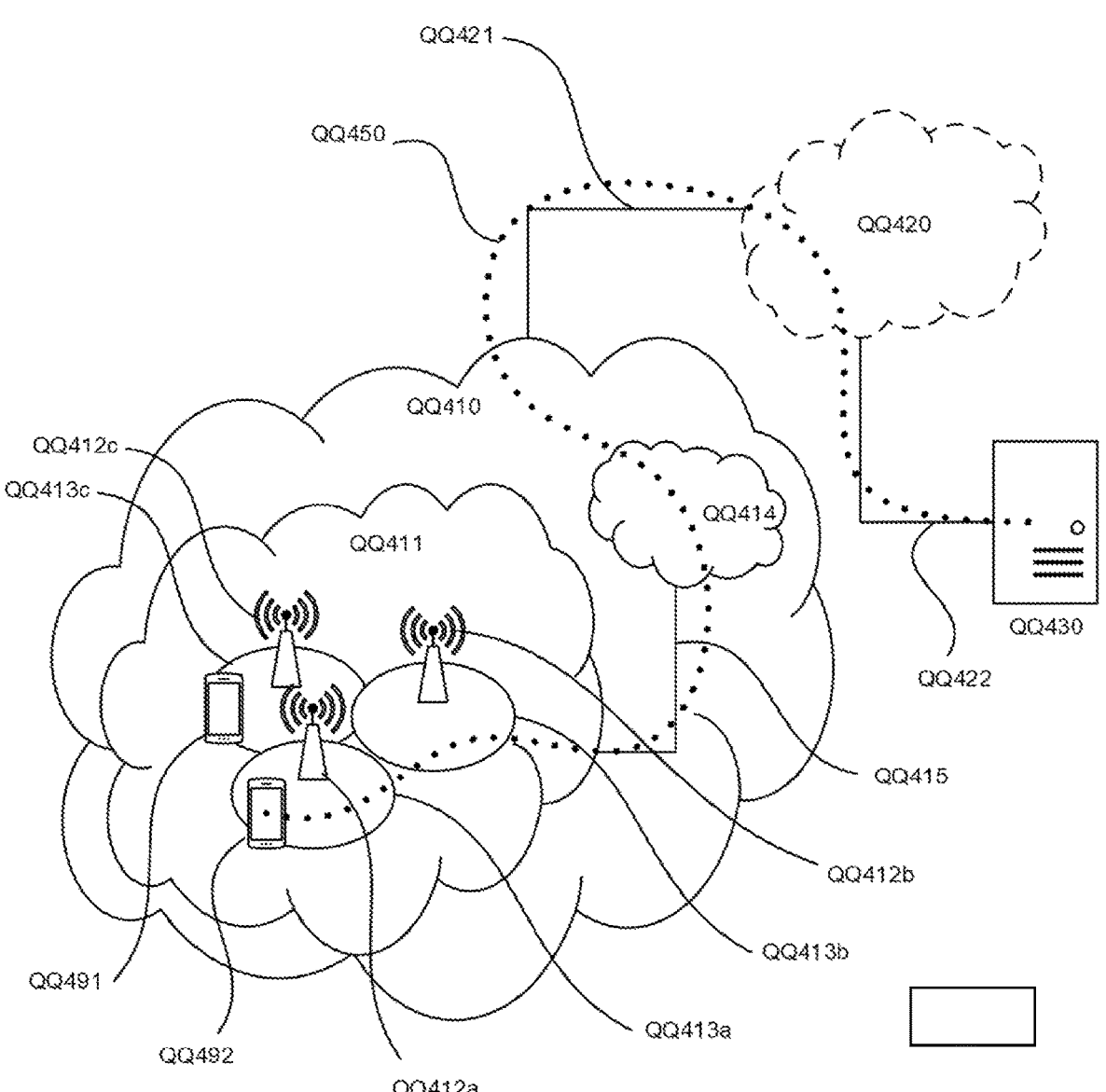
FIG. 19 shows a telecommunication network connected via an intermediate network to a host computer in accordance with some embodiments.

With reference to FIG. 19, in accordance with an embodiment, a communication system includes telecommunication network QQ410, such as a 3 GPP-type cellular network, which comprises access network QQ411, such as a radio access network, and core network QQ414. Access network QQ411 comprises a plurality of base stations QQ412a, QQ412b, QQ412c, such as NBs, eNBs, gNBs or other types of wireless access points, each defining a corresponding coverage area QQ413a, QQ413b, QQ413c. Each base station QQ412a, QQ412b, QQ412c is connectable to core network QQ414 over a wired or wireless connection QQ415. A first UE QQ491 located in coverage area QQ413c is configured to wirelessly connect to, or be paged by, the corresponding base station QQ412c. A second UE QQ492 in coverage area QQ413a is wirelessly connectable to the corresponding base station QQ412a. While a plurality of UEs QQ491, QQ492 are illustrated in this example, the disclosed embodiments are equally applicable to a situation where a sole UE is in the coverage area or where a sole UE is connecting to the corresponding base station QQ412.

Telecommunication network QQ410 is itself connected to host computer QQ430, which may be embodied in the hardware and/or software of a standalone server, a cloud-implemented server, a distributed server or as processing resources in a server farm. Host computer QQ430 may be under the ownership or control of a service provider, or may be operated by the service provider or on behalf of the service provider. Connections QQ421 and QQ422 between telecommunication network QQ410 and host computer QQ430 may extend directly from core network QQ414 to host computer QQ430 or may go via an optional intermediate network QQ420. Intermediate network QQ420 may be one of, or a combination of more than one of, a public, private or hosted network; intermediate network QQ420, if any, may be a backbone network or the Internet; in particular, intermediate network QQ420 may comprise two or more sub-networks (not shown).

The communication system of FIG. 19 as a whole enables connectivity between the connected UEs QQ491, QQ492 and host computer QQ430. The connectivity may be described as an over-the-top (OTT) connection QQ450. Host computer QQ430 and the connected UEs QQ491, QQ492 are configured to communicate data and/or signaling via OTT connection QQ450, using access network QQ411, core network QQ414, any intermediate network QQ420 and possible further infrastructure (not shown) as intermediaries. OTT connection QQ450 may be transparent in the sense that the participating communication devices through which OTT connection QQ450 passes are unaware of routing of uplink and downlink communications. For example, base station QQ412 may not or need not be informed about the past routing of an incoming downlink communication with data originating from host computer QQ430 to be forwarded (e.g., handed over) to a connected UE QQ491. Similarly, base station QQ412 need not be aware of the future routing of an outgoing uplink communication originating from the UE QQ491 towards the host computer QQ430.

Example implementations, in accordance with an embodiment, of the UE, base station and host computer discussed in the preceding paragraphs will now be described with reference to FIG. 20. In communication system QQ500, host computer QQ510 comprises hardware QQ515 including communication interface QQ516 configured to set up and maintain a wired or wireless connection with an interface of a different communication device of communication system QQ500. Host computer QQ510 further comprises processing circuitry QQ518, which may have storage and/or processing capabilities. In particular, processing circuitry QQ518 may comprise one or more programmable processors, application-specific integrated circuits, field programmable gate arrays or combinations of these (not shown) adapted to execute instructions. Host computer QQ510 further comprises software QQ511, which is stored in or accessible by host computer QQ510 and executable by processing circuitry QQ518. Software QQ511 includes host application QQ512. Host application QQ512 may be operable to provide a service to a remote user, such as UE QQ530 connecting via OTT connection QQ550 terminating at UE QQ530 and host computer QQ510. In providing the service to the remote user, host application QQ512 may provide user data which is transmitted using OTT connection QQ550.

Communication system QQ500 further includes base station QQ520 provided in a telecommunication system and comprising hardware QQ525 enabling it to communicate with host computer QQ510 and with UE QQ530. Hardware QQ525 may include communication interface QQ526 for setting up and maintaining a wired or wireless connection with an interface of a different communication device of communication system QQ500, as well as radio interface QQ527 for setting up and maintaining at least wireless connection QQ570 with UE QQ530 located in a coverage area (not shown in FIG. 20) served by base station QQ520. Communication interface QQ526 may be configured to facilitate connection QQ560 to host computer QQ510. Connection QQ560 may be direct or it may pass through a core network (not shown in FIG. 20) of the telecommunication system and/or through one or more intermediate networks outside the telecommunication system. In the embodiment shown, hardware QQ525 of base station QQ520 further includes processing circuitry QQ528, which may comprise one or more programmable processors, application-specific integrated circuits, field programmable gate arrays or combinations of these (not shown) adapted to execute instructions. Base station QQ520 further has software QQ521 stored internally or accessible via an external connection.

Communication system QQ500 further includes UE QQ530 already referred to. Its hardware QQ535 may include radio interface QQ537 configured to set up and maintain wireless connection QQ570 with a base station serving a coverage area in which UE QQ530 is currently located. Hardware QQ535 of UE QQ530 further includes processing circuitry QQ538, which may comprise one or more programmable processors, application-specific integrated circuits, field programmable gate arrays or combinations of these (not shown) adapted to execute instructions. UE QQ530 further comprises software QQ531, which is stored in or accessible by UE QQ530 and executable by processing circuitry QQ538. Software QQ531 includes client application QQ532. Client application QQ532 may be operable to provide a service to a human or non-human user via UE QQ530, with the support of host computer QQ510. In host computer QQ510, an executing host application QQ512 may communicate with the executing client application QQ532 via OTT connection QQ550 terminating at UE QQ530 and host computer QQ510. In providing the service to the user, client application QQ532 may receive request data from host application QQ512 and provide user data in response to the request data. OTT connection QQ550 may transfer both the request data and the user data. Client application QQ532 may interact with the user to generate the user data that it provides.

Figure 20:
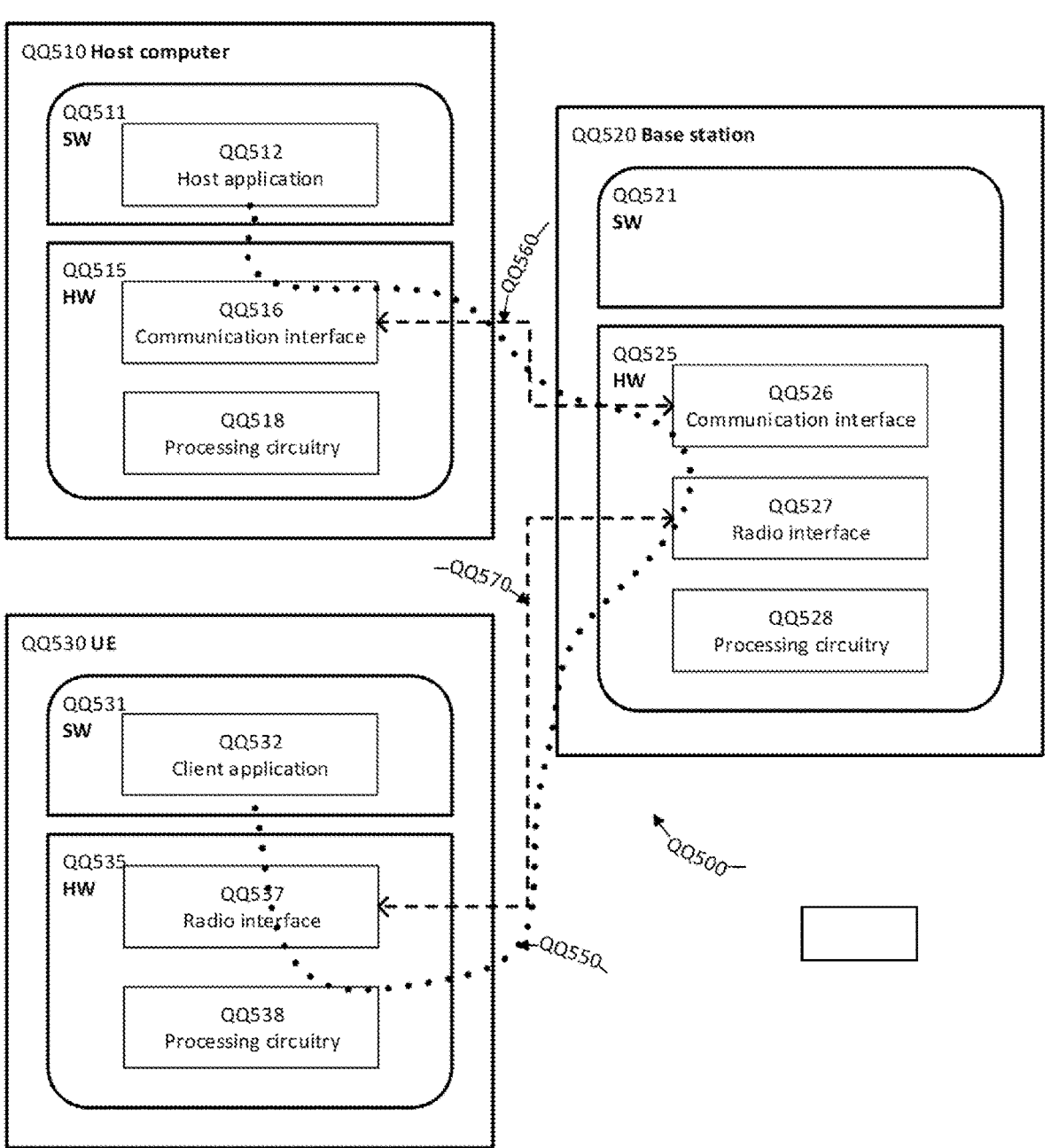
FIG. 20 shows a host computer communicating via a base station with a user equipment over a partially wireless connection in accordance with some embodiments.

It is noted that host computer QQ510, base station QQ520 and UE QQ530 illustrated in FIG. 20 may be similar or identical to host computer QQ430, one of base stations QQ412a, QQ412b, QQ412c and one of UEs QQ491, QQ492 of FIG. 19, respectively. This is to say, the inner workings of these entities may be as shown in FIG. 20 and independently, the surrounding network topology may be that of FIG. 19.

In FIG. 20, OTT connection QQ550 has been drawn abstractly to illustrate the communication between host computer QQ510 and UE QQ530 via base station QQ520, without explicit reference to any intermediary devices and the precise routing of messages via these devices. Network infrastructure may determine the routing, which it may be configured to hide from UE QQ530 or from the service provider operating host computer QQ510, or both. While OTT connection QQ550 is active, the network infrastructure may further take decisions by which it dynamically changes the routing (e.g., on the basis of load balancing consideration or reconfiguration of the network).

Wireless connection QQ570 between UE QQ530 and base station QQ520 is in accordance with the teachings of the embodiments described throughout this disclosure. One or more of the various embodiments improve the performance of OTT services provided to UE QQ530 using OTT connection QQ550, in which wireless connection QQ570 forms the last segment.

A measurement procedure may be provided for the purpose of monitoring data rate, latency and other factors on which the one or more embodiments improve. There may further be an optional network functionality for reconfiguring OTT connection QQ550 between host computer QQ510 and UE QQ530, in response to variations in the measurement results. The measurement procedure and/or the network functionality for reconfiguring OTT connection QQ550 may be implemented in software QQ511 and hardware QQ515 of host computer QQ510 or in software QQ531 and hardware QQ535 of UE QQ530, or both. In embodiments, sensors (not shown) may be deployed in or in association with communication devices through which OTT connection QQ550 passes; the sensors may participate in the measurement procedure by supplying values of the monitored quantities exemplified above, or supplying values of other physical quantities from which software QQ511, QQ531 may compute or estimate the monitored quantities. The reconfiguring of OTT connection QQ550 may include message format, retransmission settings, preferred routing etc.; the reconfiguring need not affect base station QQ520, and it may be unknown or imperceptible to base station QQ520. Such procedures and functionalities may be known and practiced in the art. In certain embodiments, measurements may involve proprietary UE signaling facilitating host computer QQ510's measurements of throughput, propagation times, latency and the like. The measurements may be implemented in that software QQ511 and QQ531 causes messages to be transmitted, in particular empty or 'dummy' messages, using OTT connection QQ550 while it monitors propagation times, errors etc.

Figure 21:
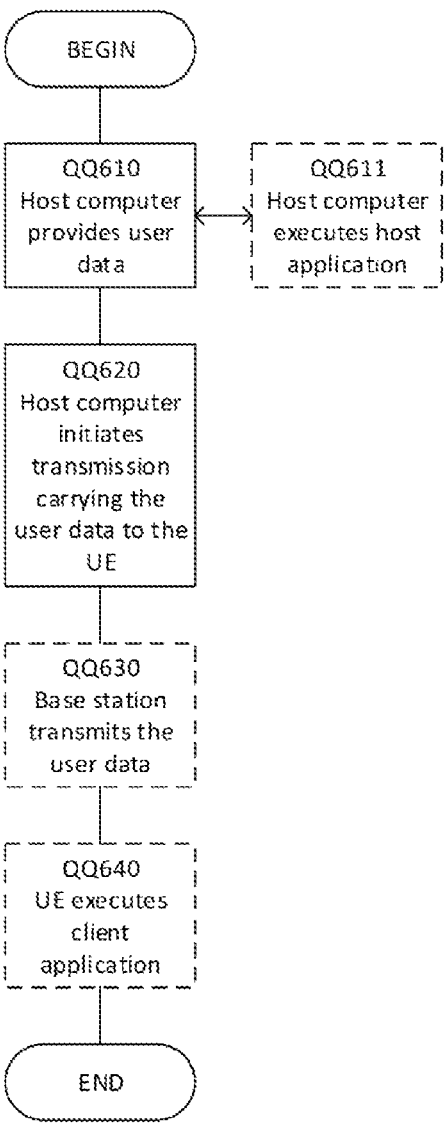
FIG. 21 shows methods implemented in a communication system in accordance with some embodiments.

FIG. 21 is a flowchart illustrating a method implemented in a communication system, in accordance with one embodiment. The communication system includes a host computer, a base station and a UE which may be those described with reference to FIGS. 19 and 20. For simplicity of the present disclosure, only drawing references to FIG. 21 will be included in this section. In step QQ610, the host computer provides user data. In substep QQ611 (which may be optional) of step QQ610, the host computer provides the user data by executing a host application. In step QQ620, the host computer initiates a transmission carrying the user data to the UE. In step QQ630 (which may be optional), the base station transmits to the UE the user data which was carried in the transmission that the host computer initiated, in accordance with the teachings of the embodiments described throughout this disclosure. In step QQ640 (which may also be optional), the UE executes a client application associated with the host application executed by the host computer.

Figure 22:
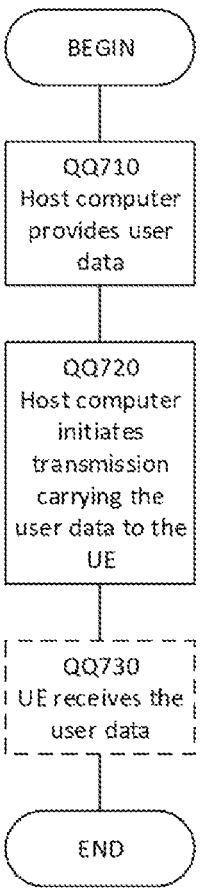
FIG. 22 shows methods implemented in a communication system in accordance with some embodiments.

FIG. 22 is a flowchart illustrating a method implemented in a communication system, in accordance with one embodiment. The communication system includes a host computer, a base station and a UE which may be those described with reference to FIGS. 19 and 20. For simplicity of the present disclosure, only drawing references to FIG. 22 will be included in this section. In step QQ710 of the method, the host computer provides user data. In an optional substep (not shown) the host computer provides the user data by executing a host application. In step QQ720, the host computer initiates a transmission carrying the user data to the UE. The transmission may pass via the base station, in accordance with the teachings of the embodiments described throughout this disclosure. In step QQ730 (which may be optional), the UE receives the user data carried in the transmission.

Figure 23:
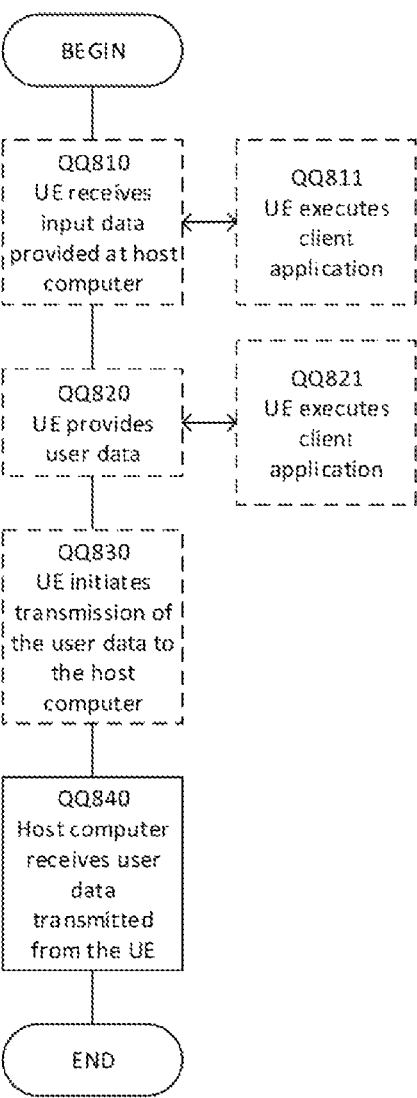
FIG. 23 shows methods implemented in a communication system in accordance with some embodiments.

FIG. 23 is a flowchart illustrating a method implemented in a communication system, in accordance with one embodiment. The communication system includes a host computer, a base station and a UE which may be those described with reference to FIGS. 19 and 20. For simplicity of the present disclosure, only drawing references to FIG. 23 will be included in this section. In step QQ810 (which may be optional), the UE receives input data provided by the host computer. Additionally or alternatively, in step QQ820, the UE provides user data. In substep QQ821 (which may be optional) of step QQ820, the UE provides the user data by executing a client application. In substep QQ811 (which may be optional) of step QQ810, the UE executes a client application which provides the user data in reaction to the received input data provided by the host computer. In providing the user data, the executed client application may further consider user input received from the user. Regardless of the specific manner in which the user data was provided, the UE initiates, in substep QQ830 (which may be optional), transmission of the user data to the host computer. In step QQ840 of the method, the host computer receives the user data transmitted from the UE, in accordance with the teachings of the embodiments described throughout this disclosure.

Figure 24:
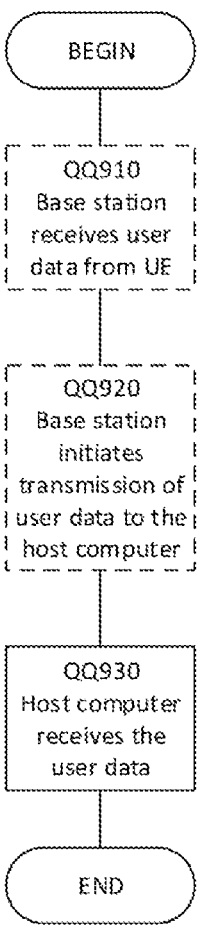
FIG. 24 shows methods implemented in a communication system including a host computer, a base station and a user equipment in accordance with some embodiments.

FIG. 24 is a flowchart illustrating a method implemented in a communication system, in accordance with one embodiment. The communication system includes a host computer, a base station and a UE which may be those described with reference to FIGS. 19 and 20. For simplicity of the present disclosure, only drawing references to FIG. 24 will be included in this section. In step QQ910 (which may be optional), in accordance with the teachings of the embodiments described throughout this disclosure, the base station receives user data from the UE. In step QQ920 (which may be optional), the base station initiates transmission of the received user data to the host computer. In step QQ930 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Figure 25:
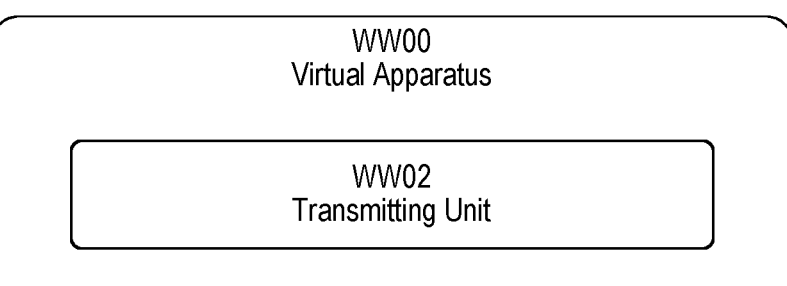
FIG. 25 illustrates a schematic block diagram of an apparatus in a wireless network.

FIG. 25 illustrates a schematic block diagram of an apparatus WW00 in a wireless network (for example, the wireless network shown in FIG. 16). The apparatus may be implemented in a network node (e.g., network node QQ160 shown in FIG. 16). Apparatus WW00 is operable to carry out the example method described with reference to FIG. 12 and possibly any other processes or methods disclosed herein. It is also to be understood that the method of FIG. 12 is not necessarily carried out solely by apparatus WW00. At least some operations of the method can be performed by one or more other entities.

Virtual Apparatus WW00 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause transmitting unit WW02, and any other suitable units of apparatus WW00, to perform corresponding functions according one or more embodiments of the present disclosure.

As illustrated in FIG. 25, apparatus WW00 includes transmitting unit WW02 configured to transmit, to a distributed unit DU of the base station which is configured as a donor DU for one or more IAB nodes, mapping information to map one or more field values to one or more backhaul radio link control BH RLC channels between the DU and a first IAB node on a downlink path.

Figure 26:
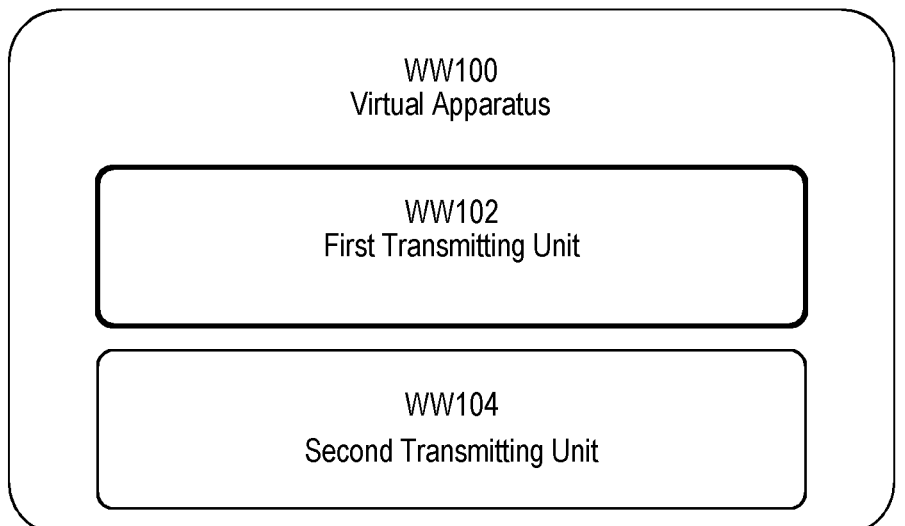
FIG. 26 illustrates a schematic block diagram of an apparatus in a wireless network.

FIG. 26 illustrates a schematic block diagram of an apparatus WW100 in a wireless network (for example, the wireless network shown in FIG. 16). The apparatus may be implemented in a network node (e.g., network node QQ160 shown in FIG. 16). Apparatus WW100 is operable to carry out the example method described with reference to FIG. 13 and possibly any other processes or methods disclosed herein. It is also to be understood that the method of FIG. 13 is not necessarily carried out solely by apparatus WW100. At least some operations of the method can be performed by one or more other entities.

Virtual Apparatus WW100 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause first transmitting unit WW102, second transmitting unit WW104; and any other suitable units of apparatus WW100 to perform corresponding functions according one or more embodiments of the present disclosure.

As illustrated in FIG. 26, apparatus WW100 includes first transmitting unit WW102 configured to transmitting, to an IAB node, first mapping information to map uplink data of one or more user equipment bearers to the one or more field values; and second transmitting unit WW104 configured to transmit, to the IAB node, second mapping information to map one or more field values to one or more backhaul radio link control BH RLC channels between the IAB node and a parent node of the IAB node.

Figure 27:
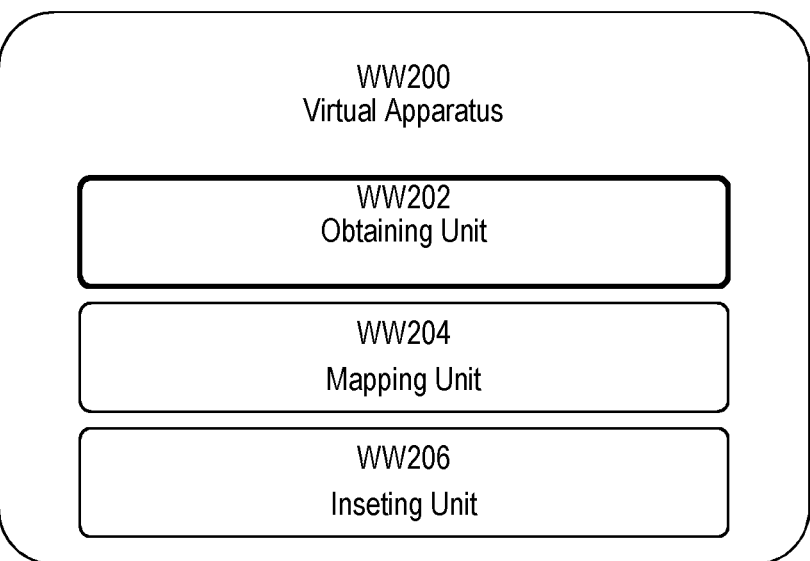
FIG. 27 illustrates a schematic block diagram of an apparatus in a wireless network.

FIG. 27 illustrates a schematic block diagram of an apparatus WW200 in a wireless network (for example, the wireless network shown in FIG. 16). The apparatus may be implemented in a network node (e.g., network node QQ160 shown in FIG. 16). Apparatus WW200 is operable to carry out the example method described with reference to FIG. 14 and possibly any other processes or methods disclosed herein. It is also to be understood that the method of FIG. 14 is not necessarily carried out solely by apparatus WW200. At least some operations of the method can be performed by one or more other entities.

Virtual Apparatus WW200 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause obtaining unit WW202, mapping unit WW204, inserting unit WW206; and any other suitable units of apparatus WW200 to perform corresponding functions according one or more embodiments of the present disclosure.

As illustrated in FIG. 27, apparatus WW200 includes obtaining unit WW202 configured to obtain mapping information to map one or more field values to one or more backhaul radio link control BH RLC channels between the DU and a first IAB node in a downlink path; mapping unit WW204 configured to map a downlink packet received from a central unit user plane CU-UP of the base station to a first BH RLC channel based on a first field value in the downlink packet and the mapping information; and inserting unit WW206 configured to insert a second field value into an uplink packet to be transmitted to the CU-UP base station based on a second BH RLC on which a corresponding uplink packet was received and the mapping information.

Figure 28:
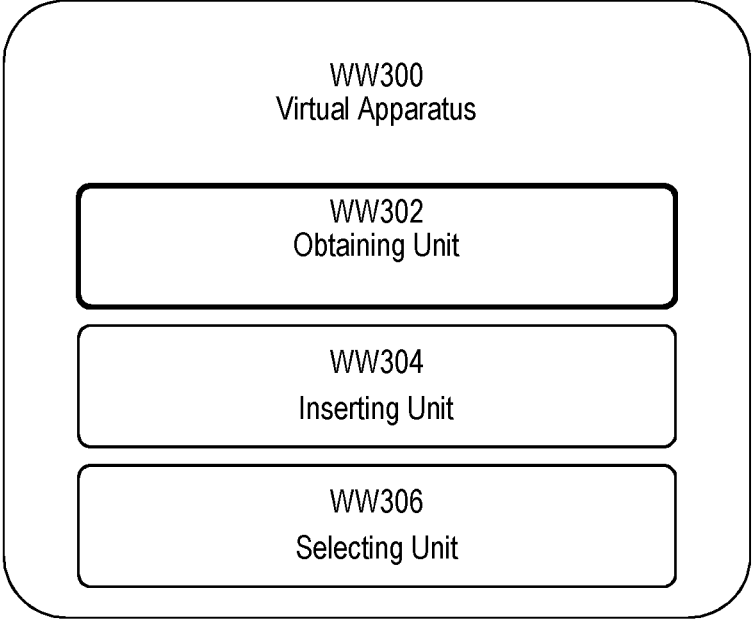
FIG. 28 illustrates a schematic block diagram of an apparatus in a wireless network.

FIG. 28 illustrates a schematic block diagram of an apparatus WW300 in a wireless network (for example, the wireless network shown in FIG. 16). The apparatus may be implemented in a network node (e.g., any network node shown in FIG. 16 which may be configured as an IAB node). Apparatus WW300 is operable to carry out the example method described with reference to FIG. 15 and possibly any other processes or methods disclosed herein. It is also to be understood that the method of FIG. 15 is not necessarily carried out solely by apparatus WW300. At least some operations of the method can be performed by one or more other entities.

Virtual Apparatus WW300 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause obtaining unit WW302, inserting unit WW304, selecting unit WW306; and any other suitable units of apparatus WW300 to perform corresponding functions according one or more embodiments of the present disclosure.

As illustrated in FIG. 28, apparatus WW300 includes obtaining unit WW302 configured to obtain first mapping information to map uplink data of one or more user equipment bearers to one or more field values; and obtain second mapping information to map the one or more field values to one or more backhaul radio link control BH RLC channels between the IAB node and a parent node of the IAB node; inserting unit WW304 configured to insert a first field value into an uplink packet based on a first user equipment bearer over which the uplink packet is transmitted and the first mapping information; and selecting unit WW306 configured to select a first BH RLC channel to forward the uplink packet to based on the first field value and the second mapping information.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Embodiments

The following enumerated embodiments form part of the present disclosure.

Group B Embodiments

1. A method performed by central unit control plane, CU-CP, of a base station for providing Integrated Access and Backhaul, IAB, bearer mapping information, wherein the base station is configured as a donor base station for one or more IAB nodes, the method comprising:
   transmitting, to a distributed unit DU of the base station which is configured as a donor DU for one more IAB node, mapping information to map one or more field values to one or more backhaul radio link control BH RLC channels between the DU and a first IAB node on a downlink path.

2. The method of embodiment 1 wherein the one or more field values are included in an Internet Protocol, IP, header.

3. The method of embodiment 1 of 2 wherein the one of more field values comprises a differentiated services code point, DSCP, value.

4. The method of any one of embodiments 1 to 3 wherein the one or more field values comprises an IPv6 Flow Label value.

5. The method of any previous embodiment wherein the mapping information is transmitted using F1 signalling.

6. The method of any previous embodiment wherein the one or more field values are mapped many-to-one to the one or more BH RLC channels.

7. The method of any previous embodiment wherein the one or more field values are mapped one-to-one to the one or more BH RLC channels.

8. The method of any previous embodiment wherein the one or more field values comprises a first field value of a first type and a second field value of a second type, and wherein the mapping information maps a combination of the first field value and the second field value to a first BH RLC channel.

9. A method performed by central unit control plane, CU-CP, of a base station for providing Integrated Access and Backhaul, IAB, mapping information, wherein the base station is configured as a donor base station for one or more IAB nodes, the method comprising:

transmitting, to an IAB node, first mapping information to map uplink data of one or more user equipment bearers to the one or more field values; and transmitting, to the IAB node, second mapping information to map one or more field values to one or more backhaul radio link control BH RLC channels between the IAB node and a parent node of the IAB node.

10. The method of embodiment 1 wherein the one or more field values are included in an Internet Protocol, IP, header.

11. The method of embodiment 8 wherein the one of more field values comprises a differentiated services code point, DSCP value.

12. The method of embodiment 8 or 9 wherein the one or more field values comprises an IPv6 Flow Label value.

13. The method of any one of embodiments 8 to 10 wherein the second mapping information is transmitted using radio resource control signalling.

14. The method of any one of embodiments 8 to 11 wherein the first mapping information is transmitted using F1 signalling.

15. The method of any one of embodiments 8 to 11 wherein the one or more field values are mapped many-to-one to the one or more BH RLC channels.

16. The method of any one of embodiments 8 to 12 wherein the one or more field values are mapped one-to-one to the one or more BH RLC channels.

17. The method of any one of embodiments 8 to 13 wherein the one or more field values comprises a first field value of a first type and a second field value of a second type, and wherein the second mapping information maps a combination of the first field value and the second field value to a first BH RLC channel.

18. A method performed by a distributed unit, DU, of a base station for providing Integrated Access and Backhaul, IAB, mapping information, wherein the base station is configured as a donor base station for one or more IAB nodes, the method comprising:

obtaining mapping information to map one or more field values to one or more backhaul radio link control BH RLC channels between the DU and a first IAB node in a downlink path; and mapping a downlink packet received from a central unit user plane CU-UP of the base station to a first BH RLC channel based on a first field value in the downlink packet and the mapping information; or inserting a second field value into an uplink packet to be transmitted to the CU-UP base station based on a second BH RLC on which a corresponding uplink packet was received and the mapping information.

19. The method of claim 18, wherein the step of obtaining the mapping information comprises:

a. receiving the mapping information from a central unit control plane, CU-CP, of the base station.

20. The method of embodiment 18 or 19 wherein the one of more field values comprises a differentiated services code point, DSCP value.

21. The method of any one of embodiments 18 to 20 wherein the one or more field values comprises an IPv6 Flow Label value.

22. The method of any one of embodiments 18 to 20 wherein the one or more field values are mapped many-to-one to the one or more BH RLC channels.

23. The method of any one of embodiments 18 to 22 wherein the one or more field values are mapped one-to-one to the one or more BH RLC channels.

24. The method of any one of embodiments 18 to 23 wherein the one or more field values comprises a first field value of a first type and a second field value of a second type, and wherein the mapping information maps a combination of the first field value and the second field value to a first BH RLC channel.

25. The method of any one of embodiments 18 to 24 wherein the mapping information comprises first mapping information applicable to specific Internet Protocol, IP, addresses and second mapping information applicable to all IP addresses, where the IP addresses are IP addresses of destination IAB nodes 26. The method of claim 25 wherein the downlink packet indicates a destination IP address, the method further comprising:

determining whether the first mapping information comprises information associated with the destination IP address that maps the first field value; and 27. responsive to the first mapping information comprising information associated with the destination IP address that maps the first field value to a particular BH RLC channel; selecting the particular BH RLC channel as the first BH RLC channel. The method of embodiment 26 further comprising:

responsive to the first mapping information not comprising information associated with the destination IP address that maps the first field value, determining whether the second mapping information comprises information mapping the first field value to a particular BH RLC channel; and responsive to the second mapping information comprising information mapping the first field value to a particular BH RLC channel, selecting the particular BH RLC channel as the first BH RLC channel.

28. The method of embodiment 26 or 27 further comprising:

responsive to the second mapping information not comprising information mapping the first field value to a particular BH RLC channel, selecting the first BH RLC channel using a default mapping.

29. A method performed by an Integrated Access and Backhaul node for providing Integrated Access and Backhaul, IAB, mapping information, wherein the IAB node is being served by a base station configured as a donor base station for one or more IAB nodes, the method comprising:

obtaining first mapping information to map uplink data of one or more user equipment bearers to one or more field values;

obtaining second mapping information to map the one or more field values to one or more backhaul radio link control BH RLC channels between the IAB node and a parent node of the IAB node;

inserting a first field value into an uplink packet based on a first user equipment bearer over which the uplink packet is transmitted and the first mapping information; and selecting a first BH RLC channel to forward the uplink packet to based on the first field value and the second mapping information.

30. The method of embodiment 27 wherein the first mapping information maps the uplink data of the one or more user equipment bearers to the one or more first field values based on quality of service information relating to the user equipment bearers.

31. The method of embodiment 27 or 28 wherein the first mapping information is received from a central unit control plane of the base station.

32. The method of embodiment 27 wherein the step of obtaining the first mapping information comprises:

a. receiving an indication from a central unit control plane, CU-CP, of the base station indicating whether uplink data of a first user equipment bearer is to be mapped one-to-one or not; and b. determining a first field value for the first user equipment bearer based on the indication.

33. The method of embodiment 27 wherein the step of obtaining the first mapping information comprises:

a. determining a first field value for a first user equipment bearer based whether or not the first user equipment bearer meets one or more criteria.

34. The method of any one of embodiments 27 to 31 wherein the second mapping information is received using radio resource control signalling.

35. The method of any one of embodiments 27 to 32 wherein the first mapping information is received using F1 signalling.

36. The method of any of the previous embodiments, further comprising:

obtaining user data; and forwarding the user data to a host computer or a wireless device.

Group C Embodiments

37. A base station for providing Integrated Access and Backhaul, IAB, mapping information, the base station comprising:

processing circuitry configured to perform any of the steps of any of the Group B embodiments;

power supply circuitry configured to supply power to the base station.

38. A communication system including a host computer comprising:

processing circuitry configured to provide user data; and a communication interface configured to forward the user data to a cellular network for transmission to a user equipment (UE), wherein the cellular network comprises a base station having a radio interface and processing circuitry, the base station's processing circuitry configured to perform any of the steps of any of the Group B embodiments.

39. The communication system of the previous embodiment further including the base station.

40. The communication system of the previous 2 embodiments, further including the UE, wherein the UE is configured to communicate with the base station.

41. The communication system of the previous 3 embodiments, wherein:

the processing circuitry of the host computer is configured to execute a host application, thereby providing the user data; and the UE comprises processing circuitry configured to execute a client application associated with the host application.

42. A method implemented in a communication system including a host computer, a base station and a user equipment (UE), the method comprising:

at the host computer, providing user data; and at the host computer, initiating a transmission carrying the user data to the UE via a cellular network comprising the base station, wherein the base station performs any of the steps of any of the Group B embodiments.

43. The method of the previous embodiment, further comprising, at the base station, transmitting the user data.

44. The method of the previous 2 embodiments, wherein the user data is provided at the host computer by executing a host application, the method further comprising, at the UE, executing a client application associated with the host application.

45. A user equipment (UE) configured to communicate with a base station, the UE comprising a radio interface and processing circuitry configured to perform any of the previous 3 embodiments.

46. A communication system including a host computer comprising a communication interface configured to receive user data originating from a transmission from a user equipment (UE) to a base station, wherein the base station comprises a radio interface and processing circuitry, the base station's processing circuitry configured to perform any of the steps of any of the Group B embodiments.

47. The communication system of the previous embodiment further including the base station.

48. The communication system of the previous 2 embodiments, further including the UE, wherein the UE is configured to communicate with the base station.

49. The communication system of the previous 3 embodiments, wherein:

the processing circuitry of the host computer is configured to execute a host application;

the UE is configured to execute a client application associated with the host application, thereby providing the user data to be received by the host computer.

Abbreviations

At least some of the following abbreviations may be used in this disclosure. If there is an inconsistency between abbreviations, preference should be given to how it is used above. If listed multiple times below, the first listing should be preferred over any subsequent listing(s).

1×RTT CDMA2000 1× Radio Transmission Technology

3 GPP 3 rd Generation Partnership Project 5G 5th Generation

ABS Almost Blank Subframe

ARQ Automatic Repeat Request

AWGN Additive White Gaussian Noise

BCCH Broadcast Control Channel

BCH Broadcast Channel
CA Carrier Aggregation
CC Carrier Component
CCCH SDUCommon Control Channel SDU
CDMA Code Division Multiplexing Access
CGI Cell Global Identifier
CIR Channel Impulse Response
CP Cyclic Prefix
CPICH Common Pilot Channel
CPICH Ec/No CPICH Received energy per chip divided
   by the power density in the band
CQI Channel Quality information
C-RNTI Cell RNTI
CSI Channel State Information
DCCH Dedicated Control Channel
DL Downlink
DM Demodulation
DMRS Demodulation Reference Signal
DRX Discontinuous Reception
DTX Discontinuous Transmission
DTCH Dedicated Traffic Channel
DUT Device Under Test
E-CID Enhanced Cell-ID (positioning method)
E-SMLC Evolved-Serving Mobile Location Centre
ECGI Evolved CGI
eNB E-UTRAN NodeB
ePDCCH enhanced Physical Downlink Control Channel
E-SMLC evolved Serving Mobile Location Center
E-UTRA Evolved UTRA
E-UTRAN Evolved UTRAN
FDD Frequency Division Duplex
FFS For Further Study
GERAN GSM EDGE Radio Access Network
gNB Base station in NR
GNSS Global Navigation Satellite System
GSM Global System for Mobile communication
HARQ Hybrid Automatic Repeat Request
HO Handover
HSPA High Speed Packet Access
HRPD High Rate Packet Data
LOS Line of Sight
LPP LTE Positioning Protocol
LTE Long-Term Evolution
MAC Medium Access Control
MBMS Multimedia Broadcast Multicast Services
MBSFN Multimedia Broadcast multicast service Single
   Frequency Network
MBSFN ABS MBSFN Almost Blank Subframe
MDT Minimization of Drive Tests
MIB Master Information Block
MME Mobility Management Entity
MSC Mobile Switching Center
NPDCCH Narrowband Physical Downlink Control Channel
NR New Radio
OCNG OFDMA Channel Noise Generator
OFDM Orthogonal Frequency Division Multiplexing
OFDMA Orthogonal Frequency Division Multiple Access
OSS Operations Support System
OTDOA Observed Time Difference of Arrival
O&M Operation and Maintenance
PBCH Physical Broadcast Channel
P-CCPCH Primary Common Control Physical Channel
PCell Primary Cell
PCFICH Physical Control Format Indicator Channel
PDCCH Physical Downlink Control Channel
PDP Profile Delay Profile PDSCH Physical Downlink Shared Channel
PGW Packet Gateway
PHICH Physical Hybrid-ARQ Indicator Channel
PLMN Public Land Mobile Network
PMI Precoder Matrix Indicator
PRACH Physical Random Access Channel
PRS Positioning Reference Signal
PSS Primary Synchronization Signal
PUCCH Physical Uplink Control Channel
PUSCH Physical Uplink Shared Channel
RACH Random Access Channel
QAM Quadrature Amplitude Modulation
RAN Radio Access Network
RAT Radio Access Technology
RLM Radio Link Management
RNC Radio Network Controller
RNTI Radio Network Temporary Identifier
RRC Radio Resource Control
RRM Radio Resource Management
RS Reference Signal
RSCP Received Signal Code Power
RSRP Reference Symbol Received Power OR Reference
   Signal Received Power
RSRQ Reference Signal Received Quality OR Reference
   Symbol Received Quality
RSSI Received Signal Strength Indicator
RSTD Reference Signal Time Difference
SCH Synchronization Channel
SCell Secondary Cell
SDU Service Data Unit
SFN System Frame Number
SGW Serving Gateway
SI System Information
SIB System Information Block
SNR Signal to Noise Ratio
SON Self Optimized Network
SS Synchronization Signal
SSS Secondary Synchronization Signal
TDD Time Division Duplex
TDOA Time Difference of Arrival
TOA Time of Arrival
TSS Tertiary Synchronization Signal
TTI Transmission Time Interval
UE User Equipment
UL Uplink
UMTS Universal Mobile Telecommunication System
USIM Universal Subscriber Identity Module
UTDOA Uplink Time Difference of Arrival
UTRA Universal Terrestrial Radio Access
UTRAN Universal Terrestrial Radio Access Network
WCDMA Wide CDMA
WLAN Wide Local Area Network

The invention claimed is:

1. A method performed by a central unit control plane (CU-CP) of a base station serving as a donor base station in a multi-hop integrated access and backhaul (IAB) network, the method comprising:

determining downlink (DL) mapping information that associates user equipment (UE) traffic flows, identified by quality-of-service (QoS) flow identifiers (IDs), with first-hop DL backhaul radio link control channel (BH RLC) channels of a distributed unit (DU) of the donor base station, for initial mapping by the DU of DL traffic into the multi-hop IAB network;

determining uplink (UL) mapping information that associates first-hop UL BH RLC channels of the DU with the UE traffic flows identified by the QoS flow IDs, for reforming the UE traffic flows from UL traffic incoming to the DU from the multi-hop IAB network; and configuring the DU of the donor base station to perform DL mapping and UL mapping, based on sending the DL mapping information and the UL mapping information to the DU of the donor base station.

2. The method of claim 1, wherein the method includes the CU-CP deciding, with respect to a UE supported by the multi-hop IAB network, whether to use one-to-one mapping for the UE, in which a first-hop DL or UL BH RLC channel is dedicated for the UE.

3. A base station comprising:

interface and processing circuitry configured for operation as a central unit (CU) of the base station; and interface and processing circuitry configured for operation as a distributed unit (DU) of the base station;

wherein the CU provides a CU control plane (CU-CP) that, with respect to the base station operating as a donor base station in a multi-hop integrated access and backhaul (IAB) network, is configured to:

determine downlink (DL) mapping information that associates user equipment (UE) traffic flows, identified by quality-of-service (QoS) flow identifiers (IDs), with first-hop DL backhaul radio link control (BH RLC) channels of the DU, for initial mapping by the DU of DL traffic into the multi-hop IAB network;

determine uplink (UL) mapping information that associates first-hop UL BH RLC channels of the DU with the UE traffic flows identified by the QoS flow IDs, for use by the DU in reforming the UE traffic flows from UL traffic incoming to the DU from the multi-hop IAB network; and configuring the DU to perform DL mapping and UL mapping, based on sending the DL mapping information and the UL mapping information to the DU of the donor base station.

* * * * *